(12) United States Patent
Minami et al.

(10) Patent No.: US 10,844,910 B2
(45) Date of Patent: Nov. 24, 2020

(54) CLUTCH DRIVE DEVICE AND VEHICLE

(71) Applicant: YAMAHA HATSUDOKI KABUSHIKI KAISHA, Iwata (JP)

(72) Inventors: Kengo Minami, Iwata (JP); Yoshiki Terashima, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 16/445,998

(22) Filed: Jun. 19, 2019

(65) Prior Publication Data
US 2019/0301541 A1 Oct. 3, 2019

Related U.S. Application Data

(63) Continuation-in-part of application No. PCT/JP2017/047197, filed on Dec. 28, 2017.

(30) Foreign Application Priority Data

Dec. 29, 2016 (JP) ................. 2016-257437

(51) Int. Cl.
*F16D 23/12* (2006.01)
*F16D 28/00* (2006.01)
(Continued)

(52) U.S. Cl.
CPC ............. *F16D 23/12* (2013.01); *F16D 28/00* (2013.01); *B62K 23/00* (2013.01)

(58) Field of Classification Search
CPC .... F16D 23/12; F16D 28/00; F16D 2021/063; F16D 2023/126; B62K 23/00; F16H 19/02; F16H 21/44
See application file for complete search history.

(56) References Cited

U.S. PATENT DOCUMENTS 4,671,400 A 6/1987 Grunberg et al.
4,750,596 A * 6/1988 Grunberg .............. B60T 13/741
188/83
(Continued)

FOREIGN PATENT DOCUMENTS

CN 1991193 A 7/2007
CN 103097756 A 5/2013
(Continued)

OTHER PUBLICATIONS

Office Action dated Jul. 27, 2020 issued in the corresponding European Patent Application No. 17885966.6 that corresponds to the present application.
(Continued)

*Primary Examiner* — Tinh Dang
(74) *Attorney, Agent, or Firm* — Rabin & Berdo, P.C.

(57) ABSTRACT

A clutch driving device includes: a spring that is deformable in a circumferential direction when seen in an axial direction to thereby generate a force in the circumferential direction; a first projection disposed at one end of the spring; an output gear that rotates in an disengaging direction or an engaging direction of the clutch; and a pin that is provided to the output gear to be rotatable together with the output gear and contacts the first projection to thereby transfer the elastic restoring force to the output gear. A contact point between the first projection and the pin moves toward an axis of the spring at least once when seen in the axial direction of the spring in a case where the output gear rotates in a direction in which the elastic restoring force of the spring decreases.

14 Claims, 19 Drawing Sheets

(51) Int. Cl.
*B62K 23/00* (2006.01)
*B62K 23/08* (2006.01)
*F16H 19/02* (2006.01)
*F16H 21/44* (2006.01)

(56) References Cited

U.S. PATENT DOCUMENTS

| | | | |
|---|---|---|---|
| 5,678,671 A * | 10/1997 | Leimbach | B60T 13/745 192/114 R |
| 6,269,926 B1 | 8/2001 | Lemoine et al. | |
| 10,563,703 B2 * | 2/2020 | Kim | F16D 23/12 |
| 2006/0101603 A1 * | 5/2006 | Yagi | B60S 1/342 15/250.3 |

FOREIGN PATENT DOCUMENTS

| | | |
|---|---|---|
| CN | 103511506 A | 1/2014 |
| CN | 103836090 A | 6/2014 |
| CN | 104011416 A | 8/2014 |
| CN | 104736872 A | 6/2015 |
| CN | 105757138 A | 7/2016 |
| CN | 105934595 A | 9/2016 |
| CN | 106164521 A | 11/2016 |
| DE | 19723394 A1 | 12/1997 |
| EP | 0220092 A1 | 4/1987 |
| EP | 0220092 B1 | 12/1989 |
| EP | 2336587 A1 | 6/2011 |
| EP | 2431626 A1 | 3/2012 |
| EP | 2899420 A2 | 7/2015 |
| EP | 3104040 A1 | 12/2016 |
| GB | 2313885 A | 12/1997 |
| JP | S60-241526 A | 11/1985 |
| JP | S62-98032 A | 5/1987 |
| JP | S63-63225 U | 4/1988 |
| JP | H1081158 A | 3/1998 |
| JP | 2000-501826 A | 2/2000 |
| JP | 2000201826 A | 7/2000 |
| JP | 2002-309610 A | 10/2002 |
| JP | 2003-528273 A | 9/2003 |
| JP | 2006-170227 A | 6/2006 |
| JP | 2006-214478 A | 8/2006 |
| JP | 2012-062966 A | 3/2012 |
| JP | 2013-133887 A | 7/2013 |
| JP | 2015-072024 A | 4/2015 |
| JP | 2015-148258 A | 8/2015 |
| KR | 101304193 B * | 9/2013 |
| KR | 101304193 B1 | 9/2013 |
| WO | 2016024557 A1 | 2/2016 |

OTHER PUBLICATIONS

Office Action dated Jul. 27, 2020 issued in a relevant European Patent Application No. 17888622.2 corresponding to a relevant U.S. Appl. No. 16/455,169.
Office Action dated Jul. 27, 2020 issued in a relevant European Patent Application No. 17887360.0 corresponding to a relevant U.S. Appl. No. 16/455,884.
Office Action dated Sep. 2, 2020 issued in a relevant Canadian Patent Application No. 3,047,909 corresponding to a relevant U.S. Appl. No. 16/455,884.
Office Action dated Sep. 23, 2020 issued in the corresponding Indonesian Patent Application No. P00201905440 that corresponds to the present application.
Office Action dated Sep. 23, 2020 issued in a relevant Indonesian Patent Application No. P00201905442 corresponding to a relevant U.S. Appl. No. 16/455,169.
Office Action dated Sep. 23, 2020 issued in a relevant Indonesian Patent Application No. P00201905441 corresponding to a relevant U.S. Appl. No. 16/455,884.

* cited by examiner

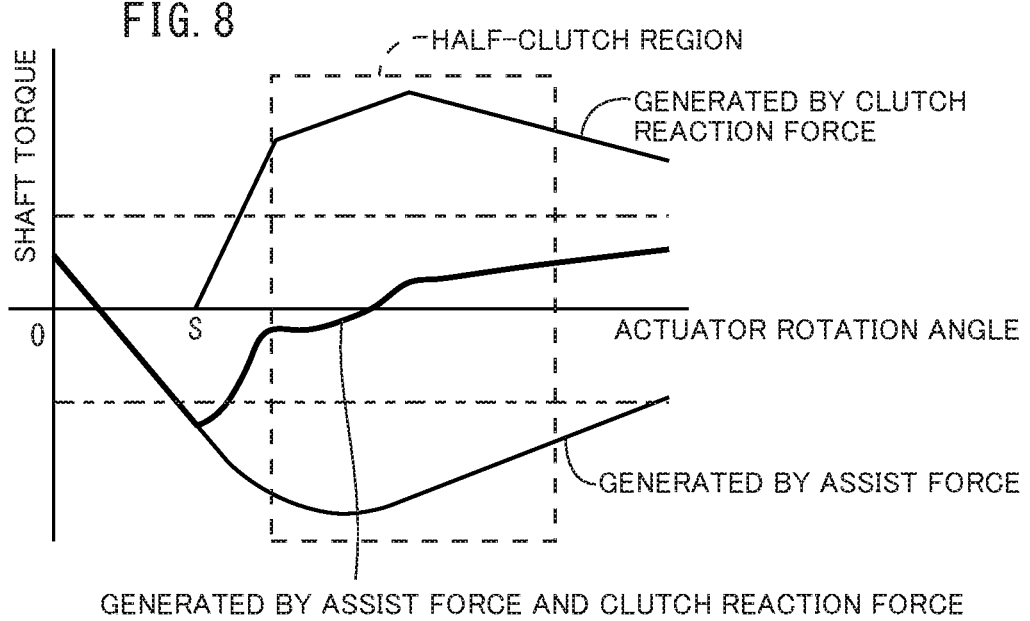

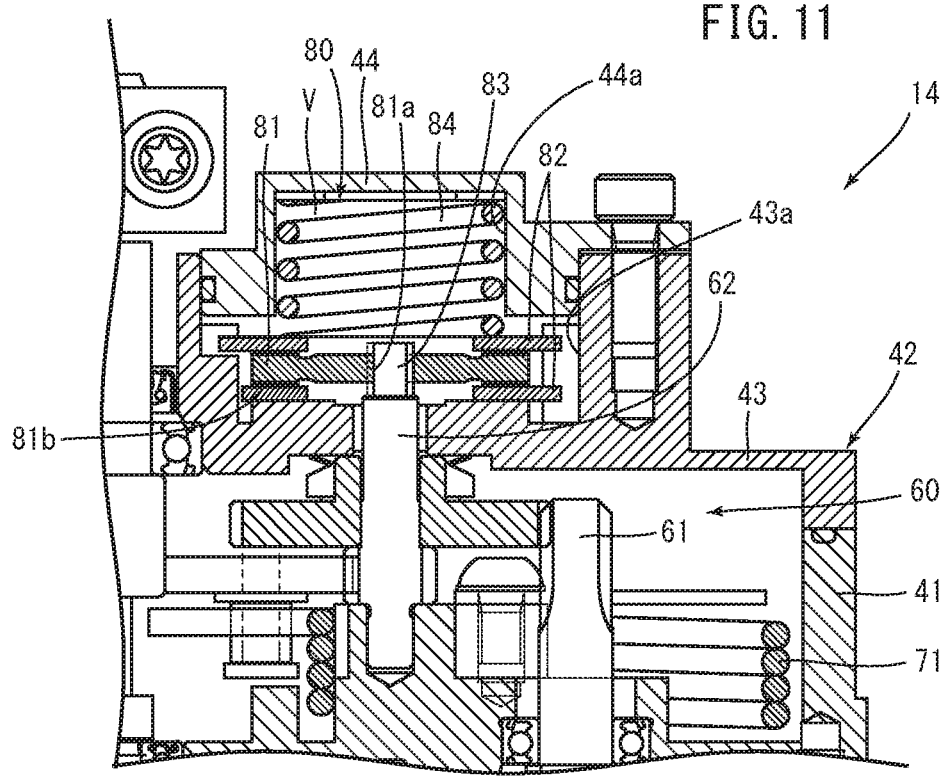
FIG. 11
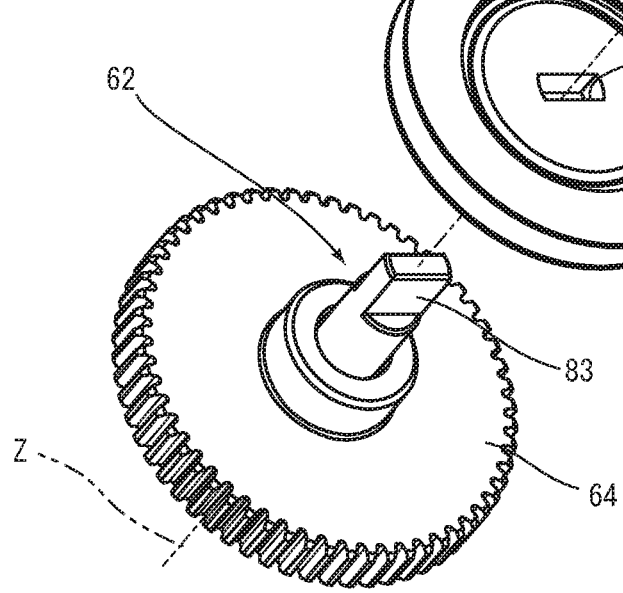
FIG. 12

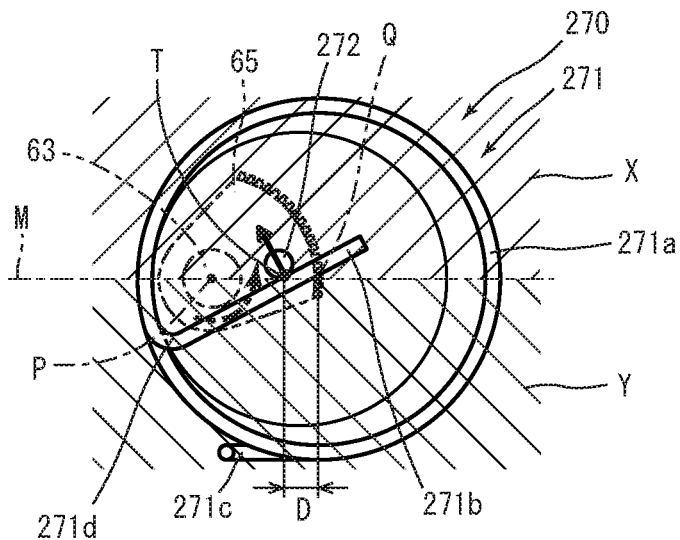
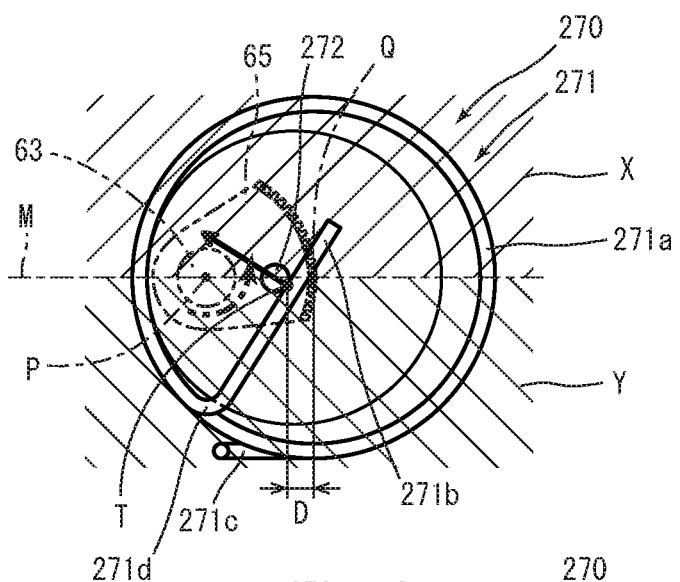
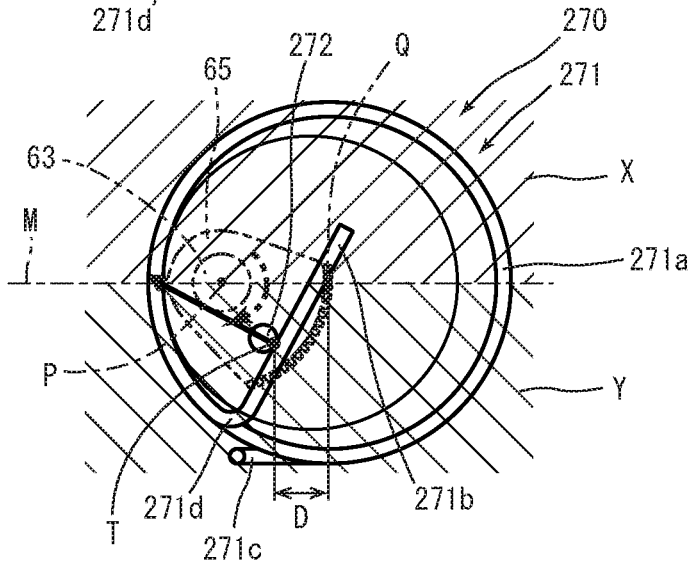

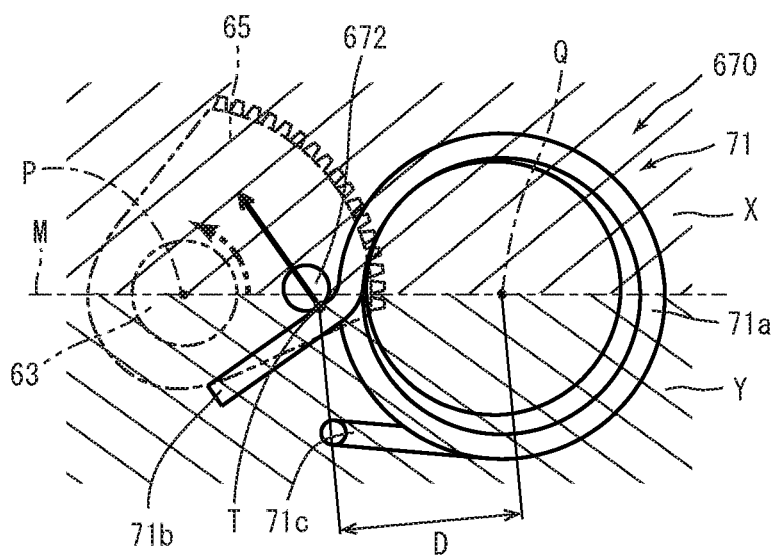
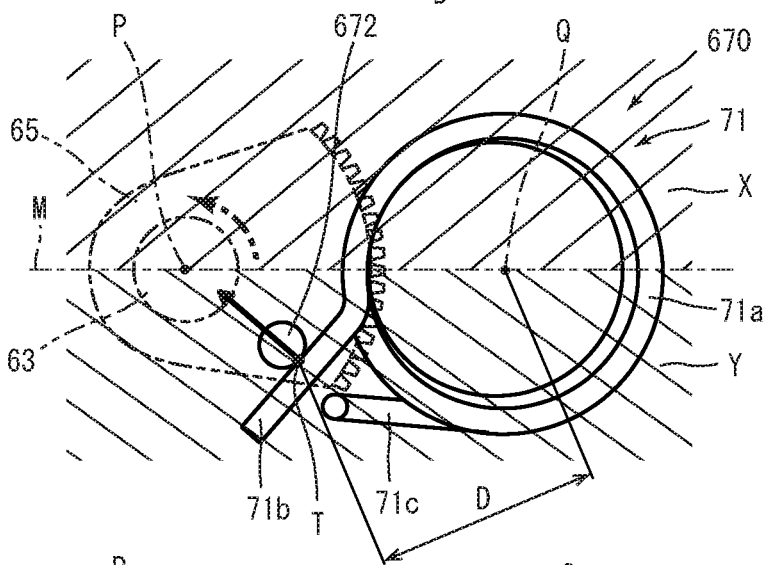
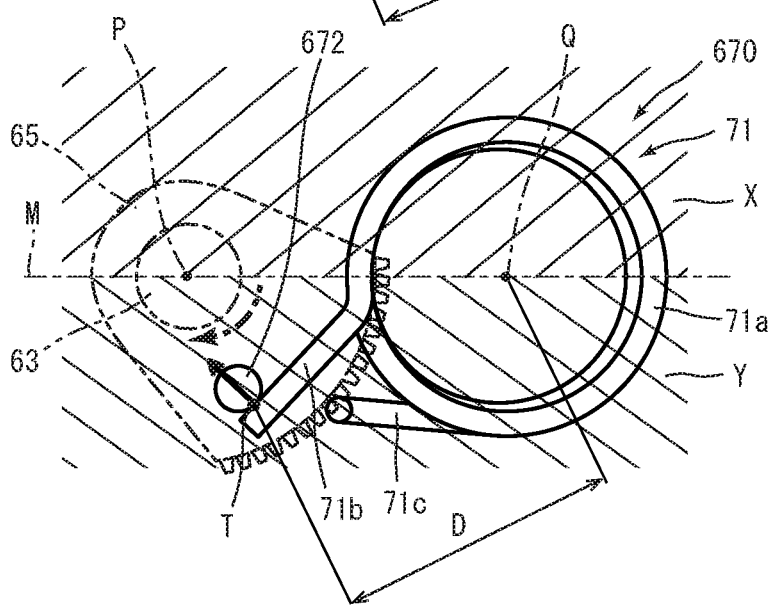

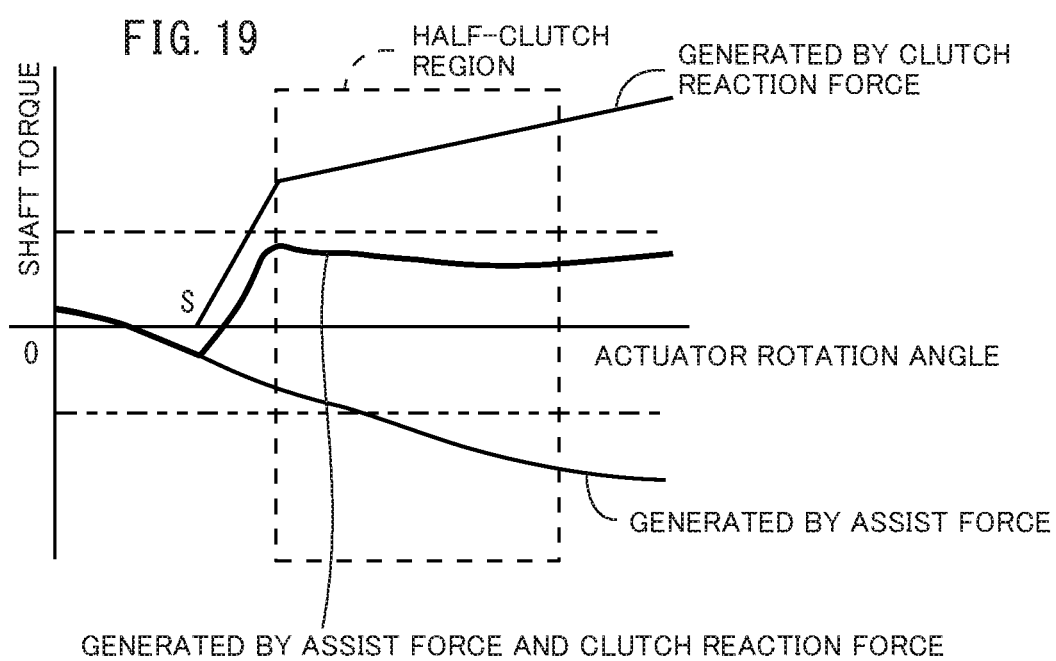

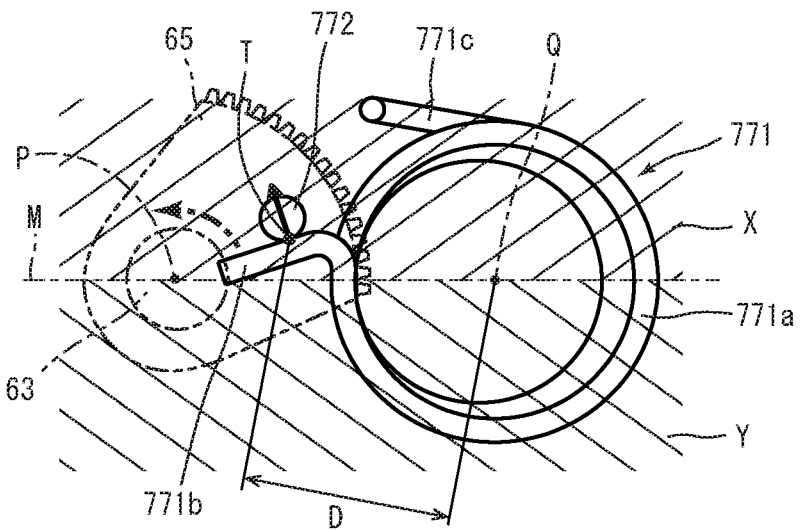
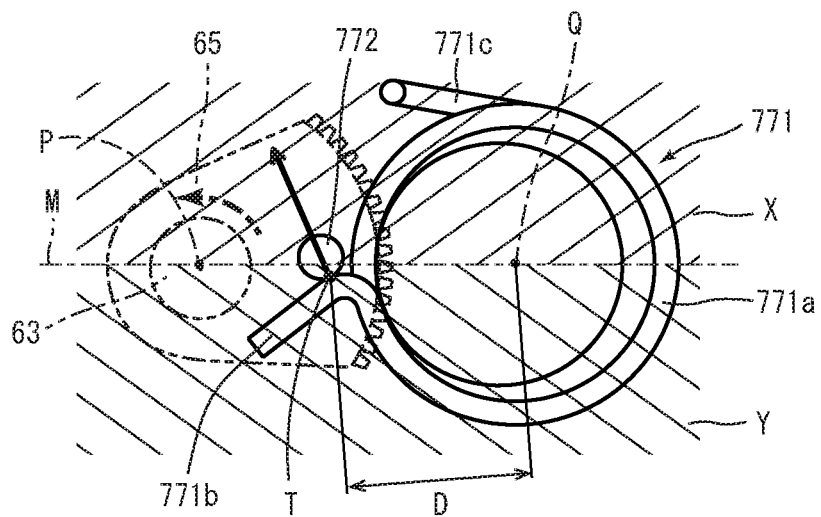
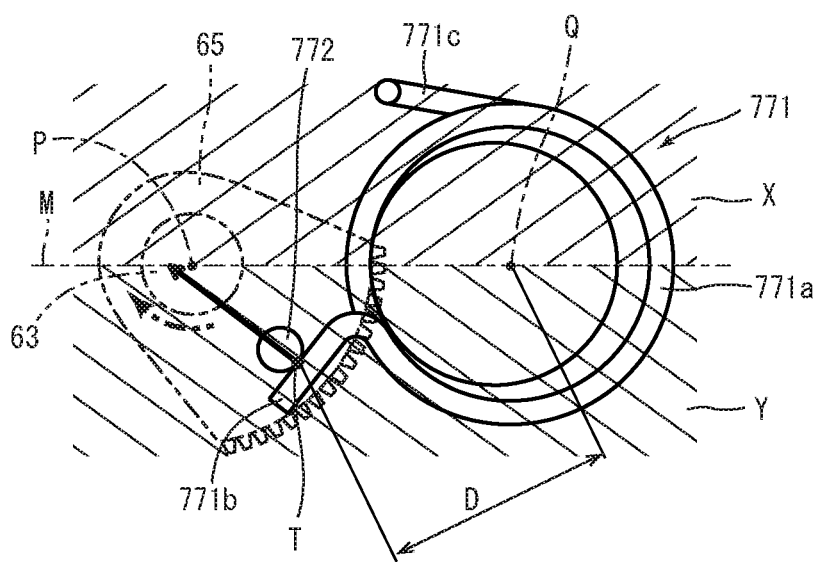

CLUTCH DRIVE DEVICE AND VEHICLE

CROSS-REFERENCES TO RELATED APPLICATIONS

The Present application is a continuation-in-part application of International Application No. PCT/JP2017/047197, filed on Dec. 28, 2017, and having the benefit of the earlier filing date of Japanese Application No. 2016-257437, filed Dec. 29, 2016. The content of each of the identified applications is incorporated herein by reference in its entirety.

BACKGROUND

Technical Field

The present teaching relates to a clutch driving device that supplies an assist force for assisting each of operations of disengagement and engagement of a clutch.

Background Art

A known clutch driving device supplies an assist force for assisting each of operations of disengagement and engagement of a clutch. As such a clutch driving device, Patent Document 1 discloses a known configuration, for example. The configuration disclosed in Patent Document 1 controls engagement and disengagement of a clutch by operating a push rod using a hydraulic mechanism including a master cylinder and a clutch release cylinder. Patent Document 1 discloses a mechanism that generates an assist force for assisting operation of the push rod.

In the configuration disclosed in Patent Document 1 described above, a clutch disc is pushed against a friction disc by a biasing force of a clutch spring. Thus, in a normal state (while only a biasing force of the clutch spring is exerted on the clutch disc and the friction disc), the clutch is in an engaged state. The clutch is disengaged by moving the push rod under a hydraulic pressure in such a manner that the clutch disc and the friction disc are separated away from each other.

In the configuration disclosed in Patent Document 1 described above, a piston push rod that pushes a piston in the master cylinder is rotatably supported on a rotating member by a rotating shaft (hereinafter referred to as a first rotating shaft). An auxiliary spring member is attached to the rotating member by a rotating shaft (hereinafter referred to as a second rotating shaft) different from the first rotating shaft. The rotating member rotates about a still another rotating shaft (hereinafter referred to as a third rotating shaft) different from the first rotating shaft and the second rotating shaft. A worm wheel that meshes with a worm gear connected to a rotating shaft of a motor is attached to the third rotating shaft. In this manner, the rotating member is rotated by the motor.

One end of the auxiliary spring member is supported on the inner wall of an actuator case. The other end of the auxiliary spring member pushes the second rotating shaft for attaching the auxiliary spring member to the rotating member. The auxiliary spring member is swingable at the other end about the one end thereof.

The auxiliary spring member incorporates a spring that is compressed into a state of being shorter than its natural length and acts to extend by itself. This elastic force of the spring exerts a push force on the second rotating shaft so that an auxiliary torque (rotation torque) is applied to the third rotating shaft. When the rotating member is at a rotation position corresponding to a disengaged state of the clutch, this rotation torque is applied to the rotating member in a direction in which the piston is pushed into the master cylinder by the piston push rod, that is, in a disengagement direction of the clutch.

With the structure described above, in the configuration disclosed in Patent Document 1, when the rotating member rotates by the motor in a clutch disengagement direction, the spring applies an auxiliary torque in the clutch disengagement direction to the rotating member.

In the configuration disclosed in Patent Document 1, the first rotating shaft, the third rotating shaft, and the second rotating shaft are arranged in this order in a radial direction in the rotating member. In a case where the rotation position of the rotating member corresponds to an engaged state of the clutch, a composite torque of a torque input from the piston push rod to the rotating member through the first rotating shaft and a torque input from the spring to the rotating member through the second rotating shaft is a torque that rotates the rotating member in a direction in which the clutch is engaged. Accordingly, the clutch can be stabilized in the engaged state.

In the configuration disclosed in Patent Document 1, the spring and the piston push rod are connected to the rotating member and the spring is caused to swing depending on the rotation position of the rotating member so that the direction of a torque applied to the rotating member can be changed. That is, in the configuration described in Patent Document 1, a biasing force of the spring can be used as an assist force for engagement and disengagement of the clutch.

With the foregoing structure, the configuration described in Patent Document 1 can reduce the size of the motor for a clutch actuator. As a result, the size of the clutch actuator can be reduced.

CITATION LIST

Patent Document

Patent Document 1: Japanese Patent Application Publication No. 2006-170227

SUMMARY OF INVENTION

In the configuration disclosed in Patent Document 1, to enable a change of the direction of a torque to be applied from the spring to the rotating member rotatable depending on the rotation position of the rotating member, the spring is attached to an actuator such that the spring is swingable about one end of the spring. This requires space in the actuator casing for allowing the spring to swing.

On the other hand, there has been a demand for further reducing device size from the size in the configuration disclosed in Patent Document 1. A configuration in which a spring swings as in the configuration disclosed in Patent Document 1, however, requires space for allowing the spring to swing, and thus, further reduction of the device size has been difficult.

The present teaching has an object of obtaining a configuration that enables further device size reduction from device size of a known configuration while obtaining desired assist characteristics in a clutch driving device that supplies a clutch with an assist force for engagement and disengagement of the clutch.

Inventors of the present teaching have intensively studied a configuration capable of changing the direction of a force obtained from a spring without swinging the spring in order to further reduce device size from the configuration disclosed in Patent Document 1.

Consequently, the inventors found that a torsion spring capable of obtaining an elastic restoring force for circumferential deformation can change a force obtained from the torsion spring without moving the torsion spring.

That is, the inventors found that the direction of a force obtained from the torsion spring can be changed with further reduction of device size by deforming the torsion spring circumferentially and receiving an elastic restoring force of the torsion spring with radial displacement of the torsion spring being restricted and by changing the distance from an axis at the center of the torsion spring.

Based on the foregoing findings, the inventors arrived at the configuration as follows.

A clutch driving device according to one embodiment of the present teaching is a clutch driving device that supplies an assist force for assisting operations of disengagement and engagement of a clutch. The clutch driving device includes: a spring that extends helically about an axis and deforms in a circumferential direction when seen in an axial direction to thereby generate an elastic restoring force in the circumferential direction; an output portion that is disposed at one end of the spring and outputs the elastic restoring force from the spring; a movement restricting portion that restricts movement of the spring in a radial direction when the spring deforms in the circumferential direction; a rotary body that rotates in a disengaging direction in disconnecting the clutch and rotates in an engaging direction in engaging the clutch, using, as a rotation center, a rotating shaft extending at a position different from the axis of the spring and in parallel with the axis; and a transfer portion that is provided to the rotary body to be rotatable together with the rotary body and contacts the output portion to transfer the elastic restoring force to the rotary body, wherein the rotary body receives, as a torque, a reaction force generated by operations of disengagement and engagement of the clutch, and receives, as the assist force, the elastic restoring force generated by deformation of the spring in the circumferential direction through the output portion and the transfer portion, and in a case where the rotary body rotates at a position different from the rotating shaft of the rotary body and the axis of the spring and in a direction in which the elastic restoring force of the spring decreases, a contact point between the output portion and the transfer portion moves toward the axis at least once when seen in the axial direction of the spring.

The movement restricting portion restricts radial movement of the spring that extends helically about the axis and deforms in the circumferential direction when seen in the axial direction to thereby generate an elastic restoring force in the circumferential direction. Accordingly, the elastic restoring force of the spring can be applied as an assist force to the rotation body, and necessity for space for movement of the spring can be eliminated in the device. As a result, the size of the clutch driving device can be reduced.

In addition to the configuration described above, in the case where the rotary body rotates at a position different from the rotating shaft of the rotary body and the axis of the spring and in the direction in which the elastic restoring force of the spring decreases, the contact point between the output portion provided on one end of the spring and the transfer portion provided on the rotary body is caused to move toward the axis at least once when seen in the axial direction of the spring. Accordingly, the elastic restoring force generated in the spring can be transferred to the rotary body as an assist force in a direction in which the output portion moves away from the other end of the spring. At this time, the elastic restoring force of the spring is transferred to the rotary body as a torque through the output portion and the transfer portion.

The configuration described above can further reduce the size of the device as compared to a device with a conventional configuration while supplying a desired assist force to the clutch.

In another aspect, the clutch driving device according to the present teaching preferably includes the following configurations. The rotating shaft of the rotary body is located outside the spring when seen in the axial direction.

In a case where the rotating shaft of the rotary body is located inside the spring when seen in the axial direction of the spring, the spring needs to have such a diameter that includes the output portion and the transfer portion. On the other hand, the above-described configuration in which the rotating shaft is located outside the spring when seen in the axial direction can reduce the size of the spring. Accordingly, the size of the spring can be reduced.

In another aspect, the clutch driving device according to the present teaching preferably includes the following configurations. The contact point is located outside the spring when seen in the axial direction.

Accordingly, the size of the spring can be reduced when seen in the axial direction of the spring, as compared to a case where the contact point is located radially inside the spring.

In another aspect, the clutch driving device according to the present teaching preferably includes the following configurations. A distance between the rotating shaft of the rotary body and the contact point is smaller than a distance between the rotating shaft of the rotary body and the axis of the spring.

Accordingly, a range where the contact point at which the output portion provided on the spring and the transfer portion provided on the rotary body contact each other moves about the rotating shaft of the rotary body can be formed between the rotating shaft of the rotary body and the axis of the spring. Thus, the movement range of the contact point can be reduced, as compared to a case where the distance between the rotating shaft and the contact point is greater than or equal to the distance between the rotating shaft and the axis. As a result, the size of the clutch driving device can be reduced.

In another aspect, the clutch driving device according to the present teaching preferably includes the following configurations. In a case where the contact point is located on an imaginary line connecting the axis of the spring and the rotating shaft of the rotary body, a distance between the axis of the spring and the contact point is smaller than the distance between the rotating shaft of the rotary body and the axis of the spring.

Accordingly, each of the distance between the axis of the spring and the contact point between the output portion and the transfer portion and the distance between the contact point and the rotating shaft can be made smaller than the distance between the rotating shaft and the axis. Thus, the rotary body and the spring can be disposed in a compact size. As a result, the size of the clutch driving device can be reduced.

In another aspect, the clutch driving device according to the present teaching preferably includes the following configurations. The output portion is integrally provided to the spring.

Accordingly, the number of components of the clutch driving device can be reduced.

In another aspect, the clutch driving device according to the present teaching preferably includes the following configurations. The transfer portion moves relative to the output portion while contacting the output portion by rotation of the rotary body and deformation of the spring in the circumferential direction caused by the rotation.

Accordingly, the distance between the contact point at which the output portion provided on the spring and the transfer portion provided on the rotary body and the axis of the spring can be varied in accordance with rotation of the rotary body. Thus, it is possible to obtain a simple configuration in which the contact point approaches the axis of the spring at least once when seen in the axial direction of the spring when the rotary body rotates.

In another aspect, the clutch driving device according to the present teaching preferably includes the following configurations. The output portion includes a link that rotates relatively in accordance with rotation of the rotary body and deformation of the spring in the circumferential direction.

This can enhance flexibility in designing the clutch driving device.

In another aspect, the clutch driving device according to the present teaching preferably includes the following configurations. The clutch driving device further includes an actuator that applies a rotation torque to the rotary body.

In another aspect, the clutch driving device according to the present teaching preferably includes the following configurations. The clutch driving device further includes: a transfer mechanism that transfers the rotation torque from the actuator to the rotary body, wherein the transfer mechanism includes an input shaft that receives the rotation torque from the actuator, and the input shaft is disposed inside the spring and extends in parallel with the axis.

Accordingly, the input shaft can be disposed with space inside the spring being effectively utilized. As a result, the clutch driving device including a motor can be made compact.

In another aspect, the clutch driving device according to the present teaching preferably includes the following configurations. The actuator is a motor.

In another aspect, the clutch driving device according to the present teaching preferably includes the following configurations. The contact point between the output portion and the transfer portion moves to pass through an imaginary line connecting the axis of the spring and the rotating shaft of the rotary body when the rotary body rotates.

Accordingly, an elastic restoring force generated by deformation of the spring in the circumferential direction can be obtained in a wider range in the circumferential direction. Thus, a driving range of the clutch where the clutch can be driven with a relatively low load by an assist force can be enlarged. As a result, flexibility in driving the clutch can be enhanced.

In addition, with the configuration described above, a force exerted on the transfer portion is at maximum when the rotary body rotates so that the contact point between the output portion and the transfer portion passes through the imaginary line connecting the axis of the spring and the rotating shaft of the rotary body. Accordingly, a desired assist force can be obtained even in a configuration in which a shaft torque generated by a clutch reaction force is at maximum at a predetermined rotation position of the rotary body.

A vehicle according to one embodiment of the present teaching includes a clutch unit including any one of the configurations described above.

The terminology used herein is for the purpose of describing particular embodiments only and is not intended to be limiting to the invention.

As used herein, the term "and/or" includes any and all combinations of one or more of the associated listed items.

It will be further understood that the terms "including," "comprising" or "having" and variations thereof when used in this specification, specify the presence of stated features, steps, operations, elements, components, and/or their equivalents but do not preclude the presence or addition of one or more other features, steps, operations, elements, components, and/or groups thereof.

It will be further understood that the terms "mounted," "connected," "coupled," and/or their equivalents are used broadly and encompass both direct and indirect mounting, connecting and coupling. Further, "connected" and "coupled" are not restricted to physical or mechanical connections or couplings, and can include electrical connections or couplings, whether direct or indirect.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Embodiments of a clutch driving device and a vehicle according to present teaching are discussed herein.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

A clutch driving device according to one embodiment of the present teaching can obtain desired assist characteristics and further reduce device size from that of a device with a conventional configuration.

BRIEF DESCRIPTION OF DRAWINGS

FIG. 8 is a graph schematically showing an example of relationship between an actuator rotation angle and a shaft torque.

FIG. 11 is a cross-sectional view illustrating a friction mechanism in an enlarged manner.

FIG. 12 is a perspective view illustrating a configuration of a rotation transfer portion and a rotation plate.

FIG. 14A illustrates a clutch driving device according to a third embodiment and corresponds to FIGS. 7A, 7B, and 7C.

FIG. 14B illustrates a clutch driving device according to a third embodiment and corresponds to FIGS. 7A, 7B, and 7C.

FIG. 14C illustrates a clutch driving device according to a third embodiment and corresponds to FIGS. 7A, 7B, and 7C.

FIG. 18A illustrates a clutch driving device according to a seventh embodiment and corresponds to FIGS. 7A, 7B, and 7C.

FIG. 18B illustrates a clutch driving device according to a seventh embodiment and corresponds to FIGS. 7A, 7B, and 7C.

FIG. 18C illustrates a clutch driving device according to a seventh embodiment and corresponds to FIGS. 7A, 7B, and 7C.

FIG. 19 is a graph of the clutch driving device according to the seventh embodiment and corresponds to FIG. 8.

FIG. 20A illustrates a clutch driving device according to another embodiment and corresponds to FIGS. 7A, 7B, and 7C.

FIG. 20B illustrates a clutch driving device according to another embodiment and corresponds to FIGS. 7A, 7B, and 7C.

FIG. 20C illustrates a clutch driving device according to another embodiment and corresponds to FIGS. 7A, 7B, and 7C.

DESCRIPTION OF EMBODIMENT

Figure 1:
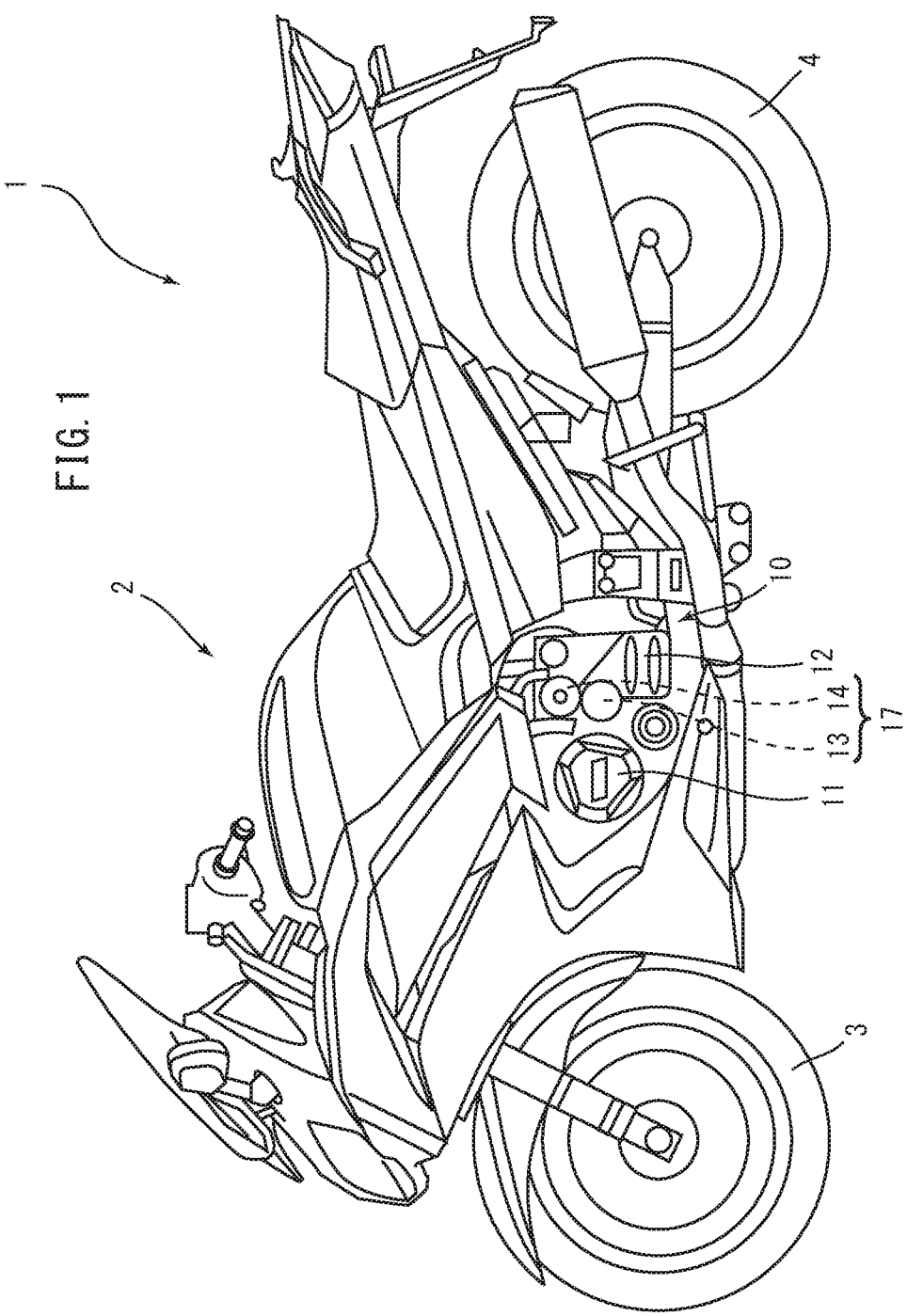
FIG. 1 is a side view of a vehicle including a clutch driving device according to a first embodiment of the present teaching.

Embodiments of the present teaching will be described hereinafter with reference to the drawings. The dimensions of components in the drawings do not strictly represent actual dimensions of the components and dimensional proportions of the components.

First Embodiment

<Overall Configuration>

FIG. 1 is a schematic view of a vehicle 1 including a clutch driving device 14 according to a first embodiment of the present teaching. The vehicle 1 is, for example, a motorcycle and includes a vehicle body 2, a front wheel 3, and a rear wheel 4. The vehicle body 2 includes an unillustrated frame. An engine unit 10 for supplying a rotation driving force to the rear wheel 4 is attached to the frame of the vehicle body 2.

The engine unit 10 includes an engine 11, a transmission 12, and a clutch unit 17. The clutch unit 17 includes a clutch 13 and a clutch driving device 14. The clutch 13 is configured to enable transfer of rotation of an unillustrated crank shaft of the engine 11 to the transmission 12. That is, the clutch 13 is configured to be switchable between transfer and non-transfer of rotation of the crank shaft to the transmission 12.

Figure 2:
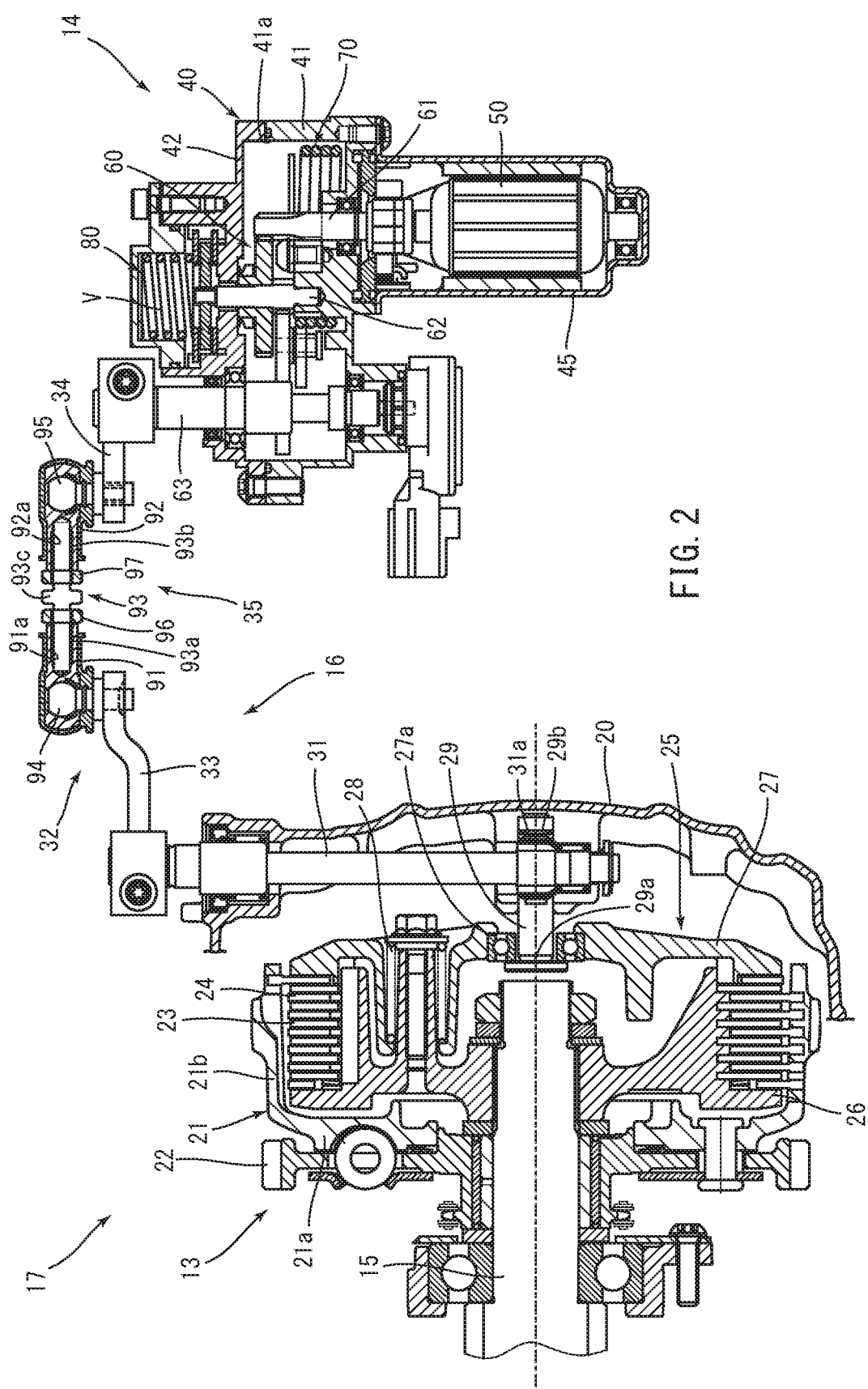
FIG. 2 is a partial cross-sectional view illustrating a schematic configuration of a clutch unit.

FIG. 2 is a partial cross-sectional view illustrating a schematic configuration of the clutch unit 17. As illustrated in FIG. 2, the clutch 13 is disposed on a main shaft 15. The main shaft 15 is, for example, an input shaft of the transmission 12. The clutch 13 includes a clutch housing 21 and a clutch inner 25 disposed inside the clutch housing 21.

The clutch housing 21 has a bottomed cylindrical shape including a bottom portion 21a through which the main shaft 15 penetrates and a cylindrical peripheral wall portion 21b disposed at the outer periphery of the bottom portion 21a. The bottom portion 21a and the peripheral wall portion 21b are integrally formed. The clutch housing 21 is disposed coaxially with the main shaft 15. The clutch inner 25 is disposed inside the peripheral wall portion 21b of the clutch housing 21.

The bottom portion 21a of the clutch housing 21 is connected to a speed-reducing gear 22. The speed-reducing gear 22 is meshed with a gear (not shown) of the crank shaft to thereby rotate together with the gear. The clutch housing 21 and the speed-reducing gear 22 rotate in accordance with rotation of the crank shaft, and are capable of rotating relative to the main shaft 15.

The clutch inner 25 includes a clutch boss 26, a pressure member 27, and a clutch spring 28. The clutch boss 26 has a columnar shape, and the main shaft 15 penetrates the center of the columnar shape. The clutch boss 26 is spline-coupled to the outer peripheral surface of the main shaft 15. Accordingly, the clutch boss 26 rotates together with the main shaft 15.

The clutch housing 21, the clutch boss 26, and the pressure member 27 are arranged in this order relative to the main shaft 15 along the axial direction of the main shaft 15 from one end thereof. The pressure member 27 is disposed outside the main shaft 15 in the axial direction to face the clutch boss 26 in the axial direction of the main shaft 15. A plurality of clutch plates 23 and a plurality of friction plates 24 are alternately arranged in the axial direction between the clutch boss 26 and the pressure member 27.

The friction plates 24 are provided to the inner peripheral surface of the clutch housing 21 to be rotatable together with the clutch housing 21. The friction plates 24 are rotatable with respect to the clutch boss 26 and the pressure member 27.

The clutch plates 23 are provided to the outer peripheral surface of the clutch boss 26 to be rotatable together with the clutch boss 26. The pressure member 27 is rotatable together with the clutch boss 26. Accordingly, the clutch plates 23 are rotatable together with the pressure member 27. The clutch plates 23 are rotatable with respect to the clutch housing 21.

The pressure member 27 is movable in the axial direction with respect to the clutch boss 26. The clutch spring 28 is disposed to push the pressure member 27 toward the clutch boss 26 in the axial direction. Accordingly, the clutch plates 23 and the friction plates 24 disposed between the clutch boss 26 and the pressure member 27 are pushed against with each other. That is, the clutch spring 28 connects the clutch plates 23 and the friction plates 24 to each other. In the state where the clutch plates 23 and the friction plates 24 described above, friction between the clutch plates 23 and the friction plates 24 causes the clutch boss 26 and the clutch housing 21 to rotate together. This state is an engaged state of the clutch 13.

A push rod 29 penetrates a center portion in the axial direction of the pressure member 27 when seen in the axial direction. The push rod 29 is oriented to extend in the axial direction. An end in the axial direction of push rod 29 is provided with a flange portion 29a. The other end of the push rod 29 in the axial direction is connected to the clutch driving device 14 through a link mechanism 16 described later. The push rod 29 is configured to be movable in the axial direction by an output of the clutch driving device 14. In a case where the push rod 29 moves in a direction away from the main shaft 15 (rightward in FIG. 3) in the axial direction, the flange portion 29a of the push rod 29 exerts a force on the pressure member 27 in a direction away from the clutch boss 26 in the axial direction. Accordingly, the clutch spring 28 deforms to be compressed so that a force with which the pressure member 27 presses the clutch plates 23 and the friction plates 24 decreases.

Consequently, a contact pressure between the friction plates 24 and the clutch plates 23 decreases. As a result, engagement between the friction plates 24 and the clutch plates 23 is canceled, and the clutch boss 26 and the clutch housing 21 rotate relative to each other. This state is a disengaged state of the clutch 13.

That is, the clutch 13 is switched between the engaged state and the disengaged state by movement of the push rod 29 in the axial direction.

The pressure member 27 is rotatable with respect to the push rod 29 with a bearing 27a interposed therebetween. Accordingly, in the engaged state of the clutch 13, the pressure member 27 rotates together with the clutch housing 21 and the clutch boss 26.

<Link Mechanism>

As illustrated in FIG. 2, the link mechanism 16 includes a rotating shaft 31 and an arm portion 32. The link mechanism 16 transfers an output of the clutch driving device 14 described later to the push rod 29 of the clutch 13.

One end of the rotating shaft 31 in the axial direction is connected to the other end of the push rod 29 in the axial direction. Specifically, this other end of the push rod 29 in the axial direction is provided with a rack portion 29b having a plurality of teeth arranged in the axial direction. The rotating shaft 31 has a gear 31a that meshes with the rack portion 29b.

With the foregoing configuration, rotation of the rotating shaft 31 causes the push rod 29 to move in the axial direction. That is, the push rod 29 reciprocates in the axial direction in accordance with the rotation direction of the rotating shaft 31.

The rotating shaft 31 is rotatably supported on a casing 20 housing the clutch 13 and the transmission 12, for example.

The arm portion 32 includes a first arm 33, a second arm 34, and an adjustment mechanism 35. Each of the first arm 33 and the second arm 34 is formed in a plate shape elongated in one direction. The first arm 33 is connected to the rotating shaft 31 to be rotatable together with the rotating shaft 31. The second arm 34 is connected to the output shaft 63 of the clutch driving device 14 to be rotatable together with the output shaft 63. The first arm 33 and the second arm 34 are connected to each other through the adjustment mechanism 35.

The arm portion 32 transfers rotation of the output shaft 63 of the clutch driving device 14 to the rotating shaft 31. The arm portion 32 transfers a driving force output from the output shaft 63 of the clutch driving device 14 to the clutch 13, and transfers a reaction force generated by, for example, the clutch spring 28 in the clutch 13 (hereinafter referred to as a clutch reaction force) to the output shaft 63 of the clutch driving device 14. That is, the output shaft 63 receives an output of the clutch driving device 14 and a clutch reaction force generated in the clutch 13.

The adjustment mechanism 35 connects the first arm 33 and the second arm 34 to each other such that the distance between these arms is adjustable. Specifically, the adjustment mechanism 35 includes a first adjustment member 91, a second adjustment member 92, and an adjustment bolt 93.

The first adjustment member 91 is rotatably connected to the first arm 33. The second adjustment member 92 is rotatably connected to the second arm 34. That is, the first adjustment member 91 and the second adjustment member 92 are rotatably connected to the first arm 33 and the second arm 34, respectively, by rod-shaped connection members 94 and 95 each having a spherical portion at one end.

The spherical portions of the connection members 94 and 95 are located inside the first adjustment member 91 and the second adjustment member 92. The connection member 94 extends from the first adjustment member 91 toward the first arm 33, and is fixed to the first arm 33 while penetrating the first arm 33. The connection member 95 extends from the second adjustment member 92 toward the second arm 34, and is fixed to the second arm 34 while penetrating the second arm 34.

The adjustment bolt 93 has a columnar shape elongated in the axial direction. The adjustment bolt 93 has screw portions 93a and 93b at both ends of the adjustment bolt 93 in the axial direction, and the screw portions 93a and 93b have helical grooves. When seen from the screw front end of the screw portion 93b, the direction in which the screw groove extends from the screw front end in the screw portion 93b is opposite to the direction in which the screw groove extends from the screw front end in the screw portion 93a. The adjustment bolt 93 includes a large-diameter portion 93c in a center portion of the adjustment bolt 93 in the axial direction, and the large-diameter portion 93c has a diameter larger than that of the other portion. The large-diameter portion 93c serves as a holding portion in rotating the adjustment bolt 93 as described later.

The first adjustment member 91 and the second adjustment member 92 have screw holes 91a and 92a. When seen from an opening end of the screw hole 92a, the direction in which the screw groove extends from the opening end in the screw hole 92a is opposite to the direction in which the screw groove extends from the opening end in the screw hole 91a. A screw portion 93a provided at one end of the adjustment bolt 93 in the axial direction is screwed to the screw hole 91a. A screw portion 93b provided at the other end of the adjustment bolt 93 in the axial direction is screwed to the screw hole 92a. Thus, the first adjustment member 91 and the second adjustment member 92 are connected to each other by the adjustment bolt 93.

As described above, the screw grooves in the screw portion 93b and the screw hole 92a extend in the direction opposite to that in the screw portion 93a and the screw hole 91a. Thus, rotation of the adjustment bolt 93 with respect to the first adjustment member 91 and the second adjustment member 92 in one way increases a fitting length of the adjustment bolt 93 relative to the first adjustment member 91 and the second adjustment member 92. On the other hand, rotation of the adjustment bolt 93 with respect to the first adjustment member 91 and the second adjustment member 92 in the opposite way reduces the fitting length of the adjustment bolt 93 relative to the first adjustment member 91 and the second adjustment member 92. Accordingly, the positions of the screw portions 93a and 93b of the adjustment bolt 93 relative to the screw holes 91a and 92a of the first adjustment member 91 and the second adjustment member 92 can be adjusted. That is, the first adjustment member 91 and the second adjustment member 92 are connected to each other such that the distance between the first adjustment member 91 and the second adjustment member 92 is adjustable by the adjustment bolt 93.

The first adjustment member 91 and the second adjustment member 92 can be fixed to the adjustment bolt 93 by fastening nuts 96 and 97 to the screw portions 93a and 93b of the adjustment bolt 93 with the distance between the first adjustment member 91 and the second adjustment member 92 adjusted by the adjustment bolt 93.

The configuration of the adjustment mechanism 35 as described above enables adjustment of the distance between the first adjustment member 91 and the second adjustment member 92, that is, between the first arm 33 and the second arm 34.

<Configuration of Clutch Driving Device>

A configuration of the clutch driving device 14 will now be described with reference to FIGS. 2 through 12. The clutch driving device 14 according to this embodiment outputs, to the clutch 13, a driving force obtained by adding an assist force of an assist mechanism 70 to an output of the motor 50 (actuator).

Figure 3:
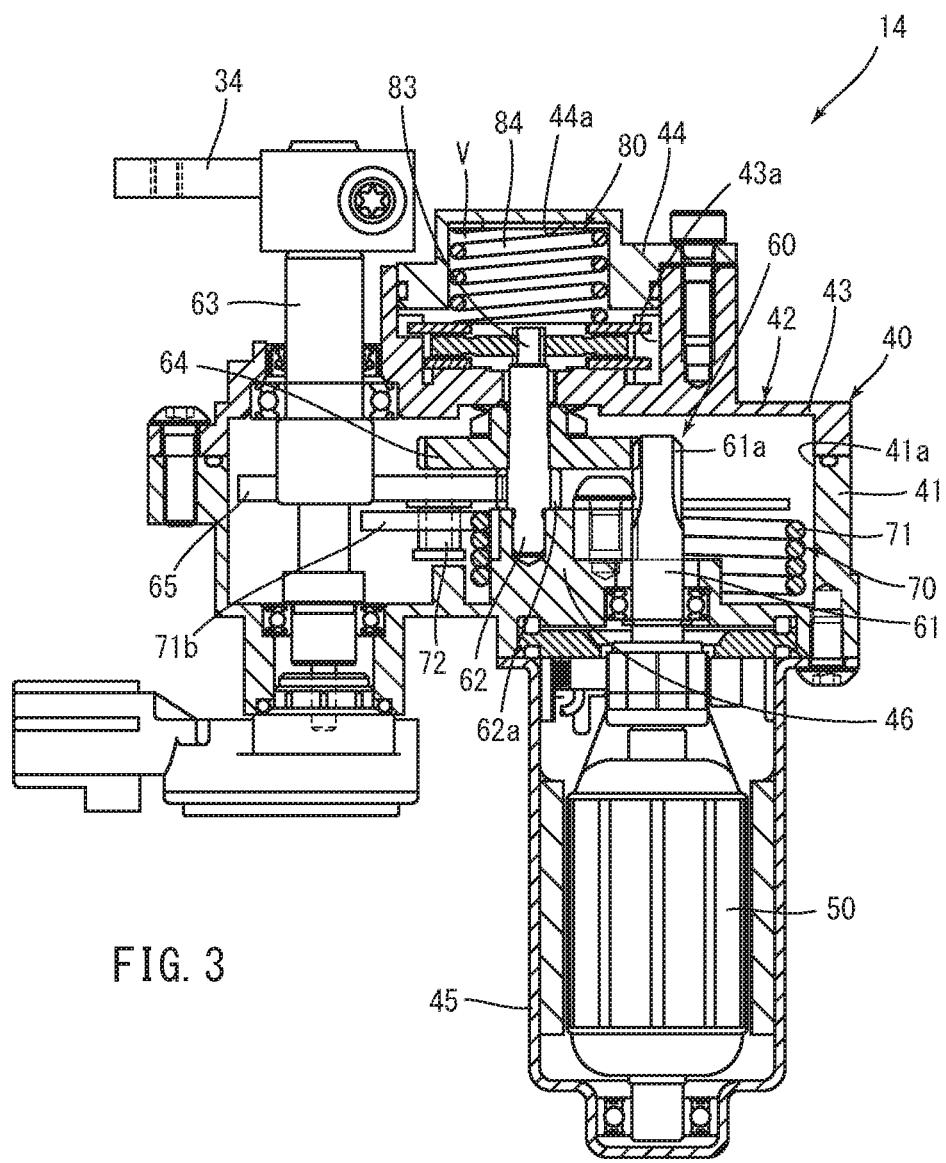
FIG. 3 is a partial cross-sectional view illustrating the clutch driving device in an enlarged manner.

FIG. 3 illustrates a schematic configuration of the clutch driving device 14 in an enlarged manner. As illustrated in FIGS. 2 and 3, the clutch driving device 14 includes the casing 40, the motor 50, a transfer mechanism 60, the assist mechanism 70, and a friction mechanism 80.

Figure 4:
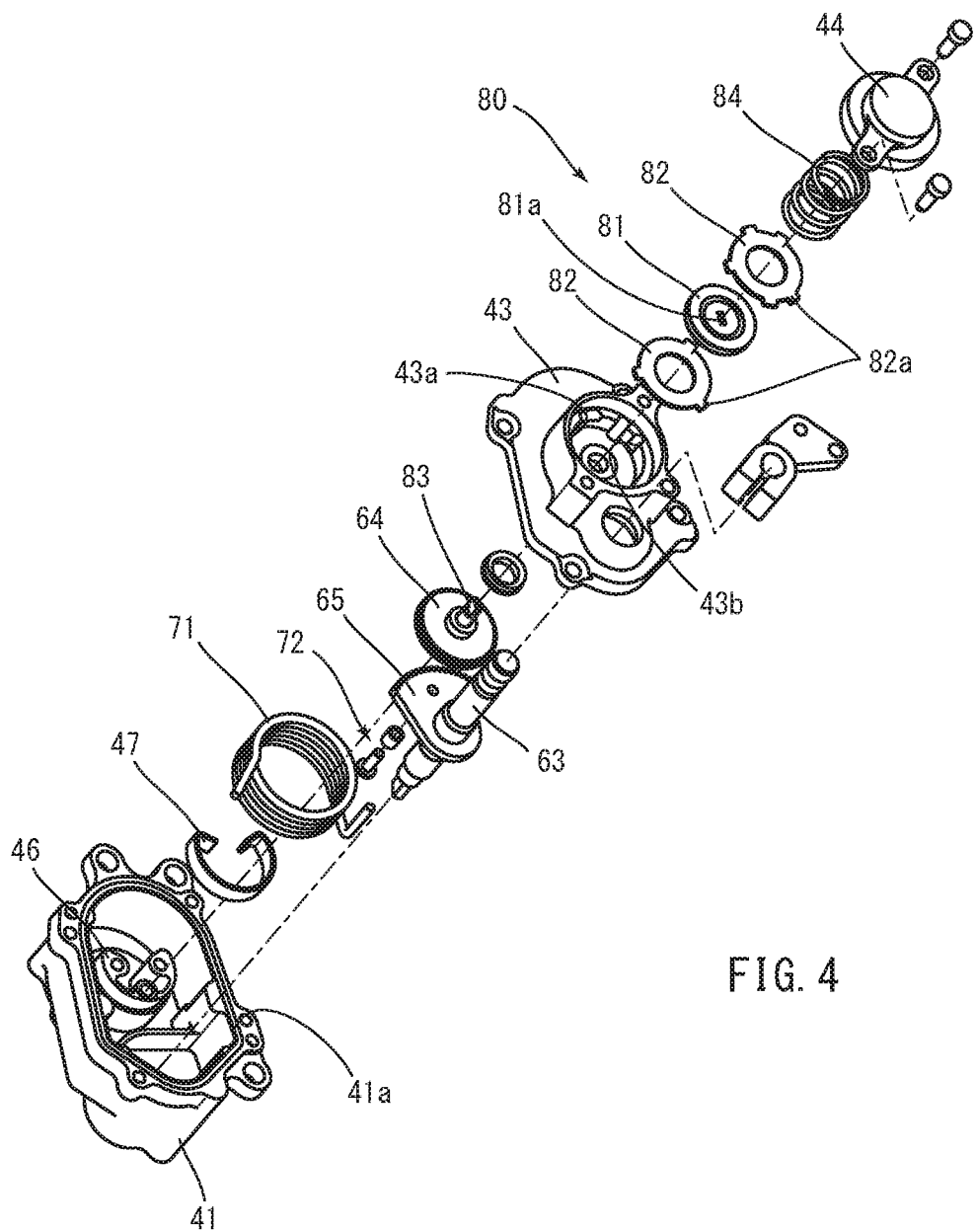
FIG. 4 is a disassembled perspective view of an assist mechanism and a friction mechanism in the clutch driving device.

The casing 40 includes a casing body 41, a cover 42, and a motor compartment 45. FIG. 4 is a disassembled perspective view illustrating a part of the clutch driving device 14 in a disassembled state. As illustrated in FIG. 4, the casing body 41 has a bottomed cylindrical shape extending in a cylinder axial direction. That is, the casing body 41 has an opening 41a. As illustrated in FIGS. 2 and 3, the casing body 41 accommodates the transfer mechanism 60 and the assist mechanism 70. As illustrated in FIG. 4, a protrusion 46 is integrally formed on the bottom of the casing body 41.

As illustrated in FIG. 3, the cover 42 covers the opening 41a of the casing body 41. The cover 42 has storage space V therein. The friction mechanism 80 is disposed in the storage space V. The cover 42 includes a cover body 43 and a storage cover portion 44. The cover body 43 has a first recess 43a constituting a part of the storage space V. The storage cover portion 44 has a second recess 44a constituting the storage space V. The first recess 43a and the second recess 44a constitute the storage space V with the cover body 43 combined with the storage cover portion 44.

The output shaft 63 of the transfer mechanism 60 described later penetrates a portion of the cover 42 different from the portion where the storage space V is formed. The output shaft 63 extends in the cylinder axial direction of the casing body 41 and outward of the casing 40. That is, the axial direction of the output shaft 63 coincides with the cylinder axial direction of the casing body 41.

As illustrated in FIGS. 2 and 3, the motor compartment 45 is connected to the bottom of the casing body 41. Specifically, the motor compartment 45 is attached to the casing body 41 at a position that does not overlap the output shaft 63 when seen in the axial direction of the output shaft 63.

The motor 50 generates an actuation driving force for actuating the clutch 13. The motor 50 is disposed in the motor compartment 45 such that an unillustrated rotating shaft extends along the axial direction of the output shaft.

The transfer mechanism 60 includes an input shaft 61, an intermediate shaft 62, and the output shaft 63. The input shaft 61, the intermediate shaft 62, and the output shaft 63 are disposed in parallel. The input shaft 61 is an output shaft of the motor 50. Thus, the intermediate shaft 62 and the output shaft 63 are disposed in parallel with the output shaft of the motor 50. That is, the input shaft 61 and the intermediate shaft 62 extend along the axial direction of the output shaft 63.

One end of the input shaft 61 in the axial direction is located in the motor compartment 45 housing the motor 50. The other end of the input shaft 61 in the axial direction is located in space defined by the casing body 41 and the cover 42. The other end of the input shaft 61 in the axial direction is provided with a gear 61a having a plurality of teeth arranged in the circumferential direction. In this embodiment, the gear 61a is a spur gear.

One end of the intermediate shaft 62 in the axial direction is rotatably supported on the casing body 41. An intermediate gear 64, which is a spur gear, is provided to the intermediate shaft 62 to be rotatable together with the intermediate shaft 62. The intermediate gear 64 meshes with the gear 61a of the input shaft 61. Accordingly, rotation of the input shaft 61 is transferred to the intermediate shaft 62 through the intermediate gear 64. That is, the intermediate shaft 62 rotates in accordance with rotation of the input shaft 61.

The intermediate shaft 62 is provided with a gear 62a having a plurality of teeth arranged in the circumferential direction at a position closer to a center in the axial direction than the one end of the intermediate shaft 62 rotatably supported on the casing body 41. In this embodiment, the gear 62a is a spur gear closer to one side in the axial direction of the intermediate shaft 62 than the intermediate gear 64 is.

The other end of the intermediate shaft 62 in the axial direction is rotatably supported on the cover 42. This other end of the intermediate shaft 62 in the axial direction is provided with a rotation transfer portion 83 of the friction mechanism 80 described later. Specifically, the other end of the intermediate shaft 62 in the axial direction is provided with the rotation transfer portion 83 having a rectangular shape in cross section (see FIG. 12). A part of the intermediate shaft 62 including the rotation transfer portion 83 (the other end of the intermediate shaft 62 in the axial direction) projects outward of the casing body 41. The rotation transfer portion 83 is inserted in a through hole 81a of a rotation plate 81 of the friction mechanism 80 described later (see FIGS. 11 and 12). As described above, by projecting the part of the intermediate shaft 62 including the rotation transfer portion 83 outward of the casing body 41, the friction mechanism 80 can be easily positioned in assembling the friction mechanism 80 to the intermediate shaft 62. Thus, assembly of the clutch driving device 14 can be performed easily. In a case where a torque in the rotation direction exerted on the intermediate shaft 62 is less than or equal to a predetermined value (e.g., a case where an output of the motor 50 is stopped), the friction mechanism 80 reduces rotation of the intermediate shaft 62 by a friction force.

As illustrated in FIG. 3, one end of the output shaft 63 in the axial direction is rotatably supported on the casing body 41, and a center portion of the output shaft 63 in the axial direction is rotatably supported on the cover 42. The other end of the output shaft 63 in the axial direction projects outward of the cover 42. This other end of the output shaft 63 in the axial direction is connected to the second arm 34 of the link mechanism 16 to be rotatable together with the second arm 34. Accordingly, rotation of the output shaft 63 is transferred to the clutch 13 through the link mechanism 16, and a clutch reaction force generated in the clutch 13 is input to the output shaft 63 through the link mechanism 16.

An output gear 65 (rotary body) having a sector shape in plan view is provided on the output shaft 63 to be rotatable together with the output shaft 63. The output gear 65 is a spur gear and meshes with the gear 62a of the intermediate shaft 62. Accordingly, rotation of the intermediate shaft 62 is transferred to the output shaft 63 through the output gear 65. That is, the output shaft 63 rotates in accordance with rotation of the intermediate shaft 62.

The output gear 65 serves as a rotary body that rotates in a disengaging direction in disengaging the clutch 13 and rotates in an engaging direction in engaging the clutch 13, using the shaft axis (rotation axis) of the output shaft 63 as a rotation center.

As described above, the output shaft 63 receives rotation of the intermediate shaft 62 of the clutch driving device 14 and also receives the clutch reaction force generated in the clutch 13.

An end of the output gear 65 in the thickness direction is provided with a columnar pin 72 (transfer portion) projecting in the thickness direction. That is, the pin 72 extends in the axial direction of the output shaft 63. In this embodiment, as illustrated in FIGS. 3 and 4, the pin 72 is provided on one of the surfaces of the output gear 65 in the thickness direction at one side of the output shaft 63 in the axial direction. That is, the pin 72 is provided on the output gear 65 such that the pin 72 extends toward the bottom of the casing body 41 with the output shaft 63 and the output gear 65 disposed in the casing 40. Thus, the pin 72 rotates about the output shaft 63 with rotation of the output gear 65 that rotates together with the output shaft 63. The pin 72 is disposed at a position shifted counterclockwise from the center of the output gear 65 in the circumferential direction of the output gear 65 when the output shaft 63 is seen from the opening of the casing body 41 (hereinafter referred to as seen from above the output shaft 63 in the axial direction) (see FIG. 5). The pin 72 contacts a first projection 71b of a spring 71 of the assist mechanism 70 described later. The pin 72 is rotatable with respect to the output gear 65. Thus, when the pin 72 moves while contacting the first projection 71b of the spring 71 as described later, the pin 72 moves relative to the first projection 71b while rotating.

As illustrated in FIG. 3, the assist mechanism 70 includes the coil spring 71 and the pin 72 described above. The spring 71 includes a wire material extending helically about an axis. The spring 71 has a cylindrical shape extending in the axial direction. The spring 71 is a so-called torsion spring that generates an elastic restoring force in a circumferential direction by twisting one end of the wire material relative to the other end of the wire material in the circumferential direction. In this embodiment, the wire material for the spring 71 is wound clockwise from a winding start end (first projection 71b) that is one end of the wire material, as illustrated in FIG. 5.

The spring 71 is disposed in the casing body 41 to surround the input shaft 61 and the intermediate shaft 62 when seen in the axial direction of the output shaft 63. The input shaft 61 is inserted in the spring 71. One end of the intermediate shaft 62 in the axial direction is rotatably supported on a part of the casing body 41 (projection 46 described later) located inside the spring 71. The axis of the spring 71 is oriented in parallel with the output shaft 63. One end of the wire material constituting the spring 71 extends toward the output shaft 63.

Figure 5:
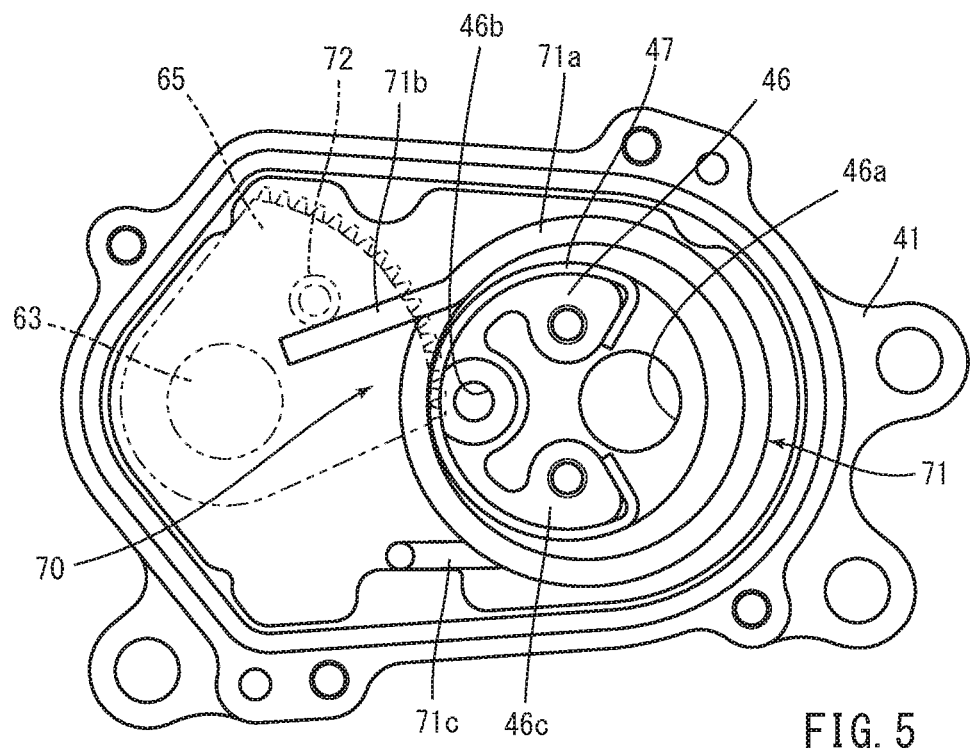
FIG. 5 is a view of the assist mechanism when seen in an axial direction of an output shaft.

FIG. 5 is a view of a schematic configuration of the assist mechanism 70 when seen in the axial direction of the output shaft 63. As illustrated in FIG. 5, the columnar projection 46 (movement restricting portion) disposed on the inner surface of the casing body 41 is located inside the spring 71. The protrusion 46 has an outer diameter smaller than the inner diameter of the spring 71. The protrusion 46 functions as a movement restricting portion that restricts radial movement of the spring 71 when the spring 71 deforms as described later. The protrusion 46 has a through opening 46a in which the input shaft 61 is inserted and an opening portion 46b in which one end of the intermediate shaft 62 in the axial direction is inserted.

The spring 71 contacts a portion of the protrusion 46 close to the output shaft 63. A circumferential part of the protrusion 46 including the portion contacting with the spring 71 is provided with a metal contact plate 47 having an arc shape when seen in the axial direction of the output shaft 63. Both ends of the contact plate 47 are fixed to the projection 46c of the protrusion 46. The spring 71 contacts the contact plate 47. The contact plate 47 provided on the protrusion 46 can reduce damage of the protrusion 46 by the spring 71 when the spring 71 operates as described later.

One end of the wire material constituting the spring 71 extends toward the output shaft 63 as described above. That is, one end of the wire material extends radially outward of the spring 71. The other end of the wire material of the spring 71 also extends radially outward of the spring 71. That is, the spring 71 includes a cylindrical coil portion 71a, a first projection 71b (output portion) including one end of the wire material and extending radially outward from the coil portion 71a, and a second projection 71c including the other end of the wire material and extending radially outward from the coil portion 71a. In this embodiment, the first projection 71b and the second projection 71c extend toward the output shaft 63 when seen in the axial direction of the output shaft 63.

Figure 6:
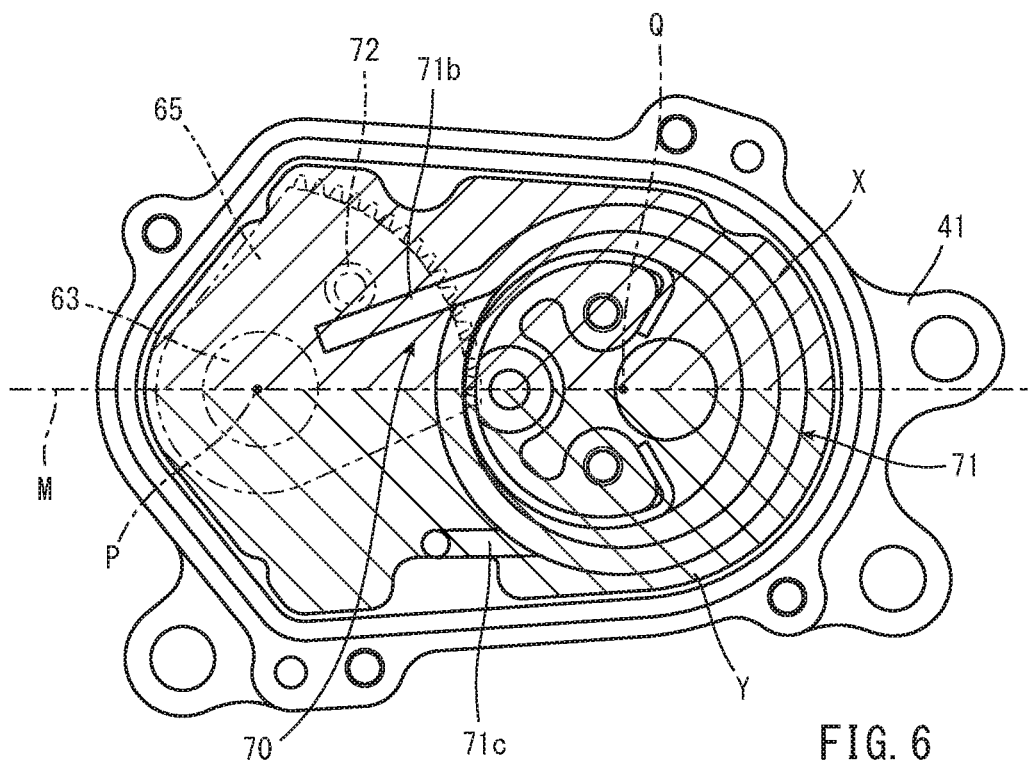
FIG. 6 illustrates regions X and Y in the assist mechanism and corresponds to FIG. 5.

The first projection 71b contacts the pin 72 provided on the output gear 65 of the output shaft 63. The second projection 71c contacts the inner surface of the casing body 41. As illustrated in FIG. 6, suppose internal space of the casing body 41 is divided into two regions X and Y by an imaginary line M connecting the shaft center of the output shaft 63 (rotation center, rotating axis) P and an axis Q of the spring 71 when seen in the axial direction of the output shaft 63 with the output gear 65 located at a position of a clutch disengaged state as described later, the first projection 71b and the second projection 71c are located in different regions in the two regions X and Y. That is, as illustrated in FIG. 6, in the state where the output gear 65 is located at a position of the clutch disengaged state, the first projection 71b of the spring 71 is located in the region X, whereas the second projection 71c is located in the region Y. The shaft center P of the output shaft 63 is located outside the spring 71 when seen in the axial direction of the spring 71. FIG. 6 is a schematic view corresponding to FIG. 5 and hatching the regions X and Y for description.

Accordingly, in the spring 71, in a case where one end of the wire material in the first projection 71b rotates in the circumferential direction of the spring 71 with the second projection 71c being in contact with the inner surface of the casing body 41, an elastic restoring force is generated in a direction in which the first projection 71b moves away from the second projection 71c. That is, in a case where the pin 72 rotates around the axis of the output shaft 63 with rotation of the output shaft 63 in such a manner that the clutch 13 changes from the clutch disengaged state to the engaged state, the first projection 71b of the spring 71 is pushed by the pin 72 in the circumferential direction of the spring 71. Accordingly, one end of the wire material of the spring 71 rotates about the axis Q of the spring 71 to approach the other end of the wire material in the second projection 71c. Such deformation of the spring 71 generates an elastic restoring force in the spring 71 in the circumferential direction of the spring 71 in a way in which the first projection 71b moves away from the second projection 71c. Since the pin 72 provided on the output gear 65 is in contact with the first projection 71b of the spring 71, the elastic restoring force generated in the spring 71 is transferred to the output gear 65 through the first projection 71b and the pin 72. Thus, the first projection 71b functions as an output portion that outputs an elastic restoring force from the spring 71. The pin 72 functions as a transfer portion that transfers the elastic restoring force to the output gear 65 when contacting the first projection 71b.

Figure 7A:
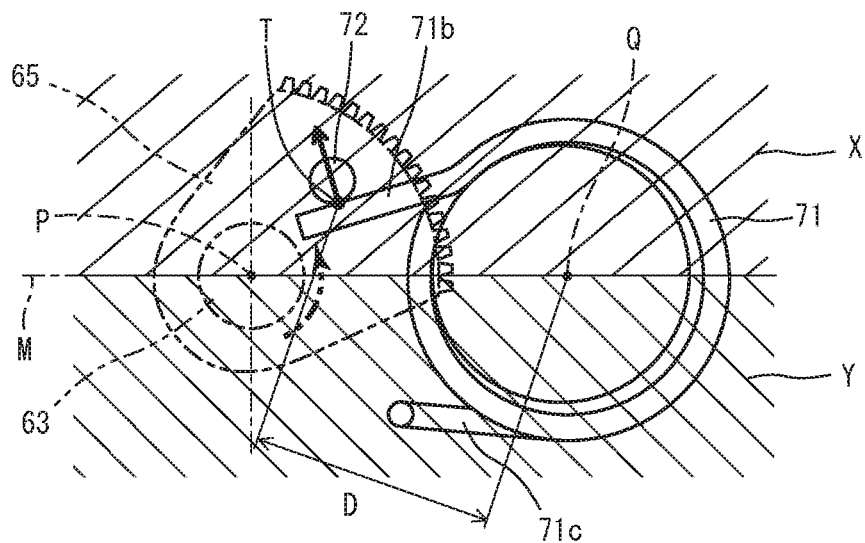
FIG. 7A schematically illustrates an example of operation of the assist mechanism.
Figure 7B:
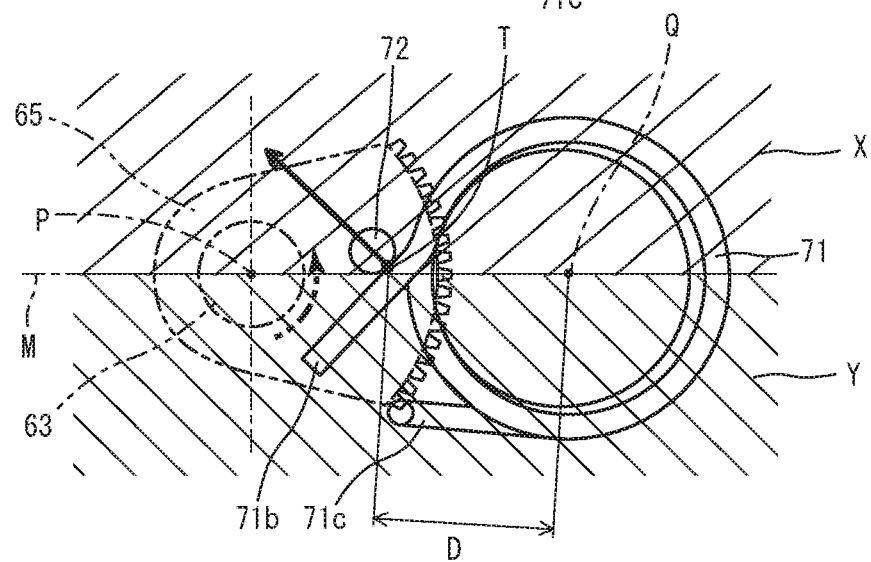
FIG. 7B schematically illustrates an example of operation of the assist mechanism.
Figure 7C:
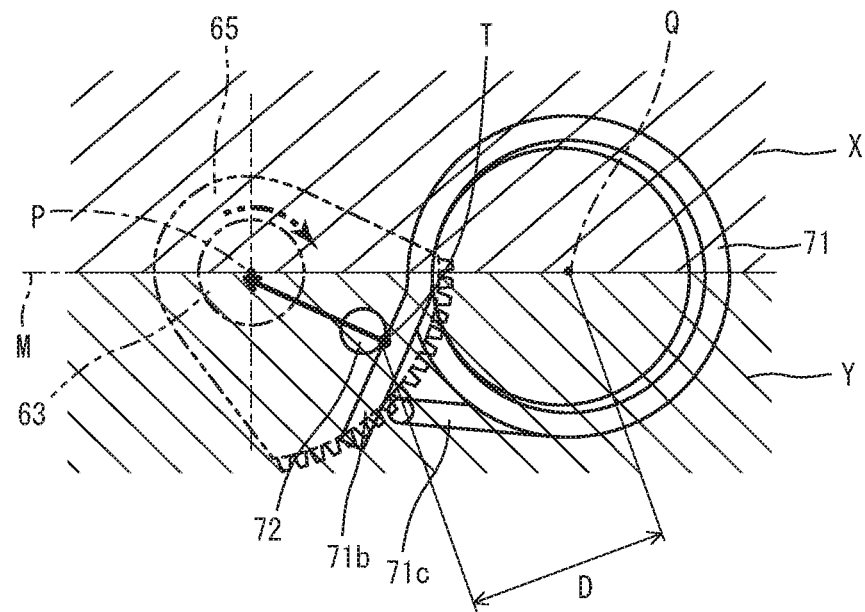
FIG. 7C schematically illustrates an example of operation of the assist mechanism.

FIGS. 7A through 7C are schematic views illustrating relationship between the rotation position of the output gear 65 and deformation of the spring 71. In these views, the output shaft 63 and the output gear 65 are represented by dot-dot-dash lines, and only the pin 72 and the spring 71 are represented by continuous lines, for description. In these views, the regions X and Y are hatched for description, in a manner similar to FIG. 6. FIGS. 7A through 7C schematically illustrate regions X and Y defined by the imaginary line M for simplifying the drawings.

As illustrated in FIGS. 7A through 7C, in a case where the pin 72 rotates about the axis of the output shaft 63 with rotation of the output gear 65, one end of the wire material of the spring 71 contacting the pin 72 is displaced in the circumferential direction of the spring 71 relative to the other end of the wire material. In this case, a contact point T between the pin 72 and the first projection 71b including one end of the wire material of the spring 71 reciprocates with respect to the first projection 71b along the first projection 71b. The contact point T is located radially outside the spring 71 when seen in the axial direction of the spring 71.

FIG. 7A illustrates a rotation position of the output gear 65 when the clutch 13 is in the disengaged state. FIG. 7B illustrates a rotation position of the output gear 65 when the clutch 13 is in a half-clutch state (a state where sliding occurs between the clutch plates 23 and the friction plates 24 but a force in the rotation direction is transferred). FIG. 7C is a rotation position of the output gear 65 when the clutch 13 is in the engaged state.

Specifically, in a case where the output gear 65 is at the rotation position illustrated in FIG. 7A when seen in the axial direction of the output shaft 63, that is, in a case where the pin 72 provided on the output gear 65 is located in the region X in the two regions X and Y obtained by dividing the internal space of the casing body 41 into two by the imaginary line M connecting the shaft center P of the output shaft 63 and the axis Q of the spring 71, the pin 72 is in contact with the first projection 71b of the spring 71 in a portion close to the front end.

Accordingly, as illustrated in FIG. 7A, a force exerted on the pin 72 by an elastic restoring force of the spring 71 is a force that causes the output gear 65 to rotate in a predetermined direction (also referred to as a rotation direction for clutch disengagement: a rotation direction indicated by an arrow of a dot-dot-dash line in FIG. 7A) such that the clutch 13 is disengaged. That is, the spring 71 applies a torque to the output gear 65 through the pin 72 in the rotation direction for clutch disengagement.

In the case of FIG. 7A, the first projection 71b of the spring 71 is not significantly displaced by the pin 72 in the circumferential direction of the spring 71. Thus, a force exerted on the pin 72 by the elastic restoring force of the spring 71 is smaller than those in the case of FIGS. 7B and 7C described later. For example, the pin 72 receives a force in a direction with a magnitude indicated by a solid arrow in FIG. 7A from the first projection 71b of the spring 71.

In a case where the output gear 65 is at the rotation position illustrated in FIG. 7B, that is, a case where the pin 72 moves closer to the imaginary line M than the position illustrated in FIG. 7A, the first projection 71b of the spring 71 is displaced such that one end of the wire material is located in the region Y, that is, one end of the wire material in the first projection 71b approaches the other end of the wire material in the second projection 71c. For example, in a case where the output gear 65 changes from the position illustrated in FIG. 7A to the position illustrated in FIG. 7B, the pin 72 approaches the coil portion 71a while contacting the first projection 71b of the spring 71.

Accordingly, the spring 71 is twisted in the circumferential direction. Consequently, the spring 71 generates an elastic restoring force in a direction in which the first projection 71b moves away from the second projection 71c. The elastic restoring force of the spring 71 is exerted on the pin 72 as indicated by the solid arrow in FIG. 7B. That is, the elastic restoring force of the spring 71 is transferred to the output gear 65 through the pin 72 as a torque in the rotation direction for clutch disengagement (the rotation direction indicated by the dot-dot-dash arrow in FIG. 7B). Accordingly, a force of assisting in the rotation direction for clutch disengagement is transferred from the spring 71 to the output gear 65 through the pin 72. At this time, a force exerted on the pin 72 from the first projection 71b of the spring 71 is larger than that in the case of FIG. 7A.

In a case where the output gear 65 is located at a rotation position illustrated in FIG. 7C, that is, in a case where the pin 72 is located in the region Y in the two regions X and Y, the first projection 71b of the spring 71 is displaced by the pin 72 to further approach the other end of the wire material in the second projection 71c. At this time, the pin 72 is located at a position closer to one end of the wire material than the position illustrated in FIG. 7B relative to the first projection 71b of the spring 71.

Accordingly, the spring 71 is further twisted in the circumferential direction. An elastic restoring force of the spring 71 is exerted on the pin 72 as indicated by the solid arrow in FIG. 7C. That is, the elastic restoring force of the spring 71 is exerted on the output gear 65 through the pin 72 in a direction in which the output gear 65 rotates to engage the clutch 13 (hereinafter referred to as a rotation direction for clutch engagement: the rotation direction indicated by a dot-dot-dash arrow in FIG. 7C). Accordingly, a force of assisting in the rotation direction for clutch engagement is transferred from the spring 71 to the output gear 65 through the pin 72.

The contact point T between the pin 72 and the first projection 71b of the spring 71 straddles the imaginary line M connecting the shaft center P of the output shaft 63 and the axis Q of the spring 71 when seen in the axial direction of the output shaft 63, in accordance with rotation of the output gear 65. The contact point T between the pin 72 and the first projection 71b moves toward the axis Q of the spring 71 at least once when seen in the axial direction of the spring 71 when the output gear 65 rotates at a position different from the shaft center P of the output shaft 63 and the axis Q of the spring 71 and in a direction in which the elastic restoring force of the spring 71 decreases (in the examples of FIGS. 7A, 7B, and 7C, when the output gear 65 rotates in the order of FIGS. 7C, 7B, and 7A). Accordingly, the elastic restoring force generated in the spring 71 can be transferred to the output gear 65 as an assist force in a direction in which the first projection 71b moves away from the second projection 71c. At this time, the elastic restoring force of the spring 71 is transferred to the output gear 65 as a torque through the first projection 71b and the pin 72.

A distance D between the contact point T and the axis Q of the spring 71 varies in accordance with rotation of the output gear 65. That is, when seen in the axial direction of the output shaft 63, the distance D is smallest when the contact point T straddles the imaginary line M and increases as the distance to the contact point T from the imaginary line M increases.

The distance between the shaft center P of the output shaft 63 and the contact point T between the first projection 71b and the pin 72 is smaller than the distance between the shaft center P and the axis Q of the spring 71. By disposing the output shaft 63 in the manner described above, the size of the clutch driving device 14 can be reduced. The distance between the axis Q of the spring 71 and the contact point T is smaller than the distance between the shaft center P of the output shaft 63 and the axis Q of the spring 71. By disposing the spring 71 in the manner described above, the size of the clutch driving device 14 can be reduced.

FIG. 8 shows relationships between a rotation angle (actuator rotation angle) of the output gear 65 and shaft torques: a torque in a rotation direction in which the torque is exerted on the output shaft 63 by a load in operating the clutch 13 (clutch load) (hereinafter referred to as a shaft torque); a shaft torque exerted on the output shaft 63 by an assist force of the assist mechanism 70; and the sum of a shaft torque generated on the output shaft 63 by a clutch load (clutch reaction force) and a shaft torque generated on the output shaft 63 by an assist force. In FIG. 8, the actuator rotation angle refers to a rotation angle of the output gear 65 with respect to an initial rotation position (the position illustrated in FIG. 7C) when seen in the axial direction of the output shaft 63 in a case where the output gear 65 rotates counterclockwise from the initial rotation position.

A rotation range of the output gear 65 is defined by the inner surface of the casing body 41. That is, a position at which the output gear 65 contacts the inner surface of the casing body 41 when the output gear 65 rotates in the rotation direction for clutch engagement is a limit rotation position of the output gear 65 in the rotation direction for clutch engagement. A position at which the output gear 65 contacts the inner surface of the casing body 41 when the output gear 65 rotates in the rotation direction for clutch disengagement is a limit rotation position of the output gear 65 in the rotation direction for clutch disengagement.

In the case of this embodiment, the actuator rotation angle increases in a case where the output gear 65 rotates in the order from FIG. 7C, FIG. 7B, and FIG. 7A when seen in the axial direction of the output shaft 63.

The clutch load is equal to a reaction force (clutch reaction force) exerted on the clutch driving device 14 from the clutch spring 28 of the clutch 13, for example, while the clutch 13 operates.

The clutch reaction force increases with an increase in the actuator rotation angle when the clutch 13 switches from the engaged state to the disengaged state. On the other hand, a shaft torque exerted on the output shaft 63 by the clutch reaction force varies to be at maximum at a predetermined actuator rotation angle as indicated by the solid line (solid line with "generated by clutch reaction force" in the drawing) in FIG. 8, depending on a lever ratio determined based on relationship in the position and length between the first arm 33 and the second arm 34 in the link mechanism 16.

Figure 9:
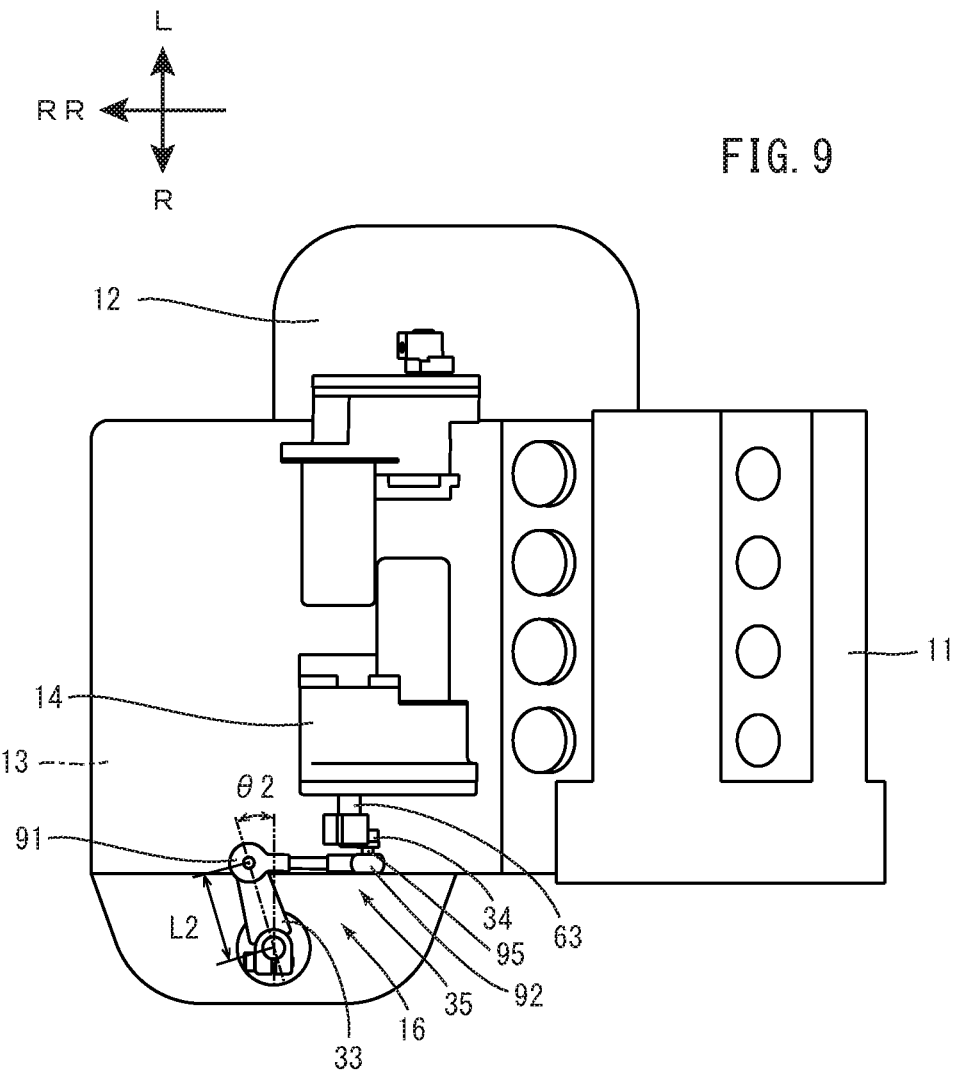
FIG. 9 is a view of an engine and the clutch unit when seen from above a vehicle.
Figure 10:
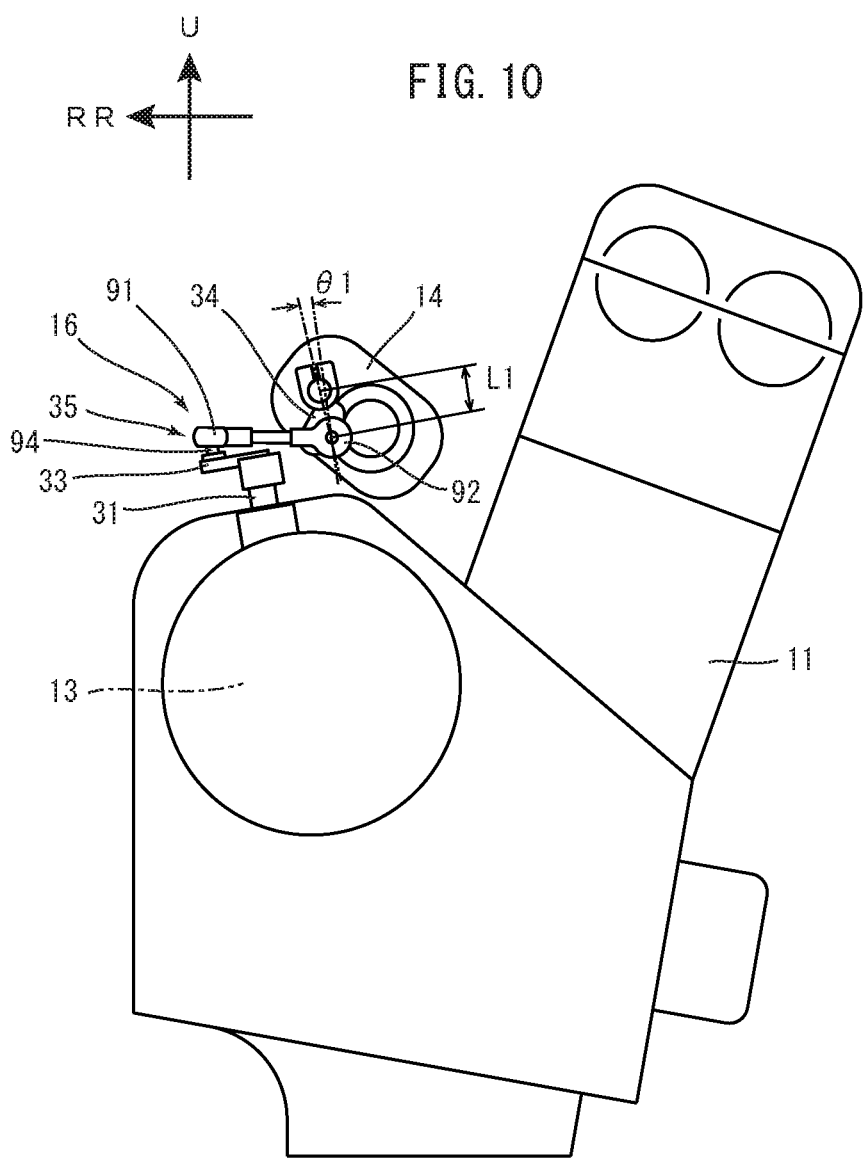
FIG. 10 is a view of the engine and the clutch unit when seen from a side of the vehicle.

The lever ratio will be described below. The lever ratio refers to a ratio between a shaft torque exerted on the output shaft 63 of the clutch driving device 14 and a shaft torque exerted on the rotating shaft 31. In this embodiment, the clutch driving device 14 is disposed relative to the engine 11 and the clutch 13 as illustrated in FIGS. 9 and 10. FIG. 9 is a view schematically illustrating the engine 11, the clutch 13, and the clutch driving device 14 when seen from above the vehicle 1. FIG. 10 is a view schematically illustrating the engine 11, the clutch 13, and the clutch driving device 14 when seen from a side of the vehicle 1. In FIGS. 9 and 10, other components are not shown for description of positional relationship among the engine 11, the clutch 13, and the clutch driving device 14, and the engine 11, the clutch 13, and the clutch driving device 14 are simplified in the illustration.

In FIGS. 9 and 10, arrow L represents a leftward direction of the vehicle 1. Arrow R in the drawings represents a rightward direction of the vehicle 1. Arrow RR in the drawings represents a rearward direction of the vehicle 1. Arrow U in the drawings represents an upward direction of the vehicle 1. The front, the rear, the left, and the right respectively refer to the front, the rear, the left, and the right when seen from a rider driving the vehicle 1.

As illustrated in FIGS. 9 and 10, the clutch driving device 14 is disposed above the clutch 13 and behind the engine 11. The clutch driving device 14 is disposed above the clutch 13 and at the right of the clutch 13 when seen from above the vehicle 1. The clutch driving device 14 is disposed such that the axial direction of the output shaft 63 extends along the left-right direction (lateral direction) of the vehicle 1. The clutch 13 is disposed such that the axial direction of the rotating shaft 31 extends along the top-bottom direction (vertical direction) of the vehicle 1.

The clutch driving device 14 is connected to the clutch 13 through the link mechanism 16. Specifically, one end of the first arm 33 of the link mechanism 16 is connected to the rotating shaft 31 and extends toward the left of the vehicle 1. One end of the second arm 34 of the link mechanism 16 is connected to the output shaft 63 of the clutch driving device 14 and extends toward the bottom of the vehicle 1. The adjustment mechanism 35 of the link mechanism 16 connects the first arm 33 and the second arm 34 to each other such that the first arm 33 and the second arm 34 are rotatable. The first adjustment member 91 and the second adjustment member 92 of the adjustment mechanism 35 are respectively connected to the plate-shaped first arm 33 and the plate-shaped second arm 34 in the thickness direction. Accordingly, the first adjustment member 91 and the second adjustment member 92 are disposed such that the axes of the rod-shaped connection members 94 and 95 are skewed to each other. In FIGS. 9 and 10, the configuration of the link mechanism 16 is simplified.

In the arrangement of the link mechanism 16 as described above, a lever ratio rt that is a ratio between a shaft torque exerted on the output shaft 63 of the clutch driving device 14 and a shaft torque exerted on the rotating shaft 31 is obtained by the equation below. In the equation, the lever ratio rt is obtained on the assumption that a tilt of the adjustment mechanism 35 does not change when the link mechanism 16 operates.

$$rt = \cos θ2 / \cos θ1 \times L2/L1 \quad (1)$$

Where θ1 is an angle formed by the second arm 34 with respect to a reference line parallel to the axis of the rotating shaft 31 when the link mechanism 16 is seen from a side of the vehicle 1 (see FIG. 10), and θ2 is an angle formed by the first arm 33 with respect to a reference line parallel to the axis of the output shaft 63 when the link mechanism 16 is seen from above the vehicle 1 (see FIG. 9). In addition, L1 is a length of the second arm 34, and L2 is a length of the first arm 33.

In Equation (1), as the angle θ1 of the second arm 34 increases, cos θ1 decreases, and thus, the lever ratio rt increases. Accordingly, when the rotation angle of the output shaft 63 of the clutch driving device 14 increases, the lever ratio rt increases. That is, when the rotation angle (actuator rotation angle) of the output gear 65 that rotates together with the output shaft 63 increases, the lever ratio rt increases.

The clutch reaction force increases as the actuator rotation angle increases, and in a case where the actuator rotation angle is large, the amount of increase in a clutch reaction force with respect to the amount of increase in the actuator rotation angle is small as compared to a case where the actuator rotation angle is small. On the other hand, a shaft torque generated on the output shaft 63 when the clutch reaction force is exerted on the output shaft 63 decreases as the lever ratio rt increases. Thus, the shaft torque decreases as the actuator rotation angle increases.

For the foregoing reasons, as illustrated in FIG. 8, the shaft torque generated on the output shaft 63 by the clutch reaction force increases with an increase in the actuator rotation angle in the case where the actuator rotation angle is small, whereas when the actuator rotation angle exceeds a predetermined actuator rotation angle, the shaft torque decreases with an increase in the actuator rotation angle. That is, the shaft torque varies and is at maximum at the predetermined actuator rotation angle.

In this embodiment, in FIG. 8, in a case where the actuator rotation angle is smaller than S, the clutch 13 is in the engaged state. On the other hand, in FIG. 8, when the actuator rotation angle exceeds S, the clutch 13 shifts from the engaged state to the disengaged state. In FIG. 8, S denotes an actuator rotation angle at which the clutch 13 starts disengagement in a case where the actuator rotation angle increases and also denotes an actuator rotation angle at which engagement of the clutch plates 23 of the clutch 13 and the friction plates 24 finish engagement in a case where the actuator rotation angle decreases.

In FIG. 8, a range where the shaft torque exerted on the output shaft 63 is positive (larger than zero in FIG. 8) is a shaft torque range where the clutch 13 is engaged, and a range where the shaft torque exerted on the output shaft 63 is negative (smaller than zero in FIG. 8) is a shaft torque range where the clutch 13 is disengaged.

In the assist mechanism 70, rotation (actuation driving force) of the motor 50 causes the rotation position of the output gear 65 to change such that the actuator rotation angle increases, that is, changes the rotation position in the order of FIG. 7C, FIG. 7B, and FIG. 7A. Accordingly, a force exerted on the pin 72 of the output gear 65 from the spring 71 changes parabolically and is at maximum at a predetermined actuator rotation angle. Consequently, a shaft torque exerted on the output shaft 63 by an assist force of the clutch driving device 14 (indicated by the solid line represented as "generated by assist force" in FIG. 8) changes parabolically and is also at maximum at the predetermined actuator rotation angle.

As described above, the magnitude of the elastic restoring force of the spring 71 exerted on the pin 72 of the output gear 65 as an assist force in the rotation direction for clutch disengagement varies depending on the rotation position of the output gear 65. This is because a change of the contact point T between the first projection 71b of the spring 71 and the pin 72 along the first projection 71b in accordance with the rotation position of the output gear 65 causes the direction of a force exerted on the pin 72 from the first projection 71b to vary, and also causes the distance D between the contact point T between the pin 72 and the first projection 71b of the spring 71 and the axis Q of the spring 71 to vary.

In this embodiment, as illustrated in FIG. 8, the shaft torque exerted on the output shaft 63 by driving of the motor 50 and the assist mechanism 70, that is, the assist force of the clutch driving device 14, is mainly a shaft torque that disengages the clutch 13 (shaft torque in the negative region in FIG. 8).

In the case where the actuator rotation angle increases, the shaft torque exerted on the output shaft 63 by a clutch reaction force generated in operating the clutch 13 starts being generated at an actuator rotation angle at which the clutch 13 starts shifting from the engaged state to the disengaged state (S in FIG. 8). The shaft torque exerted on the output shaft 63 by the clutch reaction force is generated by a force that causes the output shaft 63 to rotate in a predetermined direction (hereinafter referred to as a rotation direction for clutch engagement) so as to engage the clutch 13. The clutch reaction force is generated by, for example, an elastic restoring force of the clutch spring 28 of the clutch 13.

A shaft torque exerted on the output shaft 63 by the clutch reaction force also varies parabolically at the lever ratio described above and is at maximum at an intended actuator rotation angle, as illustrated in FIG. 8.

Accordingly, a shaft torque as the sum of the shaft torque exerted on the output shaft 63 by the assist mechanism 70 and the shaft torque exerted on the output shaft 63 by the clutch reaction force generated in the clutch 13 has a relatively small value relative to an actuator rotation angle, as indicated by the bold line in FIG. 8. That is, the sum of the shaft torques is within a certain range in a half-clutch region illustrated in FIG. 8 (the range of the actuator rotation angle in the half-clutch state). Accordingly, the half-clutch state of the clutch 13 can be obtained in the output shaft 63 by a relatively small and stable shaft torque. The sum of the shaft torques is an actuation driving force of the motor 50 necessary for actuating the clutch 13.

That is, as described above, with an assist force generated by the assist mechanism 70, the clutch 13 can be easily switched from the engaged state to the disengaged state, and a stable half-clutch state can be obtained.

<Friction Mechanism>

Next, a configuration of the friction mechanism 80 will be described with reference to FIGS. 2 through 4, 11, and 12. FIG. 11 is a view illustrating the friction mechanism 80 in an enlarged manner. FIG. 12 is a perspective view illustrating a configuration of the rotation transfer portion and the rotation plate. In a case where a torque exerted on the intermediate shaft 62 of the transfer mechanism 60 in the rotation direction is a predetermined value or less, the friction mechanism 80 holds the intermediate shaft 62 in a stationary state by friction between the rotation plate 81 and a pair of friction plates 82. Accordingly, even when driving of the motor 50 is stopped while the vehicle is stopped, for example, the friction mechanism 80 can hold a disengaged state of the clutch 13.

Specifically, the friction mechanism 80 includes the rotation plate 81, the pair of friction plates 82, the rotation transfer portion 83 provided at one end of the intermediate shaft 62, and a spring 84. The friction mechanism 80 is disposed in the storage space V defined in the cover 42 of the clutch driving device 14. Specifically, as also illustrated in FIG. 3, the friction mechanism 80 is disposed between the cover body 43 and the storage cover portion 44. Thus, in this embodiment, as illustrated in FIGS. 2 and 3, the friction mechanism 80 is disposed such that the transfer mechanism 60 is located between the friction mechanism 80 and the motor 50 in the axial direction of the output shaft 63. Accordingly, the friction mechanism 80 can be made compact without interference with the motor 50.

As illustrated in FIGS. 2 through 4 and 11, the pair of friction plates 82 is disposed at both sides in the thickness direction of the rotation plate 81. That is, the pair of friction plates 82 and the rotation plate 81 are stacked in the order of the friction plate 82, the rotation plate 81, and the friction plate 82 in the thickness direction of the friction plates 82. Each of the friction plates 82 is a hollow disc member. At least one of both surfaces in the thickness of this hollow disc member contacting the rotation plate 81 has a friction coefficient with which a predetermined friction force is obtained when the surface contacts the rotation plate 81. Specifically, each of the friction plates 82 is made of, for example, a stainless plate member whose surfaces are polished. The pair of friction plates 82 and the rotation plate 81 are disposed in the first recess 43a provided in the cover body 43. One of the pair of friction plates 82 is in contact with the inner surface of the first recess 43a of the cover body 43.

As illustrated in FIG. 4, each of the pair of friction plates 82 has a plurality of positioning protrusions 82a on an outer peripheral portion thereof. The positioning protrusions 82a are disposed in positioning recesses 43b formed in the inner surface of the first recess 43a with the pair of friction plates 82 disposed in the first recess 43a of the cover body 43. This configuration can reduce rotation of the pair of friction plates 82 together with the rotation plate 81.

The rotation plate 81 is a disc-shaped metal member. As illustrated in FIG. 12, the rotation plate 81 has a through hole 81a (opening portion) formed in a center portion (rotation center) of the rotation plate 81 and penetrating the rotation plate 81 in the thickness direction. The through hole 81a is rectangular when seen in the thickness direction of the rotation plate 81. The rotation transfer portion 83 disposed at one end of the intermediate shaft 62 penetrates the through hole 81a.

The rotation plate 81 has a contact portion 81b located in an outer peripheral portion of the disc-shaped rotation plate 81 when seen in the thickness direction, and the contact portion 81b contacts the pair of friction plates 82. The contact portion 81b has a thickness larger than the thickness of a center portion of the rotation plate 81. That is, the contact portion 81b projects from the center portion of the rotation plate 81 in the thickness direction of the rotation plate 81. Accordingly, the contact portion 81b of the rotation plate 81 contacts the pair of friction plates 82 with the rotation plate 81 disposed between the pair of friction plates 82.

As described above, the rotation transfer portion 83 is disposed at an end of the intermediate shaft 62 in the axial direction. The rotation transfer portion 83 has a columnar shape that is rectangular in cross section. The rotation transfer portion 83 is formed to be insertable in the through hole 81a of the rotation plate 81. Accordingly, in a case where the intermediate shaft 62 rotates with the rotation transfer portion 83 inserted in the through hole 81a of the rotation plate 81, rotation of the intermediate shaft 62 is transferred to the rotation plate 81 through the rotation transfer portion 83. Thus, the friction mechanism 80 generates a friction force in a direction opposite to the rotation direction of rotation transferred by the transfer mechanism 60.

In FIG. 12, character Z is an axis of the intermediate shaft 62. The axial direction in which this axis Z extends is the same direction as the axial direction of the output shaft 63. The expression that the direction of the axis (axial direction) of the intermediate shaft 62 is the same as the axial direction of the output shaft 63 includes a case where these the axial direction of the intermediate shaft 62 is not completely the same as the axial direction of the output shaft 63 as long as rotation can be transferred between the intermediate shaft 62 and the output shaft 63.

The rotation transfer portion 83 provided in the intermediate shaft 62 is inserted in the through hole 81a of the rotation plate 81 described above so that friction mechanism 80 is thereby separated from a transfer path of power from the input shaft 61 to the output shaft 63 in the transfer mechanism 60. That is, the friction mechanism 80 is not included in the transfer mechanism 60, but is separated from the transfer mechanism 60.

With the configuration described above, movement of the rotation plate 81 relative to the rotation transfer portion 83 in the axial direction of the intermediate shaft 62 can be permitted while rotation of the intermediate shaft 62 is transferred to the rotation plate 81 through the rotation transfer portion 83. Accordingly, even in a case where the rotation plate 81 is tilted or displaced in the axial direction of the intermediate shaft 62, for example, the rotation plate 81 can be relatively displaced from the rotation transfer portion 83.

The spring 84 includes a wire material extending helically about the axis. The spring 84 has a cylindrical shape extending in the axial direction. The spring 84 is a compression spring that generates an elastic restoring force when being compressed in the axial direction. The spring 84 is disposed in the storage cover portion 44 such that the axial direction coincides with the axial direction of intermediate shaft 62. That is, the axis of the spring 84 extends in the same direction as the axial direction of the output shaft 63.

The spring 84 is disposed with respect to the pair of friction plates 82 and the rotation plate 81 such that the axis of the spring 84 coincides with the thickness direction of the pair of friction plates 82 and the rotation plate 81. One end toward one direction along the axis of the spring 84 contacts one of the pair of friction plates 82 toward the other end in the axial direction. That is, the pair of friction plates 82 and the rotation plate 81 are located closer to the rotation transfer portion 83 than the spring 84 is. In addition, one of the pair of friction plates 82 toward the one direction along the axis contacts the inner surface of the first recess 43a of the cover body 43. Accordingly, the spring 84 applies a force on the pair of friction plates 82 and the rotation plate 81 in the thickness direction. Thus, the pair of friction plates 82 and the rotation plate 81 are pressed in the thickness direction between the spring 84 and the inner surface of the first recess 43a of the cover body 43.

With the foregoing configuration, a friction force is generated between the pair of friction plates 82 and the rotation plate 81 pressed by the spring 84 in the thickness direction. Accordingly, a force that suppresses rotation is exerted on the rotation plate 81 rotating together with the intermediate shaft 62, by a friction force between the rotation plate 81 and the pair of friction plates 82. Thus, in a case where a force in the rotation direction exerted on the intermediate shaft 62 is less than or equal to the friction force between the rotation plate 81 and the pair of friction plates 82, the friction force suppresses rotation of the rotation plate 81 and the intermediate shaft 62.

As described above, in FIG. 8, the sum of the shaft torque generated by an assist force of the clutch driving device 14 and the shaft torque generated by a clutch reaction force of the clutch 13 (indicated by the bold solid line in FIG. 8) is a shaft torque exerted on the output shaft 63 of the clutch driving device 14. In FIG. 8, a range of a shaft torque with which rotation of the rotation plate 81 and the intermediate shaft 62 stops by the friction force between the rotation plate 81 and the pair of friction plates 82 is indicated by dot-dot-dash lines. That is, in the shaft torque exerted on the output shaft 63, rotation of the rotation plate 81 and the intermediate shaft 62 is suppressed by the friction force between the rotation plate 81 and the pair of friction plates 82 in the range indicated by the dot-dot-dash lines (less than or equal to a predetermined value).

In a case where driving of the motor 50 is stopped, the clutch plates 23 and the friction plates 24 are subjected to a force with which the clutch plates 23 and the friction plates 24 are pushed against each other by the clutch spring 28 such that the clutch 13 is engaged. On the other hand, the friction mechanism 80 with the configuration described above provided in the clutch driving device 14 stops operation of the transfer mechanism 60 of the clutch driving device 14 even while driving of the motor 50 is stopped. Accordingly, the clutch 13 does not operate. Thus, with the configuration described above, a self-lock mechanism capable maintaining an operation state (the half-clutch state or the disengaged state) of the clutch 13 without change can be obtained.

In other words, the self-lock mechanism as described above can be obtained by setting a clutch reaction force and an assist force to be input to the output shaft 63 of the clutch driving device 14 such that the sum of the shaft torques generated on the output shaft 63 is the predetermined value or less as illustrated in FIG. 8. That is, the assist force input from the spring 71 to the output shaft 63 in switching the clutch 13 from the engaged state to the disengaged state becomes maximum after the clutch reaction force is input to the output shaft 63 from the clutch 13, or the assist force input from the spring 71 to the output shaft 63 in switching the clutch 13 from the disengaged state to the engaged state becomes maximum before the clutch reaction force input to the output shaft 63 from the clutch 13 becomes zero, so that the sum of the shaft torques generated on the output shaft 63 can be thereby the predetermined value or less, and the self-lock mechanism as described above can be obtained.

In addition, as described above, insertion of the rotation transfer portion 83 of the intermediate shaft 62 into the through hole 81a of the rotation plate 81 allows displacement of the rotation plate 81 relative to the intermediate shaft 62 in directions except the rotation direction. Accordingly, even in a case where the intermediate shaft 62 tilts, for example, rotation of the intermediate shaft 62 can be transferred to the rotation plate 81 with a tilt of the rotation plate 81 prevented. In this manner, it is possible to rotate the rotation plate 81 by the intermediate shaft 62 while ensuring contact of the rotation plate 81 with the pair of friction plates 82.

Furthermore, with the configuration described above, the rotation plate 81, the friction plates 82, and the spring 84 of the friction mechanism 80 assembled in the cover 42 can be attached to the inside of the casing body 41. As a result, workability in assembly of the friction mechanism 80 can be enhanced.

Moreover, the casing housing the friction mechanism 80 is constituted by a part of the cover 42 of the clutch driving device 14. This makes the entire configuration of the clutch driving device 14 compact.

The clutch driving device 14 according to this embodiment is a clutch driving device that supplies an assist force for assisting operations of disengagement and engagement of the clutch 13. The clutch driving device 14 according to this embodiment includes: the spring 71 that extends helically about the axis Q and deforms in a circumferential direction when seen in an axial direction to thereby generate an elastic restoring force in the circumferential direction; the first projection 71b that is disposed at one end of the spring 71 and outputs the elastic restoring force from the spring 71; the protrusion 46 that restricts radial movement of the spring 71 when the spring 71 deforms in the circumferential direction; the output gear 65 that rotates in a disengaging direction in disengaging the clutch and rotates in an engaging direction in engaging the clutch, about a rotation axis that is the shaft center P of the output shaft 63 located at a position different from the axis Q of the spring 71 and extending in parallel with the axis Q; and the pin 72 that is provided to the output gear 65 to be rotatable together with the output gear 65 and contacts the first projection 71b to thereby transfer the elastic restoring force to the output gear 65. The output gear 65 receives a reaction force generated by operations of engagement and disengagement of the clutch 13 as a torque, and receives the elastic restoring force generated by deformation of the spring 71 in the circumferential direction as the assist force through the first projection 71b and the pin 72. When the output gear 65 rotates at a position different from the shaft center P of the output shaft 63 and the axis Q of the spring 71 and in a direction in which the elastic restoring force of the spring 71 decreases, the contact point T between the first projection 71b and the pin 72 approaches the axis Q at least once when seen in the axial direction of the spring 71.

For the spring 71 that extends helically about the axis Q and deforms in the circumferential direction when seen along the axis Q to thereby generate an elastic restoring force, the protrusion 46 restricts radial movement of the spring 71 so that the elastic restoring force of the spring 71 can be applied to the output gear 65 as an assist force and space for movement of the spring 71 is not necessary in the device. As a result, the size of the clutch driving device can be reduced.

In addition to the configuration described above, when the output gear 65 rotates at a position different from the shaft center P of the output shaft 63 and the axis Q of the spring 71 and in a direction in which the elastic restoring force of the spring 71 decreases, the contact point T between the first projection 71b at one end of the spring 71 and the pin 72 disposed on the output gear 65 is caused to approach the axis Q at least once when seen in the axial direction of the spring 71. Accordingly, the elastic restoring force generated in the spring 71 can be transferred to the output gear 65 as an assist force in a direction in which the first projection 71b moves away from the second projection 71c. At this time, the elastic restoring force of the spring 71 is transferred to the output gear 65 as a torque through the first projection 71b and the pin 72.

The configuration described above can further reduce the size of the device as compared to a device with a conventional configuration while supplying a desired assist force to the clutch 13.

In this embodiment, the shaft center P of the output shaft 63 is located outside the spring 71 when seen in the axial direction of the spring 71. In a case where the shaft center P of the output shaft 63 is located inside the spring 71 when seen in the axial direction of the spring 71, the spring 71 needs to have such a diameter that includes the output shaft, the first projection, and the pin. On the other hand, the above-described configuration in which the shaft center P of the output shaft 63 is located outside the spring 71 when seen in the axial direction can reduce the size of the spring 71. As a result, the size of the spring 71 can be reduced.

In this embodiment, the contact point T between the first projection 71b of the spring 71 and the pin 72 is located radially outside the spring 71 when seen in the axial direction. Accordingly, the size of the spring 71 can be reduced, as compared to a case where the contact point T is located radially inside the spring 71 when seen in the axial direction of the spring 71.

In this embodiment, the distance between the shaft center P of the output shaft 63 and the contact point T between the first projection 71b and the pin 72 is smaller than the distance between the shaft center P and the axis Q of the spring 71.

Accordingly, a range where the contact point T at which the first projection 71b provided on the spring 71 and the pin 72 provided on the output gear 65 contact each other moves about the shaft center P of the output shaft 63 can be formed between the shaft center P and the axis Q of the spring 71. Thus, as compared to a case where the distance between the shaft center P of the output shaft 63 and the contact point T is greater than or equal to the distance between the shaft center P and the axis Q, the range of movement of the contact point T can be reduced. Thus, the size of the clutch driving device 14 can be reduced.

In this embodiment, in a case where the contact point T is located on the imaginary line M, the distance between the axis Q of the spring 71 and the contact point T is smaller than the distance between the shaft center P of the output shaft 63 and the axis Q of the spring 71.

Accordingly, each of the distance from the axis Q of the spring 71 to the contact point T between the first projection 71b and the pin 72 and the distance between the contact point T and the shaft center P of the output shaft 63 can be made smaller than the distance between the shaft center P and the axis Q. Thus, the output gear 65 and the spring 71 can be disposed in a compact size. As a result, the size of the clutch driving device 14 can be reduced.

In this embodiment, the first projection 71b is integrally provided to the spring 71. Accordingly, the number of components of the clutch driving device 14 can be reduced.

In this embodiment, rotation of the output gear 65 and deformation of the spring 71 in the circumferential direction caused by the rotation causes the pin 72 to move relative to the first projection 71b while bringing the pin 72 into contact with the first projection 71b.

Accordingly, the distance from the axis Q of the spring 71 to the contact point T at which the first projection 71b provided in the spring 71 contacts the pin 72 provided on the output gear 65 can be caused to vary depending on rotation of the output gear 65. Thus, it is possible to obtain a simple configuration in which the contact point T approaches the axis Q of the spring 71 at least once when seen in the axial direction of the spring 71 when the output gear 65 rotates.

In this embodiment, the clutch driving device 14 further includes the transfer mechanism 60 that transfers a rotation torque from the motor 50 to the output gear 65. The transfer mechanism 60 includes the input shaft 61 that receives the rotation torque from the motor 50. The input shaft 61 is disposed inside the spring 71 and extends in parallel with the axis Q.

Accordingly, the input shaft 61 can be disposed with space inside the spring 71 being effectively utilized. As a result, the clutch driving device 14 including the motor 50 can be made compact.

In this embodiment, when the output gear 65 rotates, the contact point T between the first projection 71b of the spring 71 and the pin 72 moves so as to pass through the imaginary line M connecting the axis Q of the spring 71 and the shaft center P of the output shaft 63.

Accordingly, an elastic restoring force generated by deformation of the spring 71 in the circumferential direction can be obtained in a wider range in the circumferential direction. Thus, a driving range of the clutch 13 where the clutch 13 can be driven with a relatively low load by an assist force can be enlarged. As a result, flexibility in driving the clutch 13 can be enhanced.

In addition, with the configuration described above, a force exerted on the pin 72 becomes maximum when the output gear 65 rotates to cause the contact point T between the first projection 71b and the pin 72 to pass through the imaginary line M connecting the axis Q of the spring 71 and the shaft center P of the output shaft 63. Accordingly, a desired assist force can be obtained even in a configuration in which a shaft torque generated by a clutch reaction force is at maximum at a predetermined rotation position of the output gear 65.

Second Embodiment

Figure 13A:
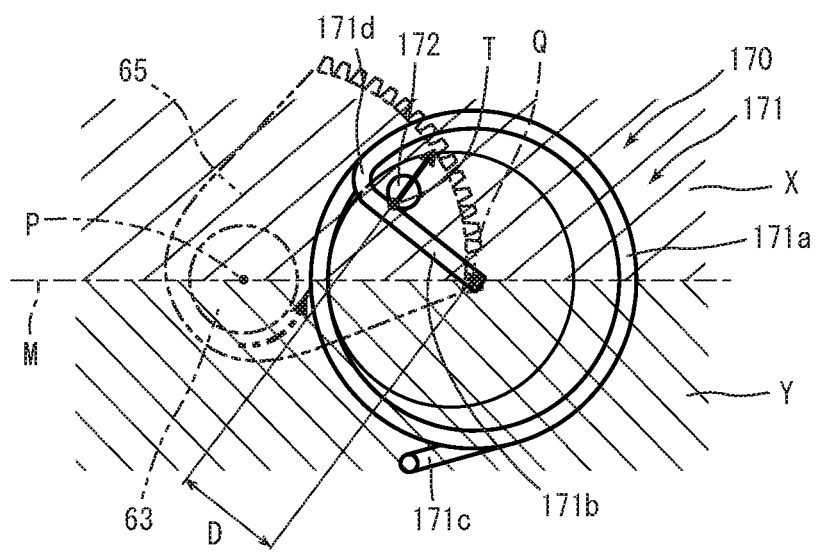
FIG. 13A illustrates a clutch driving device according to a second embodiment and corresponds to FIGS. 7A, 7B, and 7C.
Figure 13B:
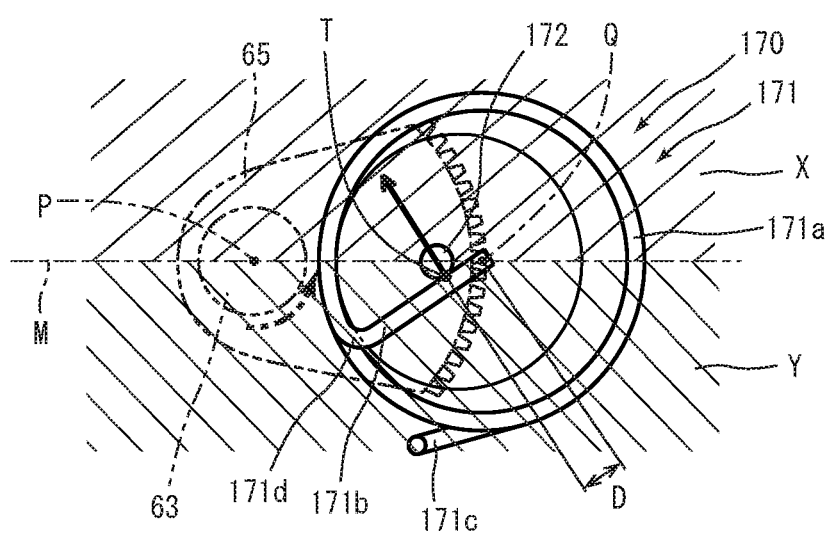
FIG. 13B illustrates a clutch driving device according to a second embodiment and corresponds to FIGS. 7A, 7B, and 7C.
Figure 13C:
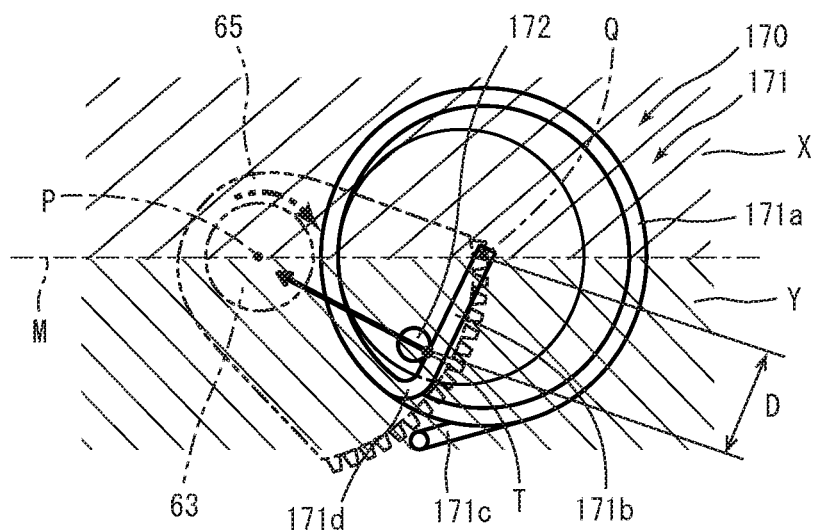
FIG. 13C illustrates a clutch driving device according to a second embodiment and corresponds to FIGS. 7A, 7B, and 7C.

FIGS. 13A through 13C illustrate schematic configurations of a spring 171 in an assist mechanism 170 of a clutch driving device according to a second embodiment. The spring 171 is different from that in the configuration of the first embodiment in that a first projection 171b is located radially inside a coil portion 171a. In the following description, components similar to those of the first embodiment are denoted by the same reference characters and will not be described again, and only components different from those of the first embodiment will be described.

As illustrated in FIGS. 13A through 13C, in the spring 171, the first projection 171b extends from the coil portion 171a radially inward of the coil portion 171a such that one end of a wire material is located radially inward of the cylindrical coil portion 171a. That is, the first projection 171b is formed by bending the wire material such that one end of the wire material of the spring 171 is located inside the coil portion 171a. By disposing the first projection 171b as described above, when seen in the axial direction of the spring 171, a bent portion 171d is formed between the first projection 171b and the coil portion 171a continuous to the first projection 171b. In the examples of FIGS. 13A through 13C, when seen in the axial direction (the direction of the axis Q) of the spring 171, one end of the wire material constituting the spring 171, that is, the front end of the first projection 171b, is located at the center of the coil portion 171a.

When seen in the axial direction of an output shaft 63, a pin 172 is located at the center of the output gear 65 in the circumferential direction of an output gear 65.

The output gear 65 is disposed such that the pin 172 is located between the first projection 171b and the coil portion 171a and contacts the first projection 171b, when seen in the axial direction of the spring 171. That is, the pin 172 of the output gear 65 is located to be hooked on the first projection 171b. Accordingly, when the output gear 65 rotates such that the clutch 13 changes from a clutch disengaged state to an engaged state, the pin 172 causes the spring 171 to deform such that the first projection 171b approaches the second projection 171c.

As illustrated in FIGS. 13A through 13C, in the spring 171, in a case where the pin 172 rotates about the axis of the output shaft 63 with rotation of the output gear 65, a bent portion 171d of the first projection 171b contacting the pin 172 is displaced in the circumferential direction of the spring 171 about an axis Q of the spring 171. At this time, a contact point T between the pin 172 and the first projection 171b of the spring 171 reciprocates with respect to the first projection 171b along the first projection 171b. The contact point T is located radially inside the spring 171 when seen in the axial direction of the spring 171.

FIG. 13A illustrates a rotation position of the output gear 65 while the clutch 13 is in a disengaged state. FIG. 13B illustrates a rotation position of the output gear 65 while the clutch 13 is in a half-clutch state. FIG. 13C illustrates a rotation position of the output gear 65 while the clutch 13 is in an engaged state.

Specifically, in a case where the output gear 65 is at the rotation position illustrated in FIG. 13A when seen in the axial direction of the output shaft 63, that is, a case where the pin 172 provided on the output gear 65 is located in a region X in two regions X and Y obtained by dividing the internal space of the casing body 41 into two by the imaginary line M connecting the shaft center P of the output shaft 63 and the axis Q of the spring 71, the pin 172 contacts the first projection 171b of the spring 171 at a position close to a proximal end portion (portion connected to the coil portion 171a).

Accordingly, as illustrated in FIG. 13A, a force exerted on the pin 172 by an elastic restoring force of the spring 171 is a force that causes the output gear 65 to rotate in a rotation direction for clutch disengagement (rotation direction of rotation indicated by an arrow of a dot-dot-dash line in FIG. 13A). That is, the spring 171 applies a torque to the output gear 65 through the pin 172 in the rotation direction for clutch disengagement.

In the case of FIG. 13A, the first projection 171b of the spring 171 is not significantly displaced by the pin 172 in the circumferential direction of the spring 171. Thus, a force exerted on the pin 172 by the elastic restoring force of the spring 171 is smaller than those in the case of FIGS. 13B and 13C described later. For example, the pin 172 receives a force in a direction with a magnitude indicated by the solid arrow in FIG. 13A from the first projection 171b of the spring 171.

In a case where the output gear 65 is at the rotation position illustrated in FIG. 13B, that is, a case where the pin 172 is located on the imaginary line M, the first projection 171b of the spring 171 is displaced such that the proximal end portion is located in the region Y, that is, the proximal end portion of the first projection 171b approaches the other end of the wire material in the second projection 171c. For example, in a case where the output gear 65 changes from the position illustrated in FIG. 13A to the position illustrated in FIG. 13B, the pin 172 moves toward the front end while contacting the first projection 171b of the spring 171.

Accordingly, the spring 171 is twisted in the circumferential direction. Consequently, the spring 171 generates an elastic restoring force in a direction in which the first projection 171b moves away from the second projection 171c. The elastic restoring force of the spring 171 is exerted on the pin 172 as indicated by the solid arrow in FIG. 13B. That is, the elastic restoring force of the spring 171 is transferred to the output gear 65 through the pin 172 as a torque in the rotation direction for clutch disengagement (the rotation direction indicated by the dot-dot-dash arrow in FIG. 13B). Accordingly, a force of assisting in the rotation direction for clutch disengagement is transferred from the spring 171 to the output gear 65 through the pin 172. At this time, a force exerted on the pin 172 from the first projection 171b of the spring 171 is larger than that in the case of FIG. 13A.

In a case where the output gear 65 is located at the rotation position illustrated in FIG. 13C, that is, in a case where the pin 172 is located in the region Y in the two regions X and Y, the first projection 171b of the spring 171 is displaced by the pin 172 to further approach the other end of the wire material in the second projection 171c. At this time, the pin 172 is located at a position closer to the proximal end portion than the position illustrated in FIG. 13B relative to the first projection 171b of the spring 171.

Accordingly, the spring 171 is further twisted in the circumferential direction. An elastic restoring force of the spring 171 is exerted on the pin 172 as indicated by the solid arrow in FIG. 13C. That is, the elastic restoring force of the spring 171 is exerted on the output gear 65 through the pin 172 in the rotation direction for clutch engagement (the rotation direction indicated by the dot-dot-dash arrow in FIG. 13C). Accordingly, a force of assisting in the rotation direction for clutch engagement is transferred from the spring 171 to the output gear 65 through the pin 172.

The contact point T between the pin 172 and the first projection 171b of the spring 171 straddles the imaginary line M connecting the shaft center P of the output shaft 63 and the axis Q of the spring 171 when seen in the axial direction of the output shaft 63, in accordance with rotation of the output gear 65. The contact point T between the pin 172 and the first projection 171b moves toward the axis Q of the spring 171 at least once when seen in the axial direction of the spring 171 when the output gear 65 rotates at a position different from the shaft center P of the output shaft 63 and the axis Q of the spring 171 and in a direction in which the elastic restoring force of the spring 171 decreases (in the examples of FIGS. 13A, 13B, and 13C, when the output gear 65 rotates in the order of FIGS. 13C, 13B, and 13A). Accordingly, the elastic restoring force generated in the spring 171 can be transferred to the output gear 65 as an assist force in a direction in which the first projection 171b moves away from the second projection 171c. At this time, the elastic restoring force of the spring 171 is transferred to the output gear 65 as a torque through the first projection 171b and the pin 172.

A distance D between the contact point T and the axis Q of the spring 171 varies in accordance with rotation of the output gear 65. That is, when seen in the axial direction of the output shaft 63, the distance D is smallest when the contact point T straddles the imaginary line M and increases as the distance to the contact point T from the imaginary line M increases.

The distance between the shaft center P of the output shaft 63 and the contact point T between the first projection 171b and the pin 172 is smaller than the distance between the shaft center P and the axis Q of the spring 171. The distance between the axis Q of the spring 171 and the contact point T is smaller than the distance between the shaft center P of the output shaft 63 and the axis Q of the spring 171.

In a manner similar to the configuration of the first embodiment, in the assist mechanism 170, rotation (actuation driving force) of the motor 50 causes the rotation position of the output gear 65 to change such that the actuator rotation angle increases, that is, to change in the order of FIG. 13C, FIG. 13B, and FIG. 13A. Accordingly, a force exerted on the pin 172 of the output gear 65 from the spring 171 changes parabolically and is at maximum at a predetermined actuator rotation angle. Consequently, a shaft torque exerted on the output shaft 63 by an assist force of the assist mechanism 170 also changes parabolically and is at maximum at the predetermined actuator rotation angle.

Third Embodiment

FIGS. 14A through 14C illustrate a schematic configuration of a spring 271 in an assist mechanism 270 of a clutch driving device according to a third embodiment. The configuration of the third embodiment is different from the configuration of the second embodiment in that an output shaft 63 is located inside the spring 271 when seen in the axial direction of the spring 271. In the following description, components similar to those of the second embodiment are denoted by the same reference characters and will not be described again, and only components different from those of the second embodiment will be described.

As illustrated in FIGS. 14A through 14C, in the spring 271, a first projection 271b extends from a coil portion 271a radially inward of the coil portion 271a such that one end of a wire material is located radially inward of the cylindrical coil portion 271a. That is, the first projection 271b is formed by bending the wire material such that one end of the wire material of the spring 271 is located inside the coil portion 271a. By disposing the first projection 271b as described above, when seen in the axial direction of the spring 271, a bent portion 271d is formed between the first projection 271b and the coil portion 271a continuous to the first projection 271b. In the examples of FIGS. 14A through 14C, when seen in the axial direction of the spring 271, one end of the wire material constituting the spring 271, that is, the front end of the first projection 271b, is located at the center of the coil portion 271a.

An output shaft 63 is located inside the spring 271 when seen in the axial direction of the spring 271. When seen in the axial direction of the output shaft 63, a pin 272 is located at a position shifted clockwise from the center of an output gear 65 in the circumferential direction of the output gear 65.

The output gear 65 is disposed such that the pin 272 is located between the first projection 271b and the coil portion 271a when seen in the axial direction of the spring 271, and contacts the first projection 271b. That is, the pin 272 of the output gear 65 is located to be hooked on the first projection 271b. Accordingly, when the output gear 65 rotates, the pin 272 causes the spring 271 to deform such that the first projection 271b approaches a second projection 271c.

As illustrated in FIGS. 14A through 14C, in the spring 271, in a case where the pin 272 rotates about the axis of the output shaft 63 with rotation of the output gear 65, the bent portion 271d of the first projection 271b contacting the pin 272 is displaced in the circumferential direction of the spring 271 about the axis Q of the spring 271. At this time, a contact point T between the pin 272 and the first projection 271b of the spring 271 reciprocates with respect to the first projection 271b along the first projection 271b. The contact point T is located radially inside the spring 271 when seen in the axial direction of the spring 271.

FIG. 14A illustrates a rotation position of the output gear 65 while the clutch 13 is in a disengaged state. FIG. 14B illustrates a rotation position of the output gear 65 while the clutch 13 is in a half-clutch state. FIG. 14C illustrates a rotation position of the output gear 65 while the clutch 13 is in an engaged state.

Specifically, in a case where the output gear 65 is at the rotation position illustrated in FIG. 14A when seen in the axial direction of the output shaft 63, that is, in a case where the pin 272 provided on the output gear 65 is located in a region X in two regions X and Y obtained by dividing the internal space of a casing body 41 into two by an imaginary line M connecting a shaft center P of the output shaft 63 and an axis Q of the spring 271, the pin 272 is contacts the first projection 271b of the spring 271 in a portion close to the front end.

Accordingly, as illustrated in FIG. 14A, a force exerted on the pin 272 by an elastic restoring force of the spring 271 is a force that causes the output gear 65 to rotate in a rotation direction for clutch disengagement (rotation direction of rotation indicated by an arrow of a dot-dot-dash line in FIG. 14A). That is, the spring 271 applies a torque to the output gear 65 through the pin 272 in the rotation direction for clutch disengagement.

In the case of FIG. 14A, the first projection 271b of the spring 271 is not significantly displaced by the pin 272 in the circumferential direction of the spring 271. Thus, a force exerted on the pin 272 by the elastic restoring force of the spring 271 is smaller than those in the case of FIGS. 14B and 14C described later. For example, the pin 272 receives a force in a direction with a magnitude indicated by a solid arrow in FIG. 14A from the first projection 271b of the spring 271.

In a case where the output gear 65 is at the rotation position illustrated in FIG. 14B, that is, in a case where the pin 272 is located on the imaginary line M, the bent portion 271d of the first projection 271b is displaced to approach the other end of the wire material in the second projection 271c. For example, in a case where the output gear 65 changes from the position illustrated in FIG. 14A to the position illustrated in FIG. 14B, the pin 272 moves toward the bent portion 271d while contacting the first projection 271b of the spring 271.

Accordingly, the spring 271 is twisted in the circumferential direction. Consequently, the spring 271 generates an elastic restoring force in a direction in which the first projection 271b moves away from the second projection 271c. The elastic restoring force of the spring 271 is exerted on the pin 272 as indicated by the solid arrow in FIG. 14B. That is, the elastic restoring force of the spring 271 is transferred to the output gear 65 through the pin 272 as a torque in the rotation direction for clutch disengagement (the rotation direction indicated by the dot-dot-dash arrow in FIG. 14B). Accordingly, a force of assisting in the rotation direction for clutch disengagement is transferred from the spring 271 to the output gear 65 through the pin 272. At this time, a force exerted on the pin 272 from the first projection 271b of the spring 271 is larger than that in the case of FIG. 14A.

In a case where the output gear 65 is located at a rotation position illustrated in FIG. 14C, that is, in a case where the pin 272 is located in the region Y in the two regions X and Y, the bent portion 271d of the first projection 271b of the spring 271 is displaced by the pin 272 to further approach the other end of the wire material in the second projection 271c. At this time, the pin 272 is located at a position closer to the bent portion 271d than the position illustrated in FIG. 14B relative to the first projection 271b of the spring 271.

Accordingly, the spring 271 is further twisted in the circumferential direction. An elastic restoring force of the spring 271 is exerted on the pin 272 as indicated by the solid arrow in FIG. 14C. That is, the elastic restoring force of the spring 271 is exerted on the output gear 65 through the pin 272 in the rotation direction for clutch engagement (the rotation direction indicated by a dot-dot-dash arrow in FIG. 14C). Accordingly, a force of assisting in the rotation direction for clutch engagement is transferred from the spring 271 to the output gear 65 through the pin 272.

The contact point T between the pin 272 and the first projection 271b of the spring 271 straddles the imaginary line M connecting the shaft center P of the output shaft 63 and the axis Q of the spring 271 when seen in the axial direction of the output shaft 63, in accordance with rotation of the output gear 65. The contact point T between the pin 272 and the first projection 271b moves toward the axis Q of the spring 271 at least once when seen in the axial direction of the spring 271 when the output gear 65 rotates at a position different from the shaft center P of the output shaft 63 and the axis Q of the spring 271 and in a direction in which the elastic restoring force of the spring 271 decreases (in the examples of FIGS. 14A, 14B, and 14C, when the output gear 65 rotates in the order of FIGS. 14C, 14B, and 14A). Accordingly, the elastic restoring force generated in the spring 271 can be transferred to the output gear 65 as an assist force in a direction in which the first projection 271b moves away from the second projection 271c. At this time, the elastic restoring force of the spring 271 is transferred to the output gear 65 as a torque through the first projection 271b and the pin 272.

A distance D between the contact point T and the axis Q of the spring 271 varies in accordance with rotation of the output gear 65. That is, when seen in the axial direction of the output shaft 63, the distance D is smallest when the contact point T straddles the imaginary line M and increases as the distance to the contact point T from the imaginary line M increases.

The distance between the shaft center P of the output shaft 63 and the contact point T between the first projection 271b and the pin 272 is smaller than the distance between the shaft center P and the axis Q of the spring 271. The distance between the axis Q of the spring 271 and the contact point T is smaller than the distance between the shaft center P of the output shaft 63 and the axis Q of the spring 271, in a case where the contact point T is located on the imaginary line M.

In a manner similar to the configuration of the first embodiment, in the assist mechanism 270, rotation (actuation driving force) of the motor 50 changes the rotation position of the output gear 65 such that the actuator rotation angle increases, that is, changes the rotation position in the order of FIG. 14C, FIG. 14B, and FIG. 14A. Accordingly, a force exerted on the pin 272 of the output gear 65 from the spring 271 changes parabolically and is at maximum at a predetermined actuator rotation angle. Accordingly, a shaft torque exerted on the output shaft 63 by an assist force of the assist mechanism 270 also changes parabolically and is at maximum at the predetermined actuator rotation angle.

Fourth Embodiment

Figure 15A:
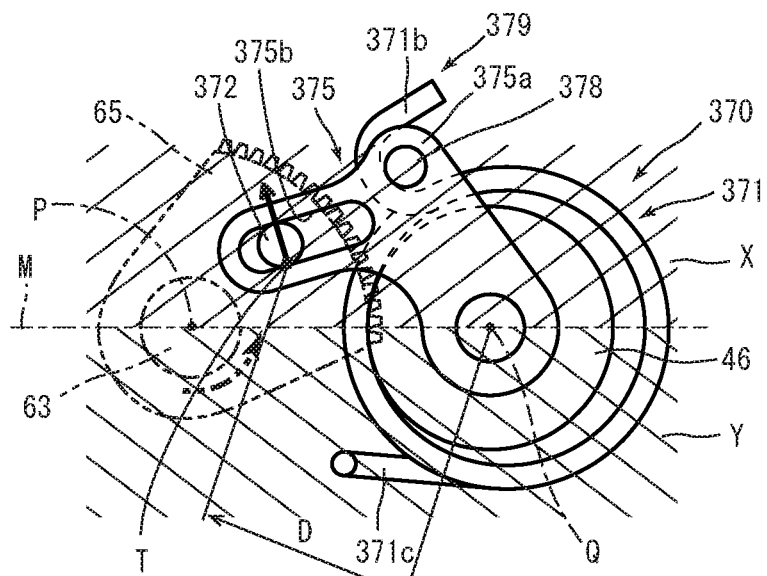
FIG. 15A illustrates a clutch driving device according to a fourth embodiment and corresponds to FIGS. 7A, 7B, and 7C.
Figure 15B:
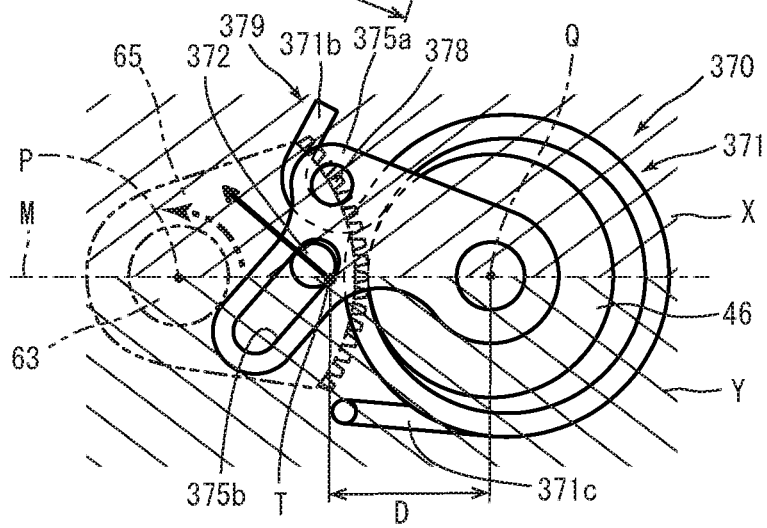
FIG. 15B illustrates a clutch driving device according to a fourth embodiment and corresponds to FIGS. 7A, 7B, and 7C.
Figure 15C:
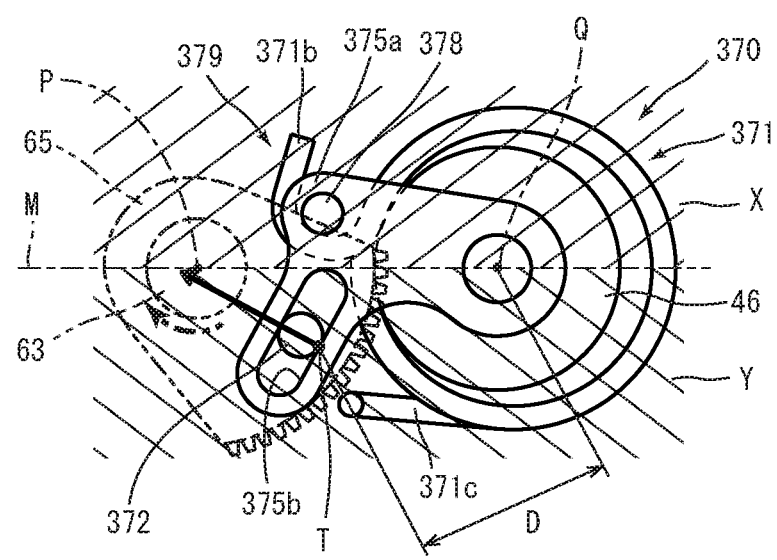
FIG. 15C illustrates a clutch driving device according to a fourth embodiment and corresponds to FIGS. 7A, 7B, and 7C.

FIGS. 15A through 15C illustrate a schematic configuration of an assist mechanism 370 of a clutch driving device according to a fourth embodiment. This configuration is different from the configuration of the first embodiment in that a link 375 is provided between a pin 372 provided on an output gear 65 and a spring 371. In the following description, components similar to those of the first embodiment are denoted by the same reference characters and will not be described again, and only components different from those of the first embodiment will be described.

As illustrated in FIGS. 15A through 15C, the assist mechanism 370 includes the pin 372 provided on the output gear 65, the spring 371, and the link 375 connecting the pin 372 and the spring 371 to each other.

In the spring 371, one end of a wire material is bent in a U shape when seen in the axial direction. That is, a first projection 371b is formed in a U shape when seen in the axial direction. The pin 372 is disposed at a position shifted counterclockwise from the center of the output gear 65 in the circumferential direction of the output gear 65 when seen from above an output shaft 63 in the axial direction.

The link 375 is a flat-plate member formed in an L shape in plan view. That is, the link 375 includes a bent portion 375a. One end of the link 375 is rotatably connected to the center of a protrusion 46. The link 375 has an oval slide hole 375b elongated from the bent portion 375a to the other end of the link 375 and located between the bent portion 375a and the other end. The pin 372 provided on the output gear 65 is slidably disposed in the slide hole 375b of the link 375. Accordingly, the link 375 is connected to the pin 372 provided on the output gear 65 and slidable in one way. FIGS. 15A through 15C simplify the protrusion 46.

The bent portion 375a of the link 375 is provided with a connection pin 378 projecting in the thickness direction of the link 375. The connection pin 378 is located inside the first projection 371b of the spring 371 to be thereby connected to the first projection 371b.

In the foregoing configuration, as illustrated in FIGS. 15A through 15C, when the pin 372 provided on the output gear 65 rotates about the output shaft 63, the link 375 rotates about one end of the link 375 rotatably connected to the protrusion 46. At this time, the pin 372 slides relative to the slide hole 375b of the link 375. That is, the contact point T between the pin 372 and a peripheral portion of the slide hole 375b of the link 375 moves along the slide hole 375b. The contact point T is located radially outside the spring 371 when seen in the axial direction of the spring 371.

The spring 371 is deformed in accordance with rotation of the pin 372 about the output shaft 63 as described above such that the first projection 371b moves in the circumferential direction relative to the second projection 371c. Such deformation of the spring 371 causes elastic deformation in the spring 371. The elastic restoring force generated in the spring 371 is exerted on the pin 372 through the link 375. In this embodiment, the link 375 and the first projection 371b of the spring 371 are included in an output portion 379 that outputs an elastic restoring force from the spring 371.

FIG. 15A illustrates a rotation position of the output gear 65 while the clutch 13 is in a disengaged state. FIG. 15B illustrates a rotation position of the output gear 65 while the clutch 13 is in a half-clutch state. FIG. 15C illustrates a rotation position of the output gear 65 while the clutch 13 is in an engaged state.

Specifically, in a case where the output gear 65 is at the rotation position illustrated in FIG. 15A when seen in the axial direction of the output shaft 63, that is, in a case where the pin 372 provided on the output gear 65 is located in a region X in two regions X and Y obtained by dividing the internal space of a casing body 41 into two by an imaginary line M connecting a shaft center P of the output shaft 63 and an axis Q of the spring 371, the first projection 371b is also located in the region X. At this time, the position of the pin 372 relative to the slide hole 375b of the link 375 is a position close to the other end of the link 375 in the slide hole 375b. Thus, the contact point T between the pin 372 and the peripheral portion of the slide hole 375b of the link 375 is also at a position close to the other end of the link 375 in the slide hole 375b.

Accordingly, as illustrated in FIG. 15A, a force exerted on the pin 372 by an elastic restoring force of the spring 371 is a force that causes the output gear 65 to rotate in a rotation direction for clutch disengagement (rotation direction of rotation indicated by an arrow of a dot-dot-dash line in FIG. 15A). That is, the spring 371 applies a torque to the output gear 65 through the pin 372 in the rotation direction for clutch disengagement.

In the case of FIG. 15A, the first projection 371b of the spring 371 is not significantly displaced by the pin 372 in the circumferential direction of the spring 371. Thus, a force exerted on the pin 372 by the elastic restoring force of the spring 371 is smaller than those in the case of FIGS. 15B and 15C described later. For example, the pin 372 receives a force in a direction with a magnitude indicated by a solid arrow in FIG. 15A from the first projection 371b of the spring 371 through the link 375.

In a case where the output gear 65 is at the rotation position illustrated in FIG. 15B, that is, in a case where the pin 372 is located on the imaginary line M, the first projection 371b is closer to the imaginary line M than the position illustrated in FIG. 15A. At this time, the position of the pin 372 relative to the slide hole 375b of the link 375 is a position close to the bent portion 375a in the slide hole 375b. Thus, the contact point T between the pin 372 and the peripheral portion of the slide hole 375b of the link 375 is also at a position close to the bent portion 375a in the slide hole 375b.

Accordingly, the spring 371 is twisted in the circumferential direction such that the first projection 371b approaches the second projection 371c. Consequently, the spring 371 generates an elastic restoring force in a direction in which the first projection 371b moves away from the second projection 371c. The elastic restoring force of the spring 371 is exerted on the pin 372 as indicated by the solid arrow in FIG. 15B. That is, the elastic restoring force of the spring 371 is transferred to the output gear 65 through the pin 372 as a torque in the rotation direction for clutch disengagement (the rotation direction indicated by the dot-dot-dash arrow in FIG. 15B). Accordingly, a force of assisting in the rotation direction for clutch disengagement is transferred from the spring 371 to the output gear 65 through the pin 372. At this time, a force exerted on the pin 372 from the first projection 371b of the spring 371 through the link 375 is larger than that in the case of FIG. 15A.

In a case where the output gear 65 is located at the rotation position illustrated in FIG. 15C, that is, a case where the pin 372 is located in the region Y in the two regions X and Y, the first projection 371b approaches the second projection 371c as compared to the case of FIG. 15B. At this time, the position of the pin 372 relative to the slide hole 375b of the link 375 is a position close to the center of the slide hole 375b in the longitudinal direction. Thus, the contact point T between the pin 372 and the peripheral portion of the slide hole 375b of the link 375 is also at a position close to the center of the slide hole 375b in the longitudinal direction.

Accordingly, the elastic restoring force generated in the spring 371 is exerted on the pin 372 as indicated by the solid arrow in FIG. 15C. That is, the elastic restoring force of the spring 371 is exerted on the output gear 65 through the pin 372 in the rotation direction for clutch engagement (the rotation direction indicated by the dot-dot-dash arrow in FIG. 15C). Accordingly, a force of assisting in the rotation direction for clutch engagement is transferred from the spring 371 to the output gear 65 through the pin 372.

The pin 372 straddles the imaginary line M connecting the shaft center P of the output shaft 63 and the axis Q of the spring 371 when seen in the axial direction of the output shaft 63, in accordance with rotation of the output gear 65. The contact point T between the pin 372 and the peripheral portion of the slide hole 375b moves toward the axis Q of the spring 371 at least once when seen in the axial direction of the spring 371 in a case where the output gear 65 rotates at a position different from the shaft center P of the output shaft 63 and the axis Q of the spring 371 and in a direction in which the elastic restoring force of the spring 371 decreases (in the examples of FIGS. 15A, 15B, and 15C, when the output gear 65 rotates in the order of FIGS. 15C, 15B, and 15A). Accordingly, the elastic restoring force generated in the spring 371 can be transferred to the output gear 65 as an assist force in a direction in which the first projection 371b moves away from the second projection 371c. At this time, the elastic restoring force of the spring 371 is transferred to the output gear 65 as a torque through the first projection 371b and the pin 372.

A distance D between the contact point T and the axis Q of the spring 371 varies in accordance with rotation of the output gear 65. That is, when seen in the axial direction of the output shaft 63, the distance D is smallest when the contact point T straddles the imaginary line M and increases as the distance to the contact point T from the imaginary line M increases.

The distance between the shaft center P of the output shaft 63 and the contact point T between the first projection 371b and the pin 372 is smaller than the distance between the shaft center P and the axis Q of the spring 371. The distance between the axis Q of the spring 371 and the contact point T is smaller than the distance between the shaft center P of the output shaft 63 and the axis Q of the spring 371, in a case where the contact point T is located on the imaginary line M.

In a manner similar to the configuration of the first embodiment, in the assist mechanism 370, rotation (actuation driving force) of the motor 50 changes the rotation position of the output gear 65 such that the actuator rotation angle increases, that is, changes in the order of FIG. 15C, FIG. 15B, and FIG. 15A. Accordingly, a force exerted on the pin 372 of the output gear 65 from the spring 371 changes parabolically and is at maximum at a predetermined actuator rotation angle. Accordingly, a shaft torque exerted on the output shaft 63 by an assist force of the assist mechanism 370 also changes parabolically and is at maximum at the predetermined actuator rotation angle.

In this embodiment, the output portion 379 includes the link 375 that relatively rotates in accordance with rotation of the output gear 65 and deformation of the spring 371 in the circumferential direction. This can enhance flexibility in designing the clutch driving device 14.

Fifth Embodiment

Figure 16A:
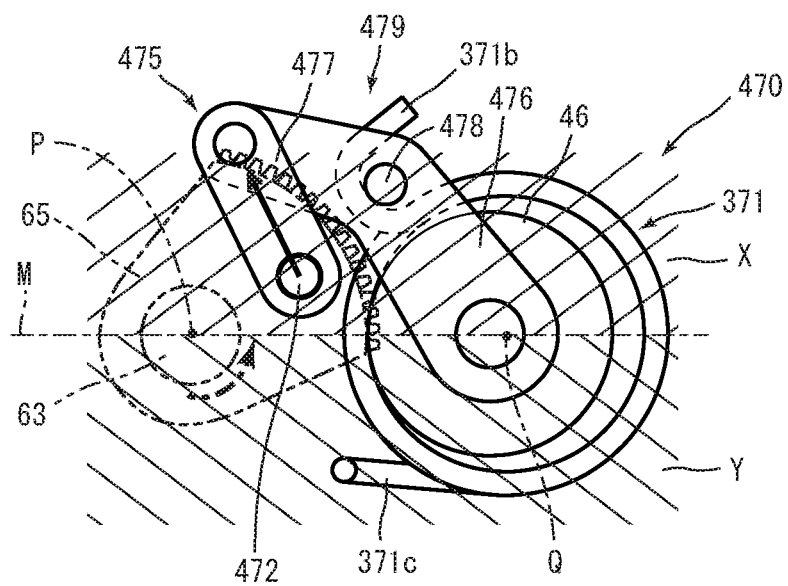
FIG. 16A illustrates a clutch driving device according to a fifth embodiment and corresponds to FIGS. 7A, 7B, and 7C.
Figure 16B:
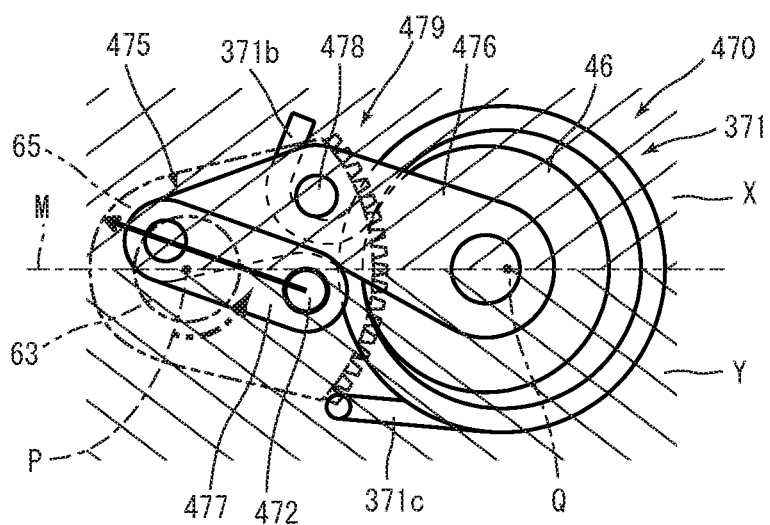
FIG. 16B illustrates a clutch driving device according to a fifth embodiment and corresponds to FIGS. 7A, 7B, and 7C.
Figure 16C:
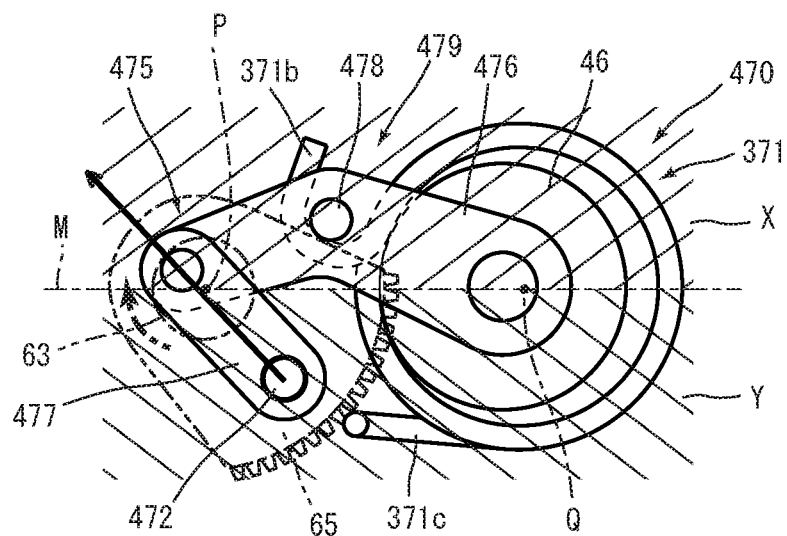
FIG. 16C illustrates a clutch driving device according to a fifth embodiment and corresponds to FIGS. 7A, 7B, and 7C.

FIGS. 16A through 16C illustrate a schematic configuration of an assist mechanism 470 of a clutch driving device according to a fifth embodiment. In this embodiment, a configuration of a link 475 disposed between a pin 472 provided on an output gear 65 and a spring 371 is different from the configuration of the link 375 in the fourth embodiment. In the following description, components similar to those of the fourth embodiment are denoted by the same reference characters and will not be described again, and only components different from those of the fourth embodiment will be described.

As illustrated in FIGS. 16A through 16C, the assist mechanism 470 includes the pin 472 provided on the output gear 65, a spring 371, and the link 475 connecting the pin 472 and the spring 371 to each other. The pin 472 is disposed at a position shifted clockwise from the center of the output gear 65 in the circumferential direction of the output gear 65 when seen from above the output shaft 63 in the axial direction.

The link 475 includes a first link portion 476 and a second link portion 477. Each of the first link portion 476 and the second link portion 477 is formed in a flat-plate shape elongated in one way. The first link portion 476 is bent in the width direction (lateral direction) in a center portion in the longitudinal direction and has a V shape in plan view. The center portion in the longitudinal direction of the first link portion 476 is provided with a connection pin 478 projecting in the thickness direction. The connection pin 478 is located inside a first projection 371b of the spring 371 to be thereby connected to the first projection 371b.

One longitudinal end of the first link portion 476 is rotatably supported on the center of a protrusion 46. The other longitudinal end of the first link portion 476 is rotatably connected to one longitudinal end of the second link portion 477. The other longitudinal end of the second link portion 477 is rotatably connected to the pin 472 of the output gear 65.

Accordingly, as illustrated in FIGS. 16A through 16C, in the link 475, when the pin 472 provided on the output gear 65 rotates about the output shaft 63, the first link portion 476 rotates about one longitudinal end and the second link portion 477 rotates with respect to the first link portion 476 about one longitudinal end thereof. Consequently, the spring 371 is deformed such that the first projection 371b approaches the second projection 371c. The elastic restoring force generated in the spring 371 is exerted on the pin 472 through the link 475. In this embodiment, the link 475 and the first projection 371b of the spring 371 are included in an output portion 479 that outputs the elastic restoring force from the spring 371.

FIG. 16A illustrates a rotation position of the output gear 65 while the clutch 13 is in a disengaged state. FIG. 16B illustrates a rotation position of the output gear 65 while the clutch 13 is in a half-clutch state. FIG. 16C illustrates a rotation position of the output gear 65 while the clutch 13 is in an engaged state.

Specifically, in a case where the output gear 65 is at the rotation position illustrated in FIG. 16A when seen in the axial direction of the output shaft 63, that is, the pin 472 provided on the output gear 65 is located in a region X in two regions X and Y obtained by dividing the internal space of a casing body 41 into two by an imaginary line M connecting a shaft center P of the output shaft 63 and an axis Q of the spring 371.

Accordingly, as illustrated in FIG. 16A, a force exerted on the pin 472 by an elastic restoring force of the spring 371 is a force that causes the output gear 65 to rotate in a rotation direction for clutch disengagement (rotation direction of rotation indicated by an arrow of a dot-dot-dash line in FIG. 16A). That is, the spring 371 applies a torque to the output gear 65 through the pin 472 in the rotation direction for clutch disengagement. As illustrated in FIGS. 16A, 16B, and 16C, the direction of a force exerted on the pin 472 by the elastic restoring force of the spring 371 coincides with the longitudinal direction of the second link portion 477.

In the case of FIG. 16A, the first projection 371b of the spring 371 is not significantly displaced by the pin 472 in the circumferential direction of the spring 371. Thus, a force exerted on the pin 472 by the elastic restoring force of the spring 371 through the link 475 is smaller than those in the case of FIGS. 16B and 16C described later. For example, the pin 472 receives a force in a direction with a magnitude indicated by a solid arrow in FIG. 16A from the first projection 371b of the spring 371.

In a case where the output gear 65 is at the rotation position illustrated in FIG. 16B, that is, in a case where the link 475 straddles the imaginary line M and the pin 472 is close to the imaginary line M, the first projection 371b is closer to the imaginary line M than the position illustrated in FIG. 16A. Accordingly, the spring 371 is twisted in the circumferential direction such that the first projection 371b approaches the second projection 371c. Consequently, the spring 371 generates a larger elastic restoring force in a direction in which the first projection 371b moves away from the second projection 371c. The elastic restoring force of the spring 371 is exerted on the pin 472 as indicated by the solid arrow in FIG. 16B. That is, the elastic restoring force of the spring 371 is transferred to the output gear 65 through the pin 472 as a torque in the rotation direction for clutch disengagement (the rotation direction indicated by the dot-dot-dash arrow in FIG. 16B). Accordingly, a force of assisting in the rotation direction for clutch disengagement is transferred from the spring 371 to the output gear 65 through the pin 472. At this time, a force exerted on the pin 472 from the first projection 371b of the spring 371 is larger than that in the case of FIG. 16A.

In a case where the output gear 65 is located at the rotation position illustrated in FIG. 16C, that is, a case where the pin 472 is located in the region Y in the two regions X and Y, the second link portion 477 rotates with respect to the first link portion 476 about one longitudinal end thereof. At this time, the second link portion 477 rotates together with the output gear 65.

Accordingly, the elastic restoring force generated in the spring 371 is exerted on the pin 472 as indicated by the solid arrow in FIG. 16C. That is, the elastic restoring force of the spring 371 is exerted on the output gear 65 through the pin 472 in the rotation direction for clutch engagement (the rotation direction indicated by the dot-dot-dash arrow in FIG. 16C). Accordingly, a force of assisting in the rotation direction for clutch engagement is transferred from the spring 371 to the output gear 65 through the pin 472.

The pin 472 straddles the imaginary line M connecting the shaft center P of the output shaft 63 and the axis Q of the spring 371 when seen in the axial direction of the output shaft 63, in accordance with rotation of the output gear 65.

In a manner similar to the configuration of the first embodiment, in the assist mechanism 470, rotation (actuation driving force) of the motor 50 changes the rotation position of the output gear 65 such that the actuator rotation angle increases, that is, changes the rotation position in the order of FIG. 16C, FIG. 16B, and FIG. 16A. Accordingly, a force exerted on the pin 472 of the output gear 65 from the spring 371 changes parabolically and is at maximum at a predetermined actuator rotation angle. Accordingly, a shaft torque exerted on the output shaft 63 by an assist force of the assist mechanism 470 also changes parabolically and is at maximum at the predetermined actuator rotation angle.

Although not specifically shown, in this embodiment, a contact point between the pin 472 and the second link portion 477 of the link 475 corresponds to a contact point between a transfer portion and a output portion.

Sixth Embodiment

Figure 17A:
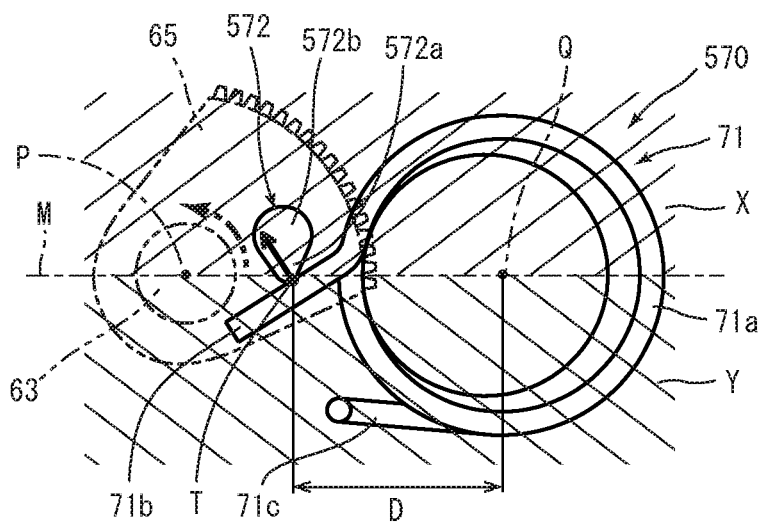
FIG. 17A illustrates a clutch driving device according to a sixth embodiment and corresponds to FIGS. 7A, 7B, and 7C.
Figure 17B:
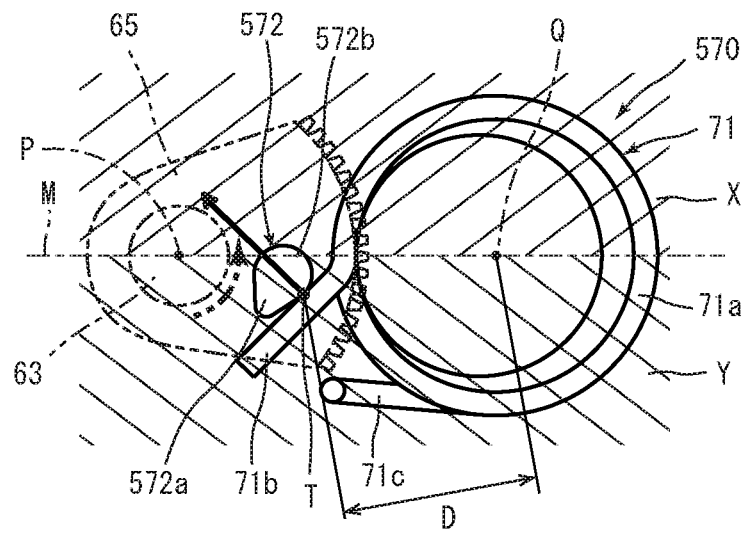
FIG. 17B illustrates a clutch driving device according to a sixth embodiment and corresponds to FIGS. 7A, 7B, and 7C.
Figure 17C:
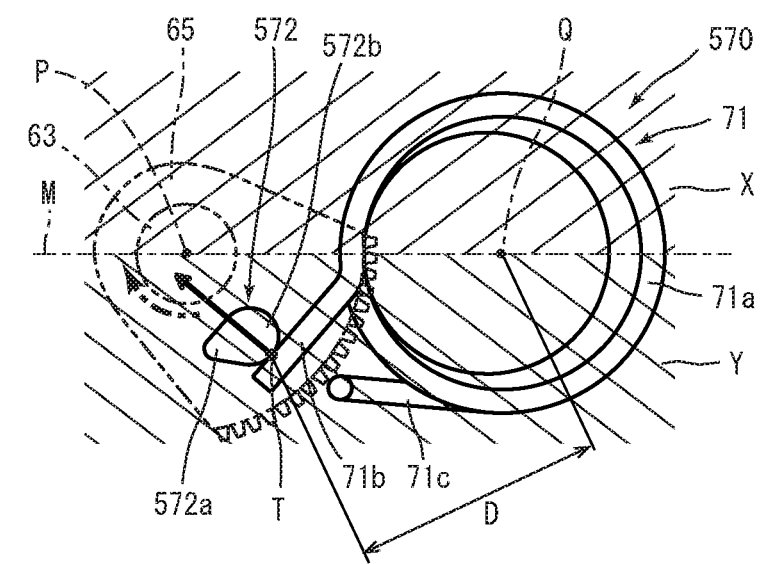
FIG. 17C illustrates a clutch driving device according to a sixth embodiment and corresponds to FIGS. 7A, 7B, and 7C.

FIGS. 17A through 17C illustrate a schematic configuration of an assist mechanism 570 of a clutch driving device according to a sixth embodiment. In the assist mechanism 570 according to this embodiment, a configuration of a pin 572 that contacts a first projection 71b of a spring 71 is different from the configuration of the first embodiment. In the following description, components similar to those of the first embodiment are denoted by the same reference characters and will not be described again, and only components different from those of the first embodiment will be described.

As illustrated in FIGS. 17A through 17C, a pin 572 disposed on an output gear 65 has a projection 572a projecting in the radial direction. The projection 572a is formed to have an acute front end when seen in the axial direction of an output shaft 63. The pin 572 has a semicircular columnar portion 572b at a side opposite to the projection 572a, when seen in the axial direction. That is, the pin 572 has a shape with which the projection 572a is integrally provided to the columnar member. The pin 572 is disposed at a position shifted clockwise from the center of the output gear 65 in the circumferential direction of the output gear 65 when seen from above the output shaft 63 in the axial direction.

The pin 572 is in contact the first projection 71b of the spring 71. Thus, when an output gear 65 rotates, the pin 572 moves with respect to the first projection 71b while contacting the first projection 71b. At this time, the position at which the pin 572 contacts the first projection 71b moves in the circumferential direction of the pin 572 in accordance with rotation of the output gear 65. As described above, since the pin 572 is a member in which the projection 572a is provided on the columnar member, the projection 572a or the columnar portion 572b of the pin 572 contacts the first projection 71b in accordance with rotation of the output gear 65.

As illustrated in FIGS. 17A through 17C, in the spring 71, when the pin 572 rotates about the axis of the output shaft 63 with rotation of the output gear 65, the first projection 71b contacting the pin 572 is displaced relative to a second projection 71c in the circumferential direction of the spring 71. At this time, a contact point T between the pin 572 and the first projection 71b of the spring 71 reciprocates with respect to the first projection 71b along the first projection 71b. The contact point T is located radially outside the spring 71 when seen in the axial direction of the spring 71.

FIG. 17A illustrates a rotation position of the output gear 65 while the clutch 13 is in a disengaged state. FIG. 17B illustrates a rotation position of the output gear 65 while the clutch 13 is in a half-clutch state. FIG. 17C illustrates a rotation position of the output gear 65 while the clutch 13 is in an engaged state.

Specifically, in a case where the output gear 65 is located at the rotation position illustrated in FIG. 17A when seen in the axial direction of the output shaft 63, that is, in a case where a contact point T between the pin 572 provided on the output gear 65 and the first projection 71b of the spring 71 is located near an imaginary line M connecting a shaft center P of the output shaft 63 and an axis Q of the spring 71, the pin 572 contacts a portion of the first projection 71b of the spring 71 near the center in the projection direction. At this time, the front end of the projection 572a of the pin 572 is in contact with the first projection 71b.

Accordingly, as illustrated in FIG. 17A, a force exerted on the pin 572 by an elastic restoring force of the spring 71 is a force that causes the output gear 65 to rotate in a rotation direction for clutch disengagement (rotation direction of rotation indicated by an arrow of a dot-dot-dash line in FIG. 17A). That is, the spring 71 applies a torque to the output gear 65 through the pin 572 in the rotation direction for clutch disengagement.

In the case of FIG. 17A, the contact point T between the pin 572 and the first projection 71b is located in a region Y in two regions X and Y obtained by dividing the internal space of a casing body 41 into two by the imaginary line M. On the other hand, since the projection 572a of the pin 572 contacts the first projection 71b of the spring 71, the columnar portion 572b of the pin 572 is located in the region X in the two regions X and Y. For example, the pin 572 receives a force in a direction with a magnitude indicated by a solid arrow in FIG. 17A from the first projection 71b of the spring 71.

In a case where the output gear 65 is located at the rotation position illustrated in FIG. 17B, that is, in a case where the columnar portion 572b of the pin 572 is located on the imaginary line M, a connection portion between the projection 572a and the columnar portion 572b in the pin 572 contacts the first projection 71b of the spring 71. At this time, the contact point T between the pin 572 and the first projection 71b of the spring 71 is a position close to a proximal end portion of the first projection 71b (portion connected to the coil portion 71a). For example, in a case where the output gear 65 changes from the position illustrated in FIG. 17A to the position illustrated in FIG. 17B, the contact point T moves toward the proximal end portion of the first projection 71b of the spring 71 and the first projection 71b is displaced toward the second projection 71c.

Accordingly, the spring 71 is twisted in the circumferential direction. Consequently, the spring 71 generates an elastic restoring force in a direction in which the first projection 71b moves away from the second projection 71c. The elastic restoring force of the spring 71 is exerted on the pin 572 as indicated by the solid arrow in FIG. 17B. That is, the elastic restoring force of the spring 71 is transferred to the output gear 65 through the pin 572 as a torque in the rotation direction for clutch disengagement (the rotation direction indicated by the dot-dot-dash arrow in FIG. 17B). Accordingly, a force of assisting in the rotation direction for clutch disengagement is transferred from the spring 71 to the output gear 65 through the pin 572. At this time, a force exerted on the pin 572 from the first projection 71b of the spring 71 is larger than that in the case of FIG. 17A.

In a case where the output gear 65 is at the rotation position illustrated in FIG. 17C, that is, in a case where the pin 572 is located in the region Y in the two regions X and Y, the first projection 71b of the spring 71 is displaced by the pin 572 to further approach the second projection 71c. At this time, the pin 572 is located at a position closer to a distal end portion than the position illustrated in FIG. 17B relative to the first projection 71b of the spring 71.

Accordingly, the spring 71 is further twisted in the circumferential direction. The elastic restoring force of the spring 71 is exerted on the pin 572 as indicated by the solid arrow in FIG. 17C. That is, the elastic restoring force of the spring 71 is exerted on the output gear 65 through the pin 572 in the rotation direction for clutch engagement (the rotation direction indicated by a dot-dot-dash arrow in FIG. 17C). Accordingly, a force of assisting in the rotation direction for clutch engagement is transferred from the spring 71 to the output gear 65 through the pin 572.

In the configuration of the assist mechanism 570 according to this embodiment, the contact point T between the pin 572 and the first projection 71b of the spring 71 does not straddle the imaginary line M connecting the shaft center P of the output shaft 63 and the axis Q of the spring 71 when seen in the axial direction of the output shaft 63, in accordance with rotation of the output gear 65. That is, the contact point T moves only in the region Y in the two regions X and Y in accordance with rotation of the output gear 65. In this manner, in the case the contact point T does not straddle the imaginary line M, the contact point T between the pin 572 and the first projection 71b also approaches the axis Q of the spring 71 at least once when seen in the axial direction of the spring 71 when the output gear 65 rotates at a position different from the shaft center P of the output shaft 63 and the axis Q of the spring 71 and in a direction in which the elastic restoring force of the spring 71 decreases (in the examples of FIGS. 17A, 17B, and 17C, when the output gear 65 rotates in the order of FIGS. 17C, 17B, and 17A). Accordingly, the elastic restoring force generated in the spring 71 can be transferred to the output gear 65 as an assist force in a direction in which the first projection 71b moves away from the second projection 71c. At this time, the elastic restoring force of the spring 71 is transferred to the output gear 65 as a torque through the first projection 71b and the pin 572.

A distance D between the contact point T and the axis Q of the spring 71 varies in accordance with rotation of the output gear 65. For example, in the examples illustrated in FIGS. 17A through 17C, the distance D is at minimum when the contact point T between the pin 572 and the first projection 71b of the spring 71 is located on the imaginary line M when seen in the axial direction of the output shaft 63, and increases as the contact point T moves away from the imaginary line M.

The distance D can be changed by changing the shape of the pin 572. Thus, an assist force obtained by the assist mechanism 570 can be changed depending on the shape of the pin 572. Consequently, a desired assist force can be obtained.

The distance between the shaft center P of the output shaft 63 and the contact point T between the first projection 71b and the pin 572 is smaller than the distance between the shaft center P and the axis Q of the spring 71. The distance between the axis Q of the spring 71 and the contact point T is smaller than the distance between the shaft center P of the output shaft 63 and the axis Q of the spring 71, in a case where the contact point T is located on the imaginary line M.

In a manner similar to the configuration of the first embodiment, in the assist mechanism 570, rotation (actuation driving force) of the motor 50 changes the rotation position of the output gear 65 such that the actuator rotation angle increases, that is, changes the rotation position in the order of FIG. 17C, FIG. 17B, and FIG. 17A. Accordingly, a force exerted on the pin 572 of the output gear 65 from the spring 71 changes parabolically and is at maximum at a predetermined actuator rotation angle. Accordingly, a shaft torque exerted on the output shaft 63 by an assist force of the assist mechanism 570 also changes parabolically and is at maximum at the predetermined actuator rotation angle.

Seventh Embodiment

FIGS. 18A through 18C illustrate a schematic configuration of an assist mechanism 670 of a clutch driving device according to a seventh embodiment. In the assist mechanism 670 according to this embodiment, the position of a pin 672 in an output gear 65 is different from that in the first embodiment. In the following description, components similar to those of the first embodiment are denoted by the same reference characters and will not be described again, and only components different from those of the first embodiment will be described.

In a manner similar to the pin 72 in the first embodiment, the pin 672 is a columnar member and projects from the output gear 65 in the thickness direction of the output gear 65.

As illustrated in FIGS. 18A through 18C, the pin 672 is shifted clockwise from the center of the output gear 65 in the circumferential direction of the output gear 65 when seen from above the output gear 65 in the axial direction. Accordingly, when the output gear 65 rotates clockwise when seen from above the output gear 65 in the axial direction, the pin 672 contacts a first projection 71b of a spring 71.

As illustrated in FIGS. 18A through 18C, in a case where the pin 672 rotates about the axis of an output shaft 63 with rotation of the output gear 65, one end of a wire material of the spring 71 contacting the pin 672 is displaced in the circumferential direction of the spring 71 relative to the other end of the wire material. In this case, a contact point T between the pin 672 and the first projection 71b including one end of the wire material of the spring 71 reciprocates with respect to the first projection 71b along the first projection 71b. The contact point T is located radially outside the spring when seen in the axial direction of the spring 71.

FIG. 18A illustrates a rotation position of the output gear 65 while the clutch 13 is in a disengaged state. FIG. 18B illustrates a rotation position of the output gear 65 while the clutch 13 is in a half-clutch state. FIG. 18C illustrates a rotation position of the output gear 65 while the clutch 13 is in an engaged state.

Specifically, in a case where the output gear 65 is located at a rotation position illustrated in FIG. 18A when seen in the axial direction of the output shaft 63, that is, in a case where the pin 672 provided on the output gear 65 is located on an imaginary line M connecting a shaft center P of the output shaft 63 and an axis Q of the spring 71, the pin 672 is located near the proximal end portion of the first projection 71b of the spring 71.

Accordingly, as illustrated in FIG. 18A, a force exerted on the pin 672 by an elastic restoring force of the spring 71 is a force that causes the output gear 65 to rotate in a rotation direction for clutch disengagement (rotation direction of rotation indicated by an arrow of a dot-dot-dash line in FIG. 18A). That is, the spring 71 applies a torque to the output gear 65 through the pin 672 in the rotation direction for clutch disengagement.

In the case of FIG. 18A, the contact point T between the pin 672 and the first projection 71b is located in a region Y in two regions X and Y obtained by dividing the internal space of a casing body 41 into two by the imaginary line M. For example, the pin 672 receives a force in a direction with a magnitude indicated by a solid arrow in FIG. 18A from the first projection 71b of the spring 71.

In a case where the output gear 65 is located at a rotation position illustrated in FIG. 18B, that is, in a case where the pin 672 is located in the region Y in the two regions X and Y and the center of the output gear 65 in the circumferential direction is located on the imaginary line M, the pin 672 contacts the first projection 71b of the spring 71 near the center in the projection direction.

Accordingly, the spring 71 is twisted in the circumferential direction. Consequently, the spring 71 generates an elastic restoring force in a direction in which the first projection 71b moves away from a second projection 71c. The elastic restoring force of the spring 71 is exerted on the pin 672 as indicated by the solid arrow in FIG. 18B. That is, the elastic restoring force of the spring 71 is transferred to the output gear 65 through the pin 672 as a torque in the rotation direction for clutch disengagement (the rotation direction indicated by the dot-dot-dash arrow in FIG. 18B). Accordingly, a force of assisting in the rotation direction for clutch disengagement is transferred from the spring 71 to the output gear 65 through the pin 672.

In a case where the output gear 65 is located at a rotation position illustrated in FIG. 18C, that is, in a case where the pin 672 is located in the region Y in the two regions X and Y and a half of the output gear 65 or more is located in the region Y, the pin 672 is located at a position closer to the front end of the first projection 71b of the spring 71 than the position illustrated in FIG. 18B.

Accordingly, the elastic restoring force of the spring 71 is exerted on the pin 672 as indicated by the solid arrow in FIG. 18C. That is, the elastic restoring force of the spring 71 is exerted on the output gear 65 through the pin 672 in the rotation direction for clutch engagement (the rotation direction indicated by a dot-dot-dash arrow in FIG. 18C). Accordingly, a force of assisting in the rotation direction for clutch engagement is transferred from the spring 71 to the output gear 65 through the pin 672.

In the configuration of the assist mechanism 670 according to this embodiment, the contact point T between the pin 672 and the spring 71 does not straddle the imaginary line M connecting the shaft center P of the output shaft 63 and the axis Q of the spring 71 when seen in the axial direction of the output shaft 63, in accordance with rotation of the output gear 65. That is, the contact point T moves only in the region Y in the two regions X and Y in accordance with rotation of the output gear 65. When the output gear 65 rotates at a position different from the shaft center P of the output shaft 63 and the axis Q of the spring 71 and in a direction in which the elastic restoring force of the spring 71 decreases, the contact point T between the pin 672 and the first projection 71b approaches the axis Q of the spring 71 at least once when seen in the axial direction of the spring 71. Accordingly, the elastic restoring force generated in the spring 71 can be transferred to the output gear 65 as an assist force in a direction in which the first projection 71b moves away from the second projection 71c. At this time, the elastic restoring force of the spring 71 is transferred to the output gear 65 as a torque through the first projection 71b and the pin 672.

In the configuration of the assist mechanism 670 according to this embodiment, a distance D between the contact point T and the axis Q of the spring 71 also varies in accordance with rotation of the output gear 65. The distance D is at minimum when the contact point T between the pin 672 and the first projection 71b is located on the imaginary line M when seen in the axial direction of the output shaft 63, and increases as the contact point T moves away from the imaginary line M. In this embodiment, the distance D is at minimum when the clutch 13 is in the disengaged state (FIG. 18A). Thus, the distance D increases when the clutch 13 switches from the disengaged state to the engaged state.

The distance between the shaft center P of the output shaft 63 and the contact point T between the first projection 71b and the pin 672 is smaller than the distance between the shaft center P and the axis Q of the spring 71. The distance between the axis Q of the spring 71 and the contact point T is smaller than the distance between the shaft center P of the output shaft 63 and the axis Q of the spring 71, in a case where the contact point T is located on the imaginary line M.

With the foregoing configuration, in the assist mechanism 670, the rotation position of the motor 50 (actuation driving force) changes the rotation position of the output gear 65 such that the actuator rotation angle increases, that is, changes the rotation position in the order of FIG. 18C, FIG. 18B, and FIG. 18A. Accordingly, a force exerted on the pin 672 of the output gear 65 from the spring 71 gradually increases in the direction in which the clutch 13 is disengaged. Accordingly, as illustrated in FIG. 19, a shaft torque exerted on the output shaft 63 by an assist force of the assist mechanism 670 changes such that as the actuator rotation angle increases, a torque exerted in the rotation direction in which the clutch 13 is disengaged increases.

Thus, as illustrated in FIG. 19, even in the configuration in which the shaft torque generated on the output shaft 63 by a clutch reaction force when the actuator rotation angle increases in switching the clutch from the engaged state to the disengaged state, this shaft torque can be canceled by using the shaft torque exerted on the output shaft 63 by the assist force of the assist mechanism 670. Consequently, in the configuration in which the clutch reaction force changes as described above, in a case where the clutch unit is configured such that the output shaft 63 of the clutch driving device 14 and the rotating shaft 31 rotate in synchronization with each other without interposition of the link mechanism, for example, a driving force in driving the clutch 13 can be reduced by using an assist force of the assist mechanism 670. As a result, an actuation driving force of the motor 50 can be reduced.

In FIG. 19, S denotes an actuator rotation angle at which the clutch 13 starts disengagement in a case where the actuator rotation angle increases and an actuator rotation angle at which engagement of the clutch plates 23 of the clutch 13 and the friction plates 24 finish engagement in a case where the actuator rotation angle decreases.

Other Embodiments

The embodiments of the present teaching have been described above, but the above embodiments are merely examples for carrying out the invention. Thus, the invention is not limited to the embodiments, and the embodiments may be modified as necessary within a range not departing from the gist of the invention.

In the embodiments, an elastic restoring force obtained by displacing the first projection 71b, 171b, 271b, 371b toward the second projection 71c, 171c, 271c, 371c in the circumferential direction of the spring 71, 171, 271, 371 is transferred to the pin 72, 572, 672 to be thereby used as an assist force.

As illustrated in FIGS. 20A through 20C, however, an elastic restoring force obtained by moving the first projection 771b away from the second projection 771c in the circumferential direction of the spring 771 may be transferred to the pin 772 to be thereby used as an assist force.

Specifically, as illustrated in FIGS. 20A through 20C, the spring 771 includes a coil portion 771a, a first projection 771b, and a second projection 771c. In the spring 771, the first projection 771b is disposed at a position shifted counterclockwise from the second projection 771c in the circumferential direction of the spring 771 when seen from above the output shaft 63 in the axial direction. Suppose the first projection 771b is a winding start end of the spring 771, the wire material is wound counterclockwise when the spring 771 is seen from the first projection 771b in the axial direction. That is, the spring 771 is a spring wound in the opposite direction to the springs 71, 171, 271, and 371 of the embodiments. The second projection 771c is fixed to, for example, the casing body 41 so as not to move relative to the casing body 41.

The first projection 771b deforms to move away from the second projection 771c in the circumferential direction of the spring 771 so that an elastic restoring force is thereby generated in the spring 771. When the first projection 771b is moved away from the second projection 771c in the circumferential direction, the spring 771 is deformed to have its diameter increase.

The pin 772 is disposed at a position shifted clockwise from the center of the output gear 65 in the circumferential direction of the output gear 65 when seen from above the output shaft 63 in the axial direction.

As illustrated in FIGS. 20A through 20C, in the spring 771, when the pin 772 rotates about the axis of the output shaft 63 with rotation of the output gear 65, the first projection 771b contacting the pin 772 is displaced in the circumferential direction of the spring 771. At this time, a contact point T between the pin 772 and the first projection 771b of the spring 771 reciprocates with respect to the first projection 771b along the first projection 771b.

FIG. 20A illustrates a rotation position of the output gear 65 while the clutch 13 is in a disengaged state. FIG. 20B illustrates a rotation position of the output gear 65 while the clutch 13 is in a half-clutch state. FIG. 20C illustrates a rotation position of the output gear 65 while the clutch 13 is in an engaged state.

Specifically, in a case where the output gear 65 is at the rotation position illustrated in FIG. 20A when seen in the axial direction of the output shaft 63, that is, a case where the pin 772 provided on the output gear 65 is located in a region X in two regions X and Y obtained by dividing the internal space of the casing body 41 into two by the imaginary line M connecting the shaft center P of the output shaft 63 and the axis Q of the spring 771, the pin 772 contacts the first projection 771b of the spring 771 at a position between the center in the projection direction and a proximal end portion (portion connected to the coil portion 771a).

Accordingly, as illustrated in FIG. 20A, a force exerted on the pin 772 by an elastic restoring force of the spring 771 is a force that causes the output gear 65 to rotate in a rotation direction for clutch disengagement (rotation direction of rotation indicated by an arrow of a dot-dot-dash line in FIG. 20A). That is, the spring 771 applies a torque to the output gear 65 through the pin 772 in the rotation direction for clutch disengagement.

In the case of FIG. 20A, the first projection 771b of the spring 771 is not significantly displaced by the pin 772 in the circumferential direction of the spring 771. Thus, a force exerted on the pin 772 by the elastic restoring force of the spring 771 is smaller than those in the case of FIGS. 20B and 20C described later. For example, the pin 772 receives a force in a direction with a magnitude indicated by a solid arrow in FIG. 20A from the first projection 771b of the spring 771.

In a case where the output gear 65 is at the rotation position illustrated in FIG. 20B, that is, in a case where the pin 772 is located on the imaginary line M, the pin 772 contacts the first projection 771b at a position of the proximal end portion. At this time, the first projection 771b of the spring 771 is displaced such that the proximal end portion is located in the region Y, that is, a case where the proximal end portion of the first projection 771b is located away from the second projection 771c. For example, in a case where the output gear 65 changes from the position illustrated in FIG. 20A to the position illustrated in FIG. 20B, the pin 772 moves toward the bent proximal end portion while contacting the first projection 771b of the spring 771.

Accordingly, the spring 771 is twisted in the circumferential direction. Consequently, the spring 771 generates an elastic restoring force in a direction in which the first projection 771b approaches the second projection 771c. The elastic restoring force of the spring 771 is exerted on the pin 772 as indicated by the solid arrow in FIG. 20B. That is, the elastic restoring force of the spring 771 is transferred to the output gear 65 through the pin 772 as a torque in the rotation direction for clutch disengagement (the rotation direction indicated by the dot-dot-dash arrow in FIG. 20B). Accordingly, a force of assisting in the rotation direction for clutch disengagement is transferred from the spring 771 to the output gear 65 through the pin 772. At this time, a force exerted on the pin 772 from the first projection 771*b* of the spring 771 is larger than that in the case of FIG. 20A.

In a case where the output gear 65 is located at the rotation position illustrated in FIG. 20C, that is, in a case where the pin 772 is located in the region Y in the two regions X and Y, the first projection 771*b* of the spring 771 is displaced by the pin 772 to further move away from the second projection 771*c*. At this time, the pin 772 is located at a position closer to the distal end than the position illustrated in FIG. 20B relative to the first projection 771*b* of the spring 771.

Accordingly, the spring 771 is further twisted in the circumferential direction. The elastic restoring force of the spring 771 is exerted on the pin 772 as indicated by the solid arrow in FIG. 20C. That is, the elastic restoring force of the spring 771 is exerted on the output gear 65 through the pin 772 in the rotation direction for clutch engagement (the rotation direction indicated by a dot-dot-dash arrow in FIG. 20C). Accordingly, a force of assisting in the rotation direction for clutch engagement is transferred from the spring 771 to the output gear 65 through the pin 772.

The contact point T between the pin 772 and the first projection 771*b* of the spring 771 straddles an imaginary line M connecting a shaft center P of the output shaft 63 and an axis Q of the spring 771 when seen in the axial direction of the output shaft 63, in accordance with rotation of the output gear 65. The contact point T between the pin 772 and the first projection 771*b* approaches the axis Q of the spring 771 at least once when seen in the axial direction of the spring 771 when the output gear 65 rotates at a position different from the shaft center P of the output shaft 63 and the axis Q of the spring 771 and in a direction in which the elastic restoring force of the spring 771 decreases (in the examples of FIGS. 20A, 20B, and 20C, when the output gear 65 rotates in the order of FIGS. 20C, 20B, and 20A). Accordingly, the elastic restoring force generated in the spring 771 can be transferred to the output gear 65 as an assist force in a direction in which the first projection 771*b* approaches the second projection 771*c*. At this time, the elastic restoring force of the spring 771 is transferred to the output gear 65 as a torque through the first projection 771*b* and the pin 772.

A distance D between the contact point T and the axis Q of the spring 771 varies in accordance with rotation of the output gear 65. That is, when seen in the axial direction of the output shaft 63, the distance D is smallest when the contact point T straddles the imaginary line M and increases as the distance to the contact point T from the imaginary line M increases.

The distance between the shaft center P of the output shaft 63 and the contact point T between the first projection 771*b* and the pin 772 is smaller than the distance between the shaft center P and the axis Q of the spring 771. The distance between the axis Q of the spring 771 and the contact point T is smaller than the distance between the shaft center P of the output shaft 63 and the axis Q of the spring 771, in a case where the contact point T is located on the imaginary line M.

In a manner similar to the configuration of the first embodiment and other embodiments, in the assist mechanism, rotation (actuation driving force) of the motor 50 changes the rotation position of the output gear 65 such that the actuator rotation angle increases, that is, changes the rotation position in the order of FIG. 20C, FIG. 20B, and FIG. 20A. Accordingly, a force exerted on the pin 772 of the output gear 65 from the spring 771 changes parabolically and is at maximum at a predetermined actuator rotation angle. Accordingly, a shaft torque exerted on the output shaft 63 by a driving force of the clutch driving device also changes parabolically and is at maximum at the predetermined actuator rotation angle.

The spring 771 having the configuration as described above may be applied to the configurations of the embodiments.

In the embodiments, the clutch 13 has a so-called normally closed configuration in which the clutch 13 is in an engaged state in a case where an assist force output from the clutch driving device is zero. The clutch 13, however, may have a so-called normally opened configuration in which the clutch 13 is in a disengaged state in the case where the assist force output from the clutch driving device is zero.

Figure 21:
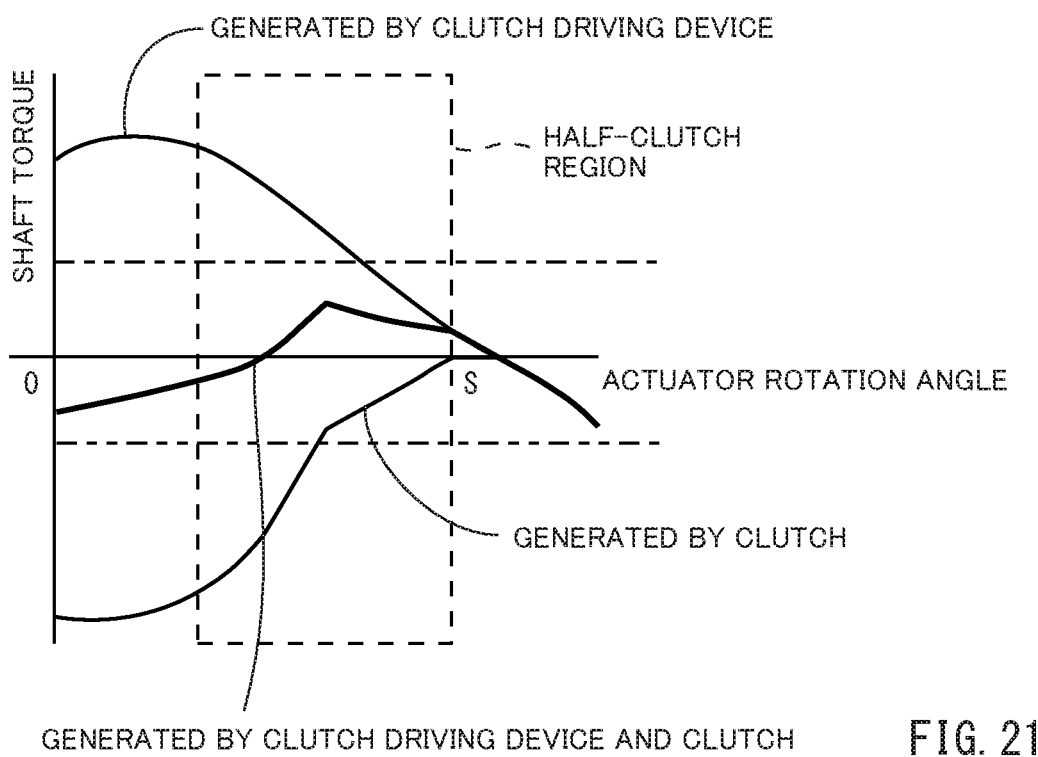
FIG. 21 is a view of the clutch driving device according to the other embodiment and corresponds to FIG. 8.

Specifically, as illustrated in FIG. 21, the clutch 13 and the clutch driving device may be configured such that when the actuator rotation angle increases, the clutch reaction force decreases in the clutch 13 and an assist force generated by the clutch driving device also decreases. That is, in the case of FIG. 21, when the actuator rotation angle is large, the clutch 13 is in a disengaged state, whereas when the actuator rotation angle decreases, the clutch 13 switches from the disengaged state to the engaged state. In FIG. 21, the clutch 13 is in the engaged state while the actuator rotation angle is zero. In FIG. 21, S denotes an actuator rotation angle at which the clutch 13 starts engagement in a case where the actuator rotation angle decreases and an actuator rotation angle at which disengagement of the clutch 13 finishes in a case where the actuator rotation angle increases.

In this configuration, an actuation driving force of the motor 50 necessary for clutch switching operation can be reduced by using an assist force generated by the clutch driving device.

In the embodiments, the pin 72, 172, 272, 372, 472, 672 provided on the output gear 65 has the columnar shape. Alternatively, the pin may have any shape as long as an actuation driving force necessary for switching operation of the clutch 13 can be reduced by transferring an elastic restoring force generated in the spring 71, 171, 271, 371. Similarly, the spring 71, 171, 271, 371 in each embodiment may have any shape as long as an elastic restoring force that can reduce an actuation driving force necessary for switching operation of the clutch 13 can be generated.

In the embodiments, the pin 72, 172, 272, 572, 672 directly contacts the first projection 71*b*, 171*b*, 271*b*, 371*b* of the spring 71, 171, 271, 371. Alternatively, another member may be provided on the first projection 71*b*, 171*b*, 271*b*, 371*b* of the spring 71, 171, 271, 371 to contact the pin 72, 172, 272, 572, 672.

In the fifth embodiment, the link 475 includes the first link portion 476 and the second link portion 477. However, the link may be constituted by three or more link members as long as the link can transfer an elastic restoring force of the spring 371 to the output gear 65.

In the first embodiment, the push rod 29 of the clutch 13 moves in the axial direction of the main shaft 15 by the rotating shaft 31 connected to the link mechanism 16. Alternatively, an output of the clutch driving device 14 may be directly transferred to the rotating shaft 31 without using the link mechanism 16.

In the first embodiment, the output shaft 63 is used as an example of a transfer member that receives an output of the clutch driving device 14 and a clutch reaction force generated in the clutch 13. The transfer portion member, however, may be a component except the output shaft 63 as long as the component receives outputs of the motor 50 and the assist mechanism 70 and a clutch reaction force generated in the clutch 13, as exemplified by the output gear 65 and the rotating shaft 31.

In the first embodiment, the clutch driving device 14 transfers rotation from the input shaft 61 to the output shaft 63 through the intermediate shaft 62. Alternatively, the input shaft 61 and the output shaft 63 may be configured to transfer rotation directly by a gear.

In the first embodiment, the clutch driving device 14 includes the friction mechanism 80 as an example of a self-lock mechanism. However, functions of the self-lock may be achieved by another configuration. The clutch driving device 14 may not include a self-lock mechanism such as the friction mechanism 80.

In the first embodiment, the clutch driving device 14 includes the motor 50 that generates an actuation driving force for actuating the clutch 13. Alternatively, the clutch driving device 14 may include another driving source capable of generating the actuation driving force.

In the first embodiment, in the clutch driving device 14, the gears 61a and 62a, the intermediate gear 64, and the output gear 65 that transfer rotation of the input shaft 61 to the output shaft 63 are spur gears. Alternatively, at least one of the gears may be a spur gear and the other may be gears of other shapes. All the gears may be gears except spur gears.

In the first embodiment, the input shaft 61 is provided with the gear 61a, and the intermediate shaft 62 is also provided with the gear 62a. The gear 61a may be integrally provided to the input shaft 61 or may be a member separated from the input shaft 61. The gear 62a may be integrally provided to the intermediate shaft 62 or may be member separated from the intermediate shaft 62.

In the first embodiment, the cylinder axial direction of the casing 40, the axial direction of the input shaft 61, the intermediate shaft 62, and the output shaft 63, and the axial direction of the spring 71 are the same. Alternatively, the cylinder axial direction of the casing 40, the axial direction of the input shaft 61 and the output shaft 63, and the axial direction of the spring 71 may be different from one another.

In the embodiments, the clutch driving device includes the spring 71, 171, 271, 371 as a torsion spring. However, the clutch driving device may have a configuration except a torsion spring such as a spring constituted by a leaf spring as long as the clutch driving device can output an assist force for driving of the clutch 13.

The embodiments have been directed to motorcycles as an example of the vehicle 1, but the vehicle 1 may have any configuration such as a three-wheeled vehicle or a four-wheeled vehicle as long as the configuration includes a clutch driving device for driving a clutch.

DESCRIPTION OF REFERENCE CHARACTERS

1 vehicle
13 clutch
14 clutch driving device
16 link mechanism
50 motor (actuator)
63 output shaft
65 output gear (rotary body)
70, 170, 270, 370, 470, 570, 670 assist mechanism
71, 171, 271, 371, 771 spring
71b, 171b, 271b, 371b, 771b first projection (output portion)
71c, 171c, 271c, 371c, 771c second projection

72, 172, 272, 372, 472, 572, 672, 772 pin (transfer portion)
375, 475 link
379, 479 output portion
476 first link portion
477 second link portion
P shaft center of output shaft (rotating shaft)
Q axis of spring
D distance between contact point and axis of spring
T contact point

What is claimed is:

1. A clutch driving device that supplies an assist force for assisting operations of engagement and disengagement of a clutch, the clutch driving device comprising:

a helical spring that is deformable in its circumferential direction when seen in an axial direction of the spring to thereby generate an elastic restoring force in the circumferential direction, the spring having two ends;

an output portion that is disposed at one of the two ends of the spring and outputs the elastic restoring force generated by the spring;

a movement restricting portion that restricts a movement of the spring in its radial direction when the spring is deformed in the circumferential direction;

a rotary body that rotates in a disengaging direction in disconnecting the clutch and rotates in an engaging direction in engaging the clutch, about a rotating shaft as a rotation center, the rotating shaft being disposed at a position different from a position of the axis of the spring, and extending in parallel with the axis of the spring; and a transfer portion that is provided to the rotary body to be rotatable together with the rotary body and contacts the output portion to transfer the elastic restoring force to the rotary body, wherein the rotary body receives, as a torque, a reaction force generated by operations of disengagement and engagement of the clutch, and receives, as the assist force, the elastic restoring force generated by deformation of the spring in the circumferential direction through the output portion and the transfer portion, and in a case where the rotary body rotates at a position different from a position of the rotating shaft of the rotary body and the position of the axis of the spring, and in a direction in which the elastic restoring force of the spring decreases, a contact point between the output portion and the transfer portion moves toward the axis of the spring at least once when seen in the axial direction of the spring.

2. The clutch driving device according to claim 1, wherein the rotating shaft of the rotary body is located outside the spring when seen in the axial direction of the spring.

3. The clutch driving device according to claim 1, wherein the contact point is located outside the spring when seen in the axial direction of the spring.

4. The clutch driving device according to claim 1, wherein a distance between the rotating shaft of the rotary body and the contact point is smaller than a distance between the rotating shaft of the rotary body and the axis of the spring.

5. The clutch driving device according to claim 4, wherein in a case where the contact point is located on an imaginary line between the axis of the spring and the rotating shaft of the rotary body, a distance between the axis of the spring and the contact point is smaller than the distance between the rotating shaft of the rotary body and the axis of the spring.

6. The clutch driving device according to claim 1, wherein the output portion is integrally provided to the spring.

7. The clutch driving device according to claim 1, wherein the transfer portion moves relative to the output portion while contacting the output portion by rotation of the rotary body and the deformation of the spring in the circumferential direction caused by the rotation.

8. The clutch driving device according to claim 1, wherein the output portion includes a link that rotates relatively in accordance with a rotation of the rotary body and the deformation of the spring in the circumferential direction.

9. The clutch driving device according to claim 1, further comprising:
   an actuator that applies a rotation torque to the rotary body.

10. The clutch driving device according to claim 9, further comprising:
   a transfer mechanism that transfers the rotation torque from the actuator to the rotary body, wherein
   the transfer mechanism includes an input shaft that receives the rotation torque from the actuator, and
   the input shaft is disposed inside the spring and extends in a direction parallel to the axis of the spring.

11. The clutch driving device according to claim 9, wherein the actuator is a motor.

12. The clutch driving device according to claim 1, wherein the contact point between the output portion and the transfer portion moves to pass through an imaginary line between the axis of the spring and the rotating shaft of the rotary body when the rotary body rotates.

13. The clutch driving device according to claim 1, wherein the spring is a torsion spring.

14. A vehicle comprising the clutch driving device according to claim 1.

* * * * *